US006381739B1

(12) United States Patent
Breternitz, Jr. et al.

(10) Patent No.: US 6,381,739 B1
(45) Date of Patent: Apr. 30, 2002

(54) METHOD AND APPARATUS FOR HIERARCHICAL RESTRUCTURING OF COMPUTER CODE

(75) Inventors: Mauricio Breternitz, Jr.; Roger A. Smith, both of Austin, TX (US)

(73) Assignee: Motorola Inc., Schaumberg, IL (US)

( * ) Notice: Subject to any disclaimer, the term of this patent is extended or adjusted under 35 U.S.C. 154(b) by 0 days.

(21) Appl. No.: 08/647,862

(22) Filed: May 15, 1996

(51) Int. Cl.$^7$ .................................................. G06F 9/44

(52) U.S. Cl. .............................. 717/9; 717/8; 714/37; 714/38

(58) Field of Search ................................ 395/705–706, 395/707–709, 800.25, 377, 800.36, 183.14, 580, 800.26, 800.27, 183.22, 583; 345/441; 717/8; 714/37, 38

(56) References Cited

U.S. PATENT DOCUMENTS

| | | | |
|---|---|---|---|
| 4,435,758 A | | 3/1984 | Lorie et al. |
| 5,179,702 A | * | 1/1993 | Spix et al. .................. 709/102 |
| 5,210,837 A | | 5/1993 | Wiecek |
| 5,212,794 A | * | 5/1993 | Pettis et al. ................. 395/709 |
| 5,392,351 A | * | 2/1995 | Hasebe et al. ................. 380/4 |
| 5,418,958 A | * | 5/1995 | Goebel |
| 5,452,457 A | * | 9/1995 | Alpert et al. ............... 395/709 |
| 5,530,866 A | | 6/1996 | Koblenz et al. |
| 5,530,964 A | * | 6/1996 | Alpert et al. ............... 395/709 |
| 5,541,849 A | * | 7/1996 | Rostoker et al. ....... 395/500.19 |
| 5,555,304 A | * | 9/1996 | Hasebe et al. ................. 380/4 |
| 5,613,118 A | * | 3/1997 | Heisch et al. ............... 395/709 |
| 5,761,651 A | * | 6/1998 | Hasebe et al. ............... 705/400 |
| 5,832,083 A | * | 11/1998 | Iwayama et al. ............... 380/4 |
| 5,889,999 A | * | 3/1999 | Breternitz, Jr. et al. ..... 395/709 |
| 5,987,259 A | * | 11/1999 | Goebel |

OTHER PUBLICATIONS

R. R. Heisch, "Trace–directed program restructuing for AIX executables", IBM Journal of Research and Development, vol. 38, No. 5, pp. 595–601 (1994).
Heisch, Randall R., "FDPR for AIX Executables", IBM Journal of Research and Development, vol. 38, No. 4, pp. 16–20 (1994).
Pettis, et al., "Profile Guided Code Positioning", Proceedings of the ACM SIGPLAN '90 Conference on Programming Language Design and Implementation, pp. 16–27 (1990).
Novack et al., A hierachical approach to instruction–level parallelization, from Inter. jour. of Parallel Programming, vol. 23, No. 1, Feb. 1995.*
Johnson et al., The program structure tree: computing control regions in linear time, from SIGPLAN Notices, vol. 29, No. 6, Jun. 1994.*
Feghali et al., Clarification concerning modularization a McCabe's cyclomatic complexity response, in Communications of the ACM, v37n4, Feb. 1995.*

* cited by examiner

Primary Examiner—Vincent Millin
Assistant Examiner—Cuong H. Nguyen
(74) Attorney, Agent, or Firm—Joanna P. Gariazzo

(57) ABSTRACT

A compiler (142) constructs (FIGS. 14–32) a Reduced Flowgraph (RFG) from computer source code (144). The RFG is used to instrument (FIG. 36) code (142). An object module is created (146) and executed (148). Resulting path frequency counts are written to a counts file (154). A compiler (158) uses the source code (144) and the generated counts to identify runtime correlations between successive path edges and Superedges. An object module (159) is generated containing reordered (156) code generated to optimize performance based on the runtime correlations. If cloning is enabled (152), high frequency path edges are cloned (154) or duplicated to minimize cross edge branching.

51 Claims, 28 Drawing Sheets

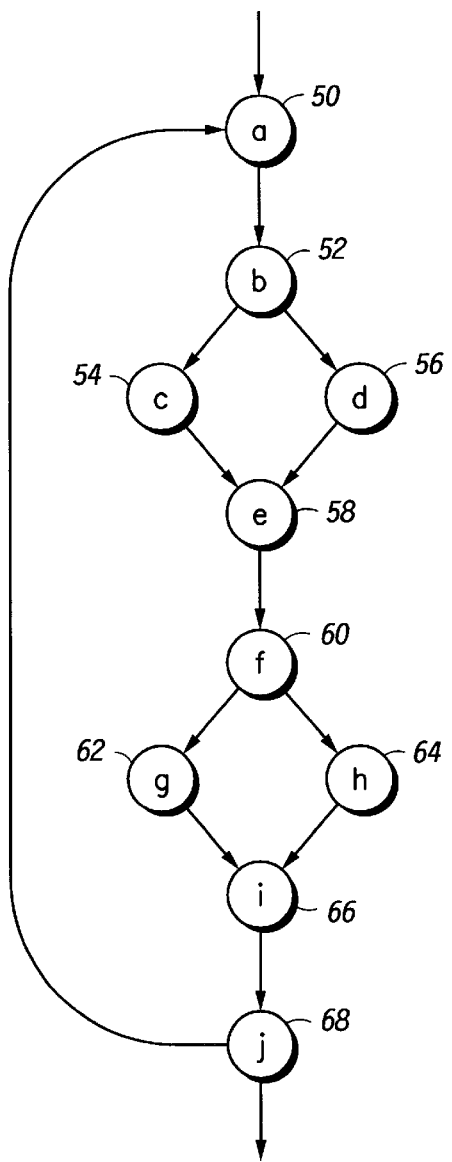
*FIG.1*
−PRIOR ART−
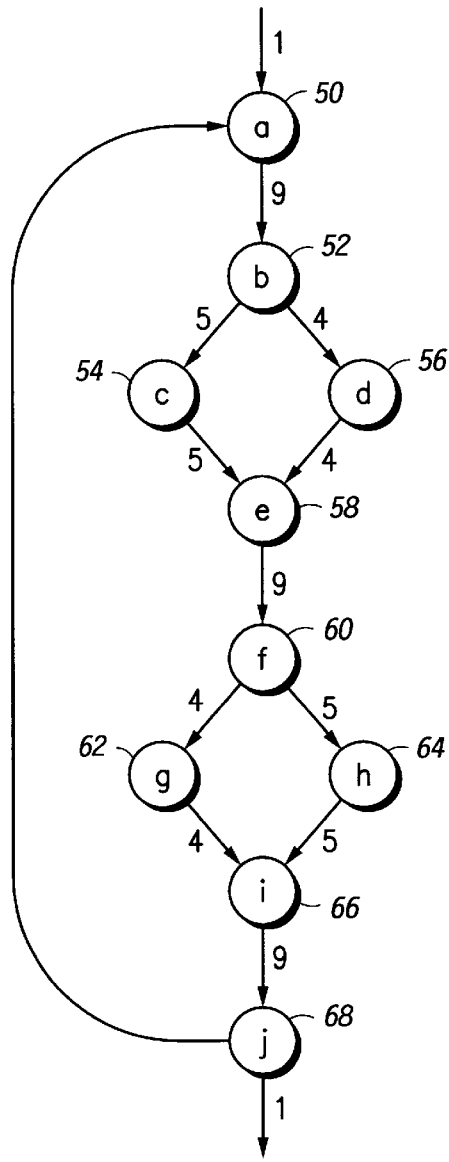
*FIG.3*
−PRIOR ART−
abcefgij abcefgij abcefgij abcefgij abdefhij abdefhij abdefhij abdefhij abcefhij
*FIG.2*
−PRIOR ART−

| STEP | POSITION OF WINDOW | EDGES TO INCREMENT WEIGHT |
|------|--------------------|---------------------------|
| 1 | abce/fgijabcdfgijabcefgif... | ab, ac, ae, bc, be, ce |
| 2 | ab cefg/ijabcdfgijabcefgif... | ce, cf, cg, ef, eg, fg |
| 3 | abce fgij/abcdfgijabcefgif... | fg, fi, fj, gi, gj, ij, |
| ⋮ | ⋮ | ⋮ |
| 34 | ...ab cefh/ij | ce, cf, ch, ef, eh, fh |
| 35 | ...abce fhij/ | fh, fi, fj, hi, hj, ij |

| STEP | CHAINS |
|---|---|
| 1 | a |
| 2 | ab |
| 3 | abc |
| 4 | abce |
| 5 | abcef |
| 6 | abcefg |
| 7 | abcefgi |
| 8 | abcefgij |
| 9 | abcefgij d |
| 10 | abcefgij d h |

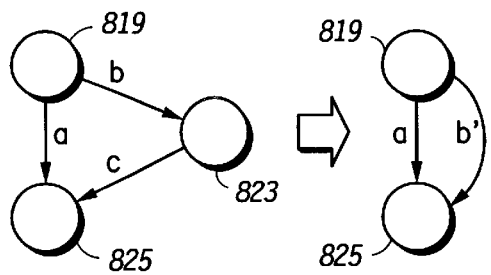
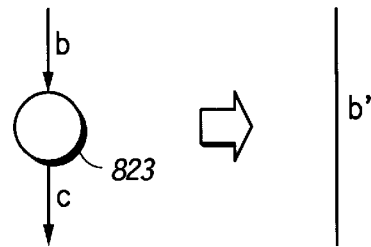
*FIG.21*  *FIG.22*
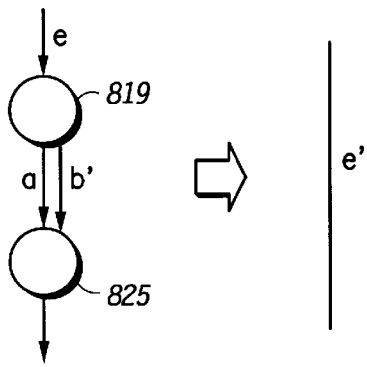
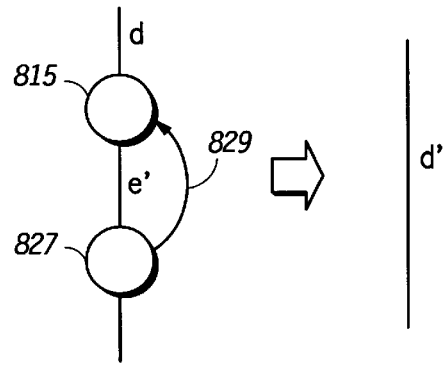
*FIG.23*  *FIG.24*
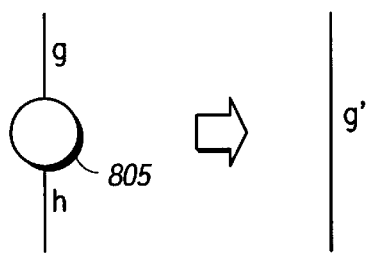
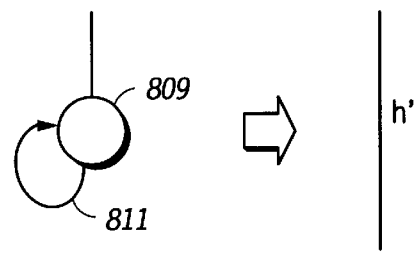
*FIG.25*  *FIG.26*
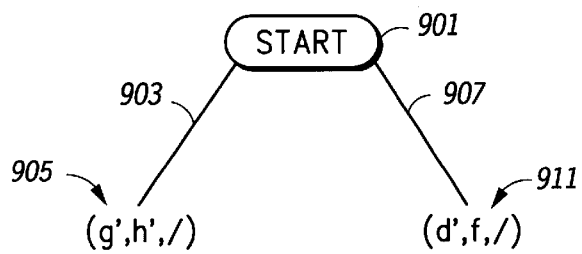
*FIG.27*

METHOD AND APPARATUS FOR HIERARCHICAL RESTRUCTURING OF COMPUTER CODE

CROSS REFERENCE TO RELATED APPLICATION

This application is related to our copending patent application entitled METHOD AND APPARATUS FOR ANALYZING CONTROL FLOW, filed of even date herewith and assigned to the assignee hereof.

This application is related to our copending patent application entitled METHOD AND APPARATUS FOR SEQUENCING COMPUTER INSTRUCTION EXECUTION IN A DATA PROCESSING SYSTEM, filed of even date herewith and assigned to the assignee hereof.

FIELD OF THE INVENTION

This invention generally relates to compiler and profiler technology for microprocessors and specifically relates to sequencing instructions for optimal data processor execution.

BACKGROUND OF THE INVENTION

FIG. 1 illustrates a control flow graph for a computer program. In the control flow graph of FIG. 1, there are ten computer instructions or ten segments of code (referred to also as basic blocks of computer code) represented as nodes "a"–"j" in a directed graph. The ten nodes of FIG. 1 are labeled "a" through "j" and correspond to ten different basic blocks of computer code. In the control flow graph of FIG. 1, the computer instruction(s) in basic block a are executed first in time in the execution path of the computer program. Since basic block "a" is the endpoint of a feedback path or looping path from basic block "j" back to basic block "a", basic block a may contain, for example, a while loop instruction, a for loop instruction, a repeat instruction, a do loop, or a like looping structure or basic block "j" can contain a branch instruction which has a destination address of the beginning of basic block "a".

After the basic block "a" is executed, sequential execution results in basic block "b" being executed following every execution of basic block "a" as illustrated in the control flow graph of FIG. 1. Execution flow will split in one of two directions after basic block "b" is executed depending upon a software condition. Therefore, basic block "b" contains either an if-then-else instruction, or a like flow construct which involves branching down one of two distinct and different execution flow paths. If one condition or set of constraints is detected in the basic block "b", basic block c is executed. If another condition or set of constraints are determined to exist in basic block "b", then the basic block d is executed. In either case, one of "c" or "d" is executed at a time after "b" is executed as illustrated in FIG. 1. Both basic blocks "c" and "d" converge back to basic block "e" in a manner similar to an if-then-else flow control. In other words, after executing one of either "c" or "d", the code contained in basic block "e" will be executed.

From basic block "e" or node "e" of the directed graph of FIG. 1, execution flow continues so that basic block "f" is executed. The basic blocks "f", "g", "h" and "i" of FIG. 1 are of a construct very similar to basic blocks "b", "c", "d" and "e" discussed above, and therefore these two sets of basic blocks are executed in a similar or identical execution flow manner. Once the basic block "j", which is a loop termination point as discussed above, determines that no more loops need to be made through the nodes of FIG. 1, then the execution flow of the computer program exists the construct of FIG. 1 via the exit path from node "j".

The execution flow of the computer program illustrated in FIG. 1 can be analyzed to determine efficient rearrangement of computer basic blocks in memory so that software executes in an efficient manner. In order to do so, FIG. 2 illustrates that an execution tracing routine is performed to collect data from the execution of the computer program graphically illustrated in FIG. 1. This trace process creates a trace data file in memory. The trace data file illustrated in FIG. 2 records the time-sequential execution flow of the computer program graphically illustrated as basic blocks of code in FIG. 1. The trace data stores block execution order in a time sequential manner. Spaces (" ") are used in FIG. 2 to separate different executed passes of the loop a–j from each other.

Therefore, in order to create the trace file in FIG. 2, an empty trace data file is first created and execution of the basic blocks a–j begins. The time sequential order of the basic blocks executed in a first loop through basic blocks a through "j" is {abcefgij}. Therefore, in a first loop, recorded in a left-hand side of FIG. 2, the {b–c} path is taken in FIG. 1 and the {f–g} path is taken in FIG. 1 resulting in the blocks {abcefgij} being executed in a time sequential order. The basic block "j" directs the execution flow back to basic block "a", and the second loop sequence in FIG. 2 is {abcefgij}. Therefore, the same instruction sequence {abcefgij} executed twice in a row, one right after another, a time sequential manner via the loop from block "j" to block a. This time sequential execution flow is continually recorded for a period of time and stored in the trace data file for further analysis at a subsequent time.

A computer is then able to graphically model the computer software as illustrated in FIG. 3 by analyzing the trace data of FIG. 2. It is important to note that when first executing the computer program containing blocks a–j to generate the trace data file in FIG. 2, the computer has no idea of the execution flow of the software as illustrated in FIG. 1. The trace file of FIG. 2 is analyzed to obtain the execution flow structure of FIG. 3 which also contains the same information contained in FIG. 1.

The directed graph of FIG. 3 is constructed by scanning the trace data in FIG. 2 from left to right and analyzing pairs of basic blocks that are adjacent each other in time. Initially, no data structure is present when the algorithm begins (FIG. 3 is blank in a starting state). The algorithm then takes the first pair of basic blocks in FIG. 2, which is the pair ab. In FIG. 3, a node "a" is created, a node "b" is created and an edge "ab" from node "a" to node "b" is created with a weight or count of 1. In a second access to the data of FIG. 2, the pair "bc" is next analyzed. Since the node "b" has been previously created in FIG. 3, the computer simply creates a node "c" and an edge "bc" from "b" to "c" with a weight of 1. This interconnection and/or creation of nodes and edges and the incrementing of weights of the edges between nodes as further pairs of nodes are encountered continues for the entire data segment illustrated in FIG. 2 to result in the completed data structure illustrated in FIG. 3. As illustrated in FIG. 3, the basic block b follows basic block a nine times in FIG. 2 whereas basic block c follows basic block b only five times in FIG. 2 as evident from the weights on the edges "ab" connecting nodes "a" and "b" and the edge bc connecting nodes "b" and "c" illustrated in FIG. 3.

Once the data structure of FIG. 3 is created from the trace file of FIG. 2, a method illustrated in the flowchart of FIG.

4 can be performed to analyze the data structure of FIG. 3 to determine an efficient manner of ordering basic blocks in memory so that cache performance may be improved and pipeline flushing may be minimized resulting in improved processor performance. The efficient output order of basic blocks (the output file resulting from the method of FIG. 4) is illustrated in FIG. 5. In order to discuss FIG. 4 of the prior art restructuring method, it is important to refer to FIG. 5, which is the output of the method of FIG. 4.

Initially, the method of FIG. 4 begins via an initialization step 100 which prepares for the formation of a sequence chain or reordered basic blocks of instructions. In step 102, the node in FIG. 3 that has not been so far selected with the highest exiting path/edge value is selected. In FIG. 3, the nodes "a", "e", and "i" are tied in numerical value for the highest path value where this path/edge value is 9 in FIG. 3. Nine is the greatest edge value in FIG. 3. In this case of a tie, the first node in the execution flow, which is a in this case, is selected arbitrarily. The basic block a is then placed in a restructured computer file as illustrated in step 1 of FIG. 5. An execution chain (a sequential list of basic block(s)) is then created with the beginning of the chain being set to the node determined in step 102 (which in this case is node "a"). Therefore, step 106 sets the beginning of the chain to the node a in FIG. 3. Step 108 is used to determine which nodes a–j are reachable from node "a" in FIG. 3. From node "a" only one node is reachable and that node is node b in FIG. 3. Therefore, step 108 (in a first loop) produces a single node which is node "b".

Node "b" is then analyzed in step 110, and since the set of nodes determined a latest execution of step 108 contains only the node "b", the node "b" is selected in the step 110 as being the node with the highest path value. In step 110, node "b" is then inserted into the restructured computer file of FIG. 5 as illustrated in step 2 of FIG. 5. The restructured computer file now contains the instruction chain or sequence "ab".

Step 108 then determines that node "c" and "d" are reachable from step "b" as illustrated in FIG. 3. Step 10 then analyzes "c" and "d" and determines that node "c" has a path value of 5 and node "d" has a path value of 4. Therefore, step 108 and 110 in FIG. 4 insert the basic block "c" into the restructured data file of FIG. 5 after block "b" and a step 3 of FIG. 5 illustrates that node "d" is ignored and is not inserted into the chain of FIG. 5 at this point in time since node "d" did not have the highest weight value. Continuing from node "c", basic block "e" (represented by node "e" in FIG. 3) is inserted in a step 4 of FIG. 5 using the algorithm of FIG. 4. Step "f" is then inserted in a step 5 of FIG. 5 using the process outlined in FIG. 4. Between nodes "h" and "g" in FIG. 3, steps 108–110 will determine that node "h" has a greater path value from node "f" than node "g" and insert basic block "h" after block "f" in a step 6 of FIG. 5. Code represented by node "i" is then inserted via step 7 of FIG. 5, and "j" is inserted via a step 8 in FIG. 5. Once node "j" is inserted in step 8, there are no more unselected nodes which can be reached from step "j" in FIG. 3 since node "a" has already been analyzed and inserted into FIG. 5 in step 1 of FIG. 5. Therefore, step 108 sends the control of FIG. 4 back to step 102 and step 102 finds a new unselected node which has the highest weight value. In summary, by step 8 of a left portion of FIG. 5, the chain of blocks {abcefhij} is now fully sequentially inserted into the restructured computer file as illustrated graphically via a region 90 illustrated in a left portion of FIG. 5.

Returning to steps 102–106, the only remaining unselected nodes in FIG. 3 are "d" and "g", which have equal edge weight values and therefore, by default, node "d" which is the earlier node is chosen via the process of FIG. 4. Node "d" is inserted via step 9 in FIG. 5. Since the node "e" is reachable from node "d" in FIG. 3 but has already been previously selected (see step 4 of FIG. 5) and placed into the file of FIG. 5, step 108determines that there is nothing more to process from node "d" and step 102 is once again executed. The only node remaining is node "g" and step 10 of FIG. 5 determines that node "g" should be inserted in a step 10 of FIG. 5.

Therefore, when a compiler is ordering the basic blocks of the program flow illustrated in FIG. 3, the final ordering of instructions or basic blocks in memory is performed as illustrated in step 10 of FIG. 5 with the goal of attempting to improve processor performance.

However, the prior art method illustrated in FIGS. 1–5 is flawed. By looking at FIG. 2, one can easily determine that if the path bc is taken, it is most likely that the path {fg} is also taken in conjunction with path {bc}. One can also determine if the path {bd} is taken, then the path {fg} is also more likely to be taken. In other words, the correlation between paths {bc} and paths {fg} is high whereas the correlation between paths {bd} and {fh} is high. Therefore, the most efficient organization of basic blocks in step 10 of FIG. 5 would be to couple the paths {bc} with {fg} in some serial order or couple the path {bd} with {fh} in some serial order. However, the algorithm illustrated via prior art FIGS. 4 and 5 results in the path {bc} being coupled and serially positioned with the path {fh} (see this illustrated graphically in the right portion of FIG. 5). This choosing of the wrong pairs to the detriment of CPU execution performance results because the prior art algorithm of FIG. 4 does not look ahead to more distant nodes and paths in the data structure of FIG. 3 but only looks at directly adjacent pairs of basic blocks or nodes in FIG. 3. The result is that the prior art of FIG. 4 and 5 performs basic block restructuring in a limited fashion which obtains limited performance benefit. Therefore, it is more advantageous to design a basic block restructuring process which identifies these correlations between more distant paths and performs improved sequencing of instructions to result in fewer cache misses, fewer external memory accesses, fewer page misses, fewer pipeline flushes and or stalls, and increase program execution speed.

BRIEF DESCRIPTION OF THE DRAWINGS

FIG. 1 illustrates, in a control flow graph, the execution flow control of a software program segment as is known in the prior art.

FIG. 2 illustrates, in a textual representation, a trace data file resulting from the execution of the software code graphically illustrated in FIG. 1.

FIG. 3 illustrates a prior art weighed flow control graph which is created by analyzing the information from FIGS. 1 and 2.

FIG. 20 through FIG. 26 are control flowgraph segments illustrating the function of flowgraph transformations.

FIG. 27 is an illustration of a transformed control flowgraph.

FIG. 15 illustrates how the construction of the Reduced Flowgraph (RFG) is performed by a directed DFS.

DETAILED DESCRIPTION OF A PREFERRED EMBODIMENT

Figure 4:
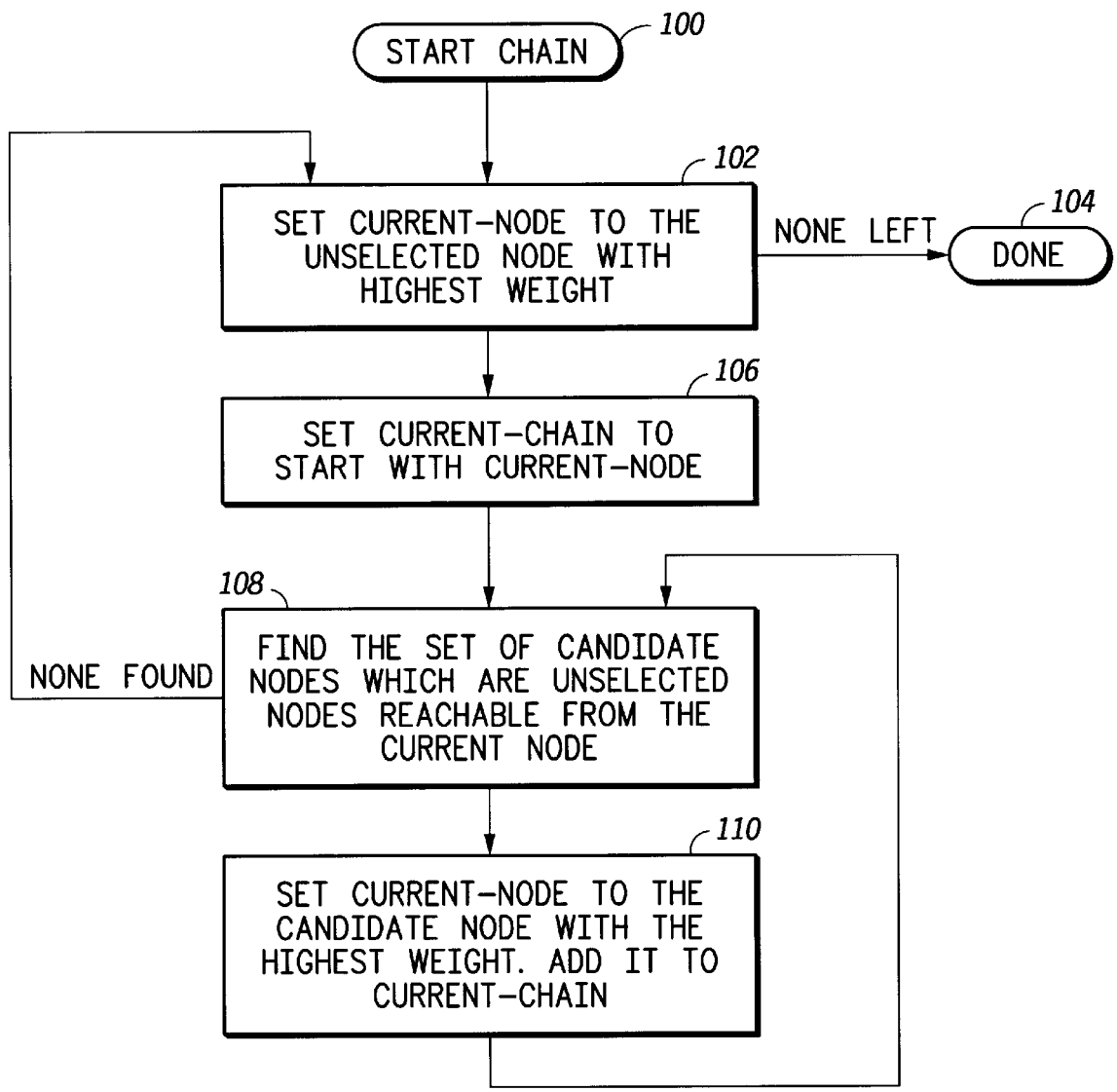
FIG. 4 illustrates a method for using the graph of FIG. 3 to restructure code in a manner known in the prior art.
Figure 5:
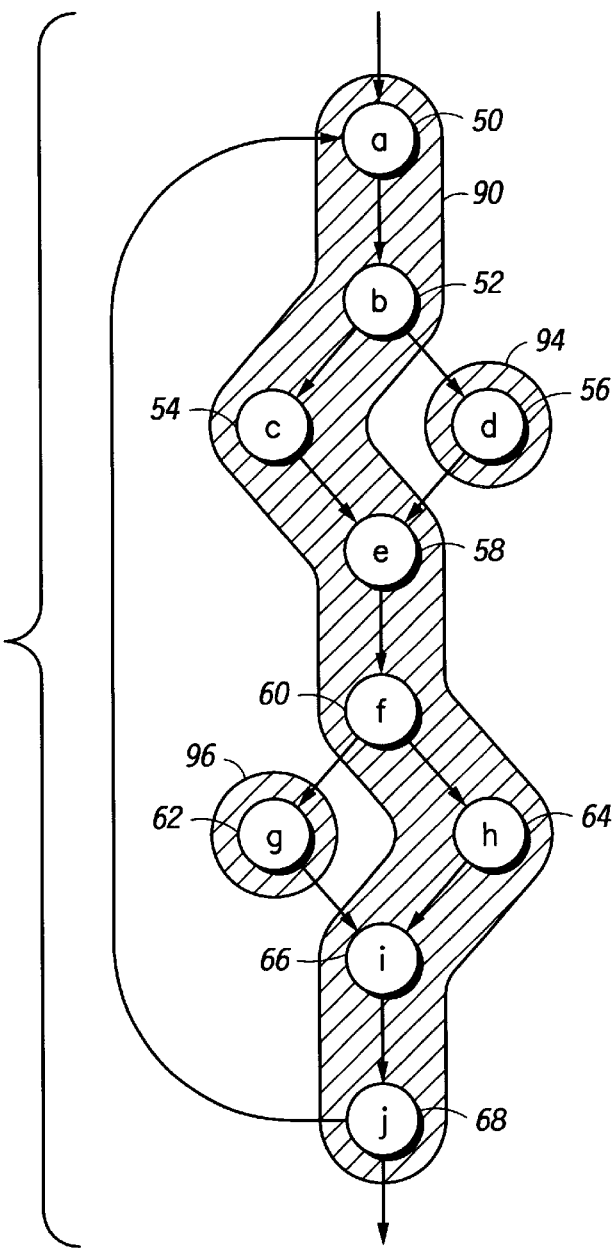
FIG. 5 illustrates the formation of a restructured data file in the prior art as indicated via the method of FIG. 4.

Generally, the present invention provides a more detailed analysis of correlations and dependencies between three or more groups of instructions or basic blocks of instructions in a computer program. This more detailed analysis is superior to the prior art method (see FIGS. 1–5) of only analyzing correlation and dependencies between only adjacent pairs of instructions. Analysis of three or more groups of instructions which are executed in close proximity to one another will allow for more efficient ordering of code for execution by a central processing unit (CPU). Therefore, it is more advantageous to design a basic block restructuring process which analyses three or more basic block dependencies in a manner which will detect intricate dependencies between the execution of the pairs of nodes b–c and f–g (see FIG. 1), and dependencies between the pairs of nodes b–d and f–h (see FIG. 1) in order to produce a superior restructuring order than that resulting in FIG. 5. The superior restructuring taught herein will result in fewer cache misses, fewer external memory accesses, fewer page misses, fewer instances where the pipeline of a CPU was flushed, and increased program execution speed. This invention can be further understood with reference to FIGS. 6–40.

Figure 6:
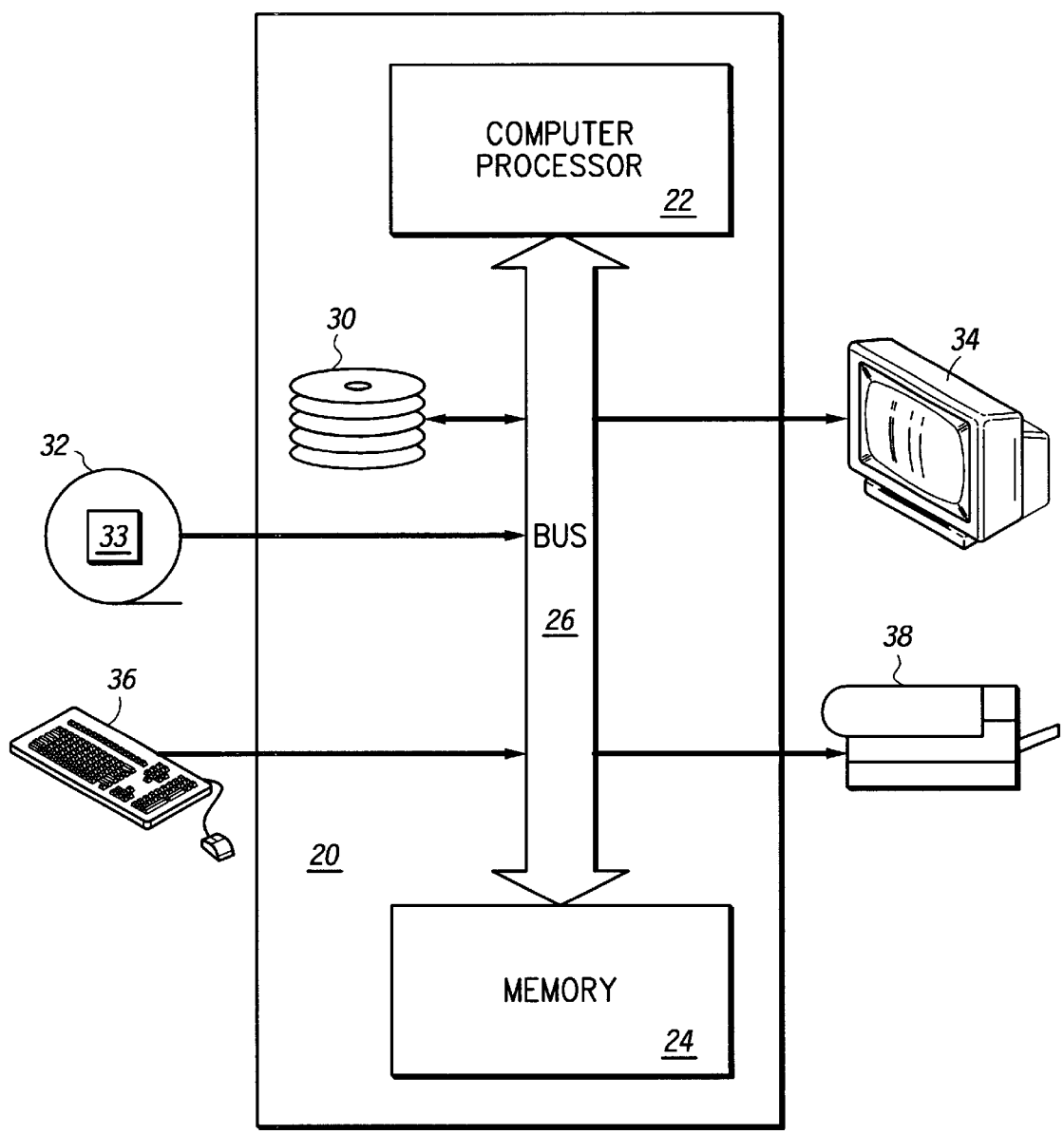
FIG. 6 illustrates a computer processor system in accordance with the present invention.

FIG. 6 is a block diagram showing a General Purpose Computer 20. The General Purpose Computer 20 has a Computer Processor 22, and Memory 24 (which contains all computer software and data as taught herein), connected by a Bus 26. Usually, bus 26 contains an address bus portion, a data bus portion, and a control signal bus portion. Also connected to the Bus 26 are Secondary Storage Devices, such as hard disk drive(s) 30, External Storage 32, a monitor 34, a keyboard (with mouse) 36, and a printer 38 (optional). The External Storage 32 may be floppy disks, magnetic tape, CD-ROM, a network connection, or even another computer. Note that executable versions of computer software 33, such as compilers, linkers, and user programs can be read from the External Storage 32 and loaded for execution directly into the Memory 34, or stored on the Secondary Storage 30 prior to loading into Memory 34 and execution. The computer of FIG. 6 may be used to execute any of the software taught herein.

Figure 7:
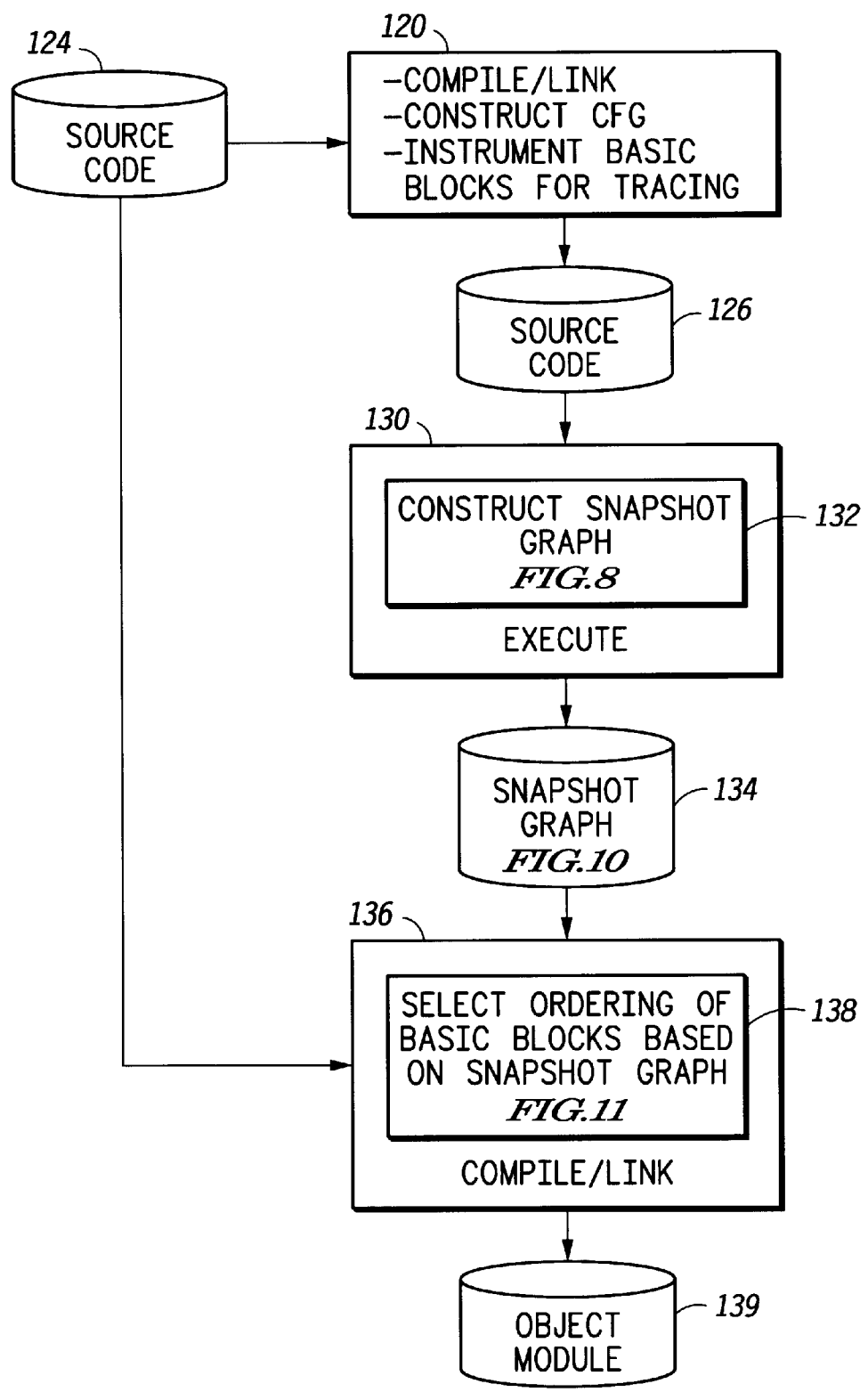
FIG. 7 illustrates the code layout of a software program executed on the computer system of FIG. 6 which allows for superior sequencing of computer instructions for execution by a central processing unit.

FIG. 7 illustrates a method for sequencing or ordering basic blocks of computer instructions in a computer program (where each basic block may include one or more computer instructions) in order to optimize execution flow so that cache performance is improved, pipeline performance is improved, and the speed of execution of the overall data processing system is increased. The method of FIG. 7 begins by providing source code 124. Source code 124 can be any high level language or computer language which needs to be compiled and/or linked in order to produce an executable file. Therefore, in one form, the source code 124 may be C code, C++ code, Pascal, FORTRAN, Lisp, or any language which requires assembly and/or compilation. The source code 124 is then compiled and linked via a step 120 as illustrated in FIG. 7. At any time during the process of compiling and linking the source code 124, step 120 is used to insert instrument code into the compiled or linked code in order to allow for the proper collection of trace data in a trace data file. In other words, executable instructions will be inserted into the source code to allow for a trace data file to be dynamically formed when the compiled program is executed. In addition, the step 120 will create the control flow graph (CFG) as illustrated in FIG. 1.

After the step 120, an object module 126 which contains executable code is created in the process of FIG. 7. Step 130 of FIG. 7 is then used to execute the object module 126 where the instrument code inside the object module 126 is used to form a trace data file in a manner similar to that illustrated in FIG. 2. The method of FIG. 7 then differs significantly from FIGS. 1 through 5 via the other steps, 130 through 139. Within step 130, a sub-step 132 is used to construct a snapshot graph wherein the process used to construct a snapshot graph is illustrated further in FIG. 8. Generally, the snapshot graph is created by analyzing the trace data file, a sample of which is illustrated in FIG. 2. Instead of using a prior art technique of analyzing only adjacent elements in the trace data file as illustrated in FIGS. 1 through 5, the snapshot graph is constructed in step 132 by using a larger window size which contains more than two elements. This larger window which contains several elements for analysis will allow efficient ordering of computer instructions based not only on execution flow correlation between adjacent instructions but also execution flow of fact and correlation between more distant instructions.

In short, the shortcomings mentioned in the prior art via the background of the invention herein are corrected by using a large window size which can analyze more than two elements in a trace data file at one time to create a more complete database and understanding of the inter-relations between various instructions even though they may not be directly adjacent one another in execution time. In FIG. 7, a snapshot graph 134 is the resulting output of the steps 130 and 132. Once again, FIG. 8 will illustrate in greater detail a method by which this snapshot graph, which is illustrated specifically in FIG. 10, is created.

The control flow graph created in step 120 and illustrated in FIG. 1, the snapshot graph 134, and the source code 124 are accessed and analyzed via step 136. By accessing the control flow graph formed by step 120 in FIG. 7 and the snapshot graph 134 in FIG. 7, software subroutines can determine which instruction should be placed in sequence in memory in order to allow for an efficient sequential execution flow within a data processor to maximize the efficiency of a pipeline execution unit and cache units within a data processor.

Therefore, a step 138 in FIG. 7 will rearrange basic blocks of instructions or computer instructions within object module 126 and step 136 will then recompile and relink this restructured source code to provide a re-sequenced executable object module 139 which will be executed in a more efficient manner on a data processing system. The method used to select and sequence the basic blocks in an efficient manner within object module 126 is further illustrated via a flow chart in FIG. 11.

Figure 8:
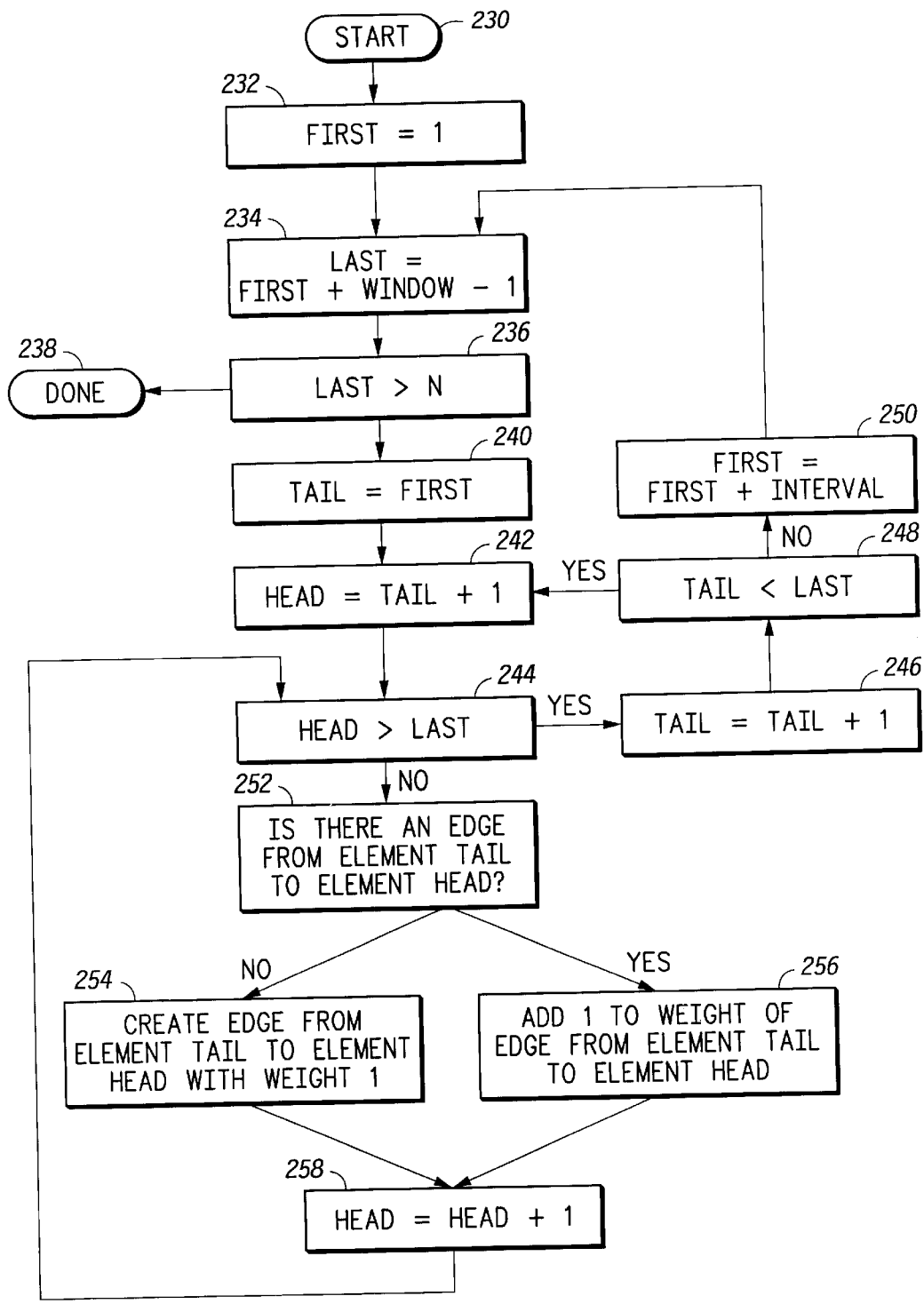
FIG. 8 illustrates a method for traversing a trace data file to construct a snapshot graph in accordance with the present invention.
Figures 9, 10:
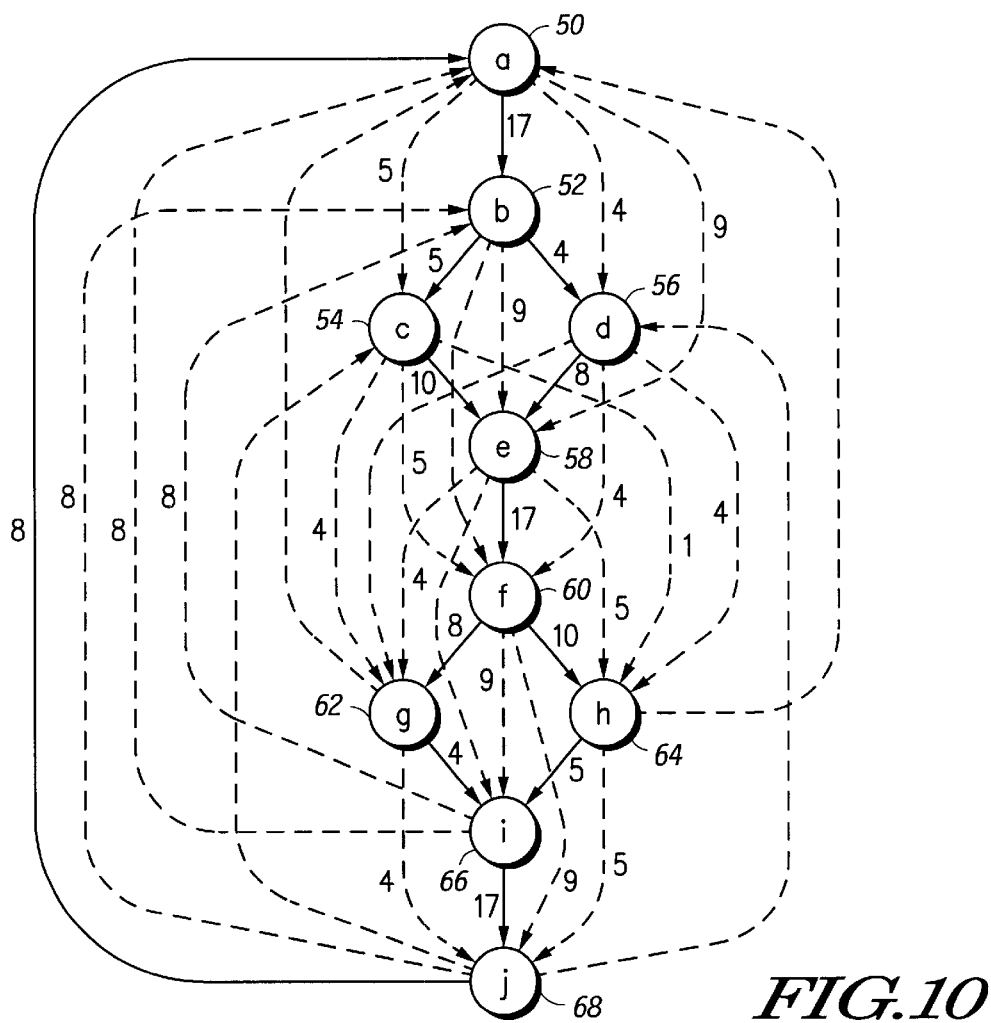
FIG. 9 illustrates in a textual table the manner in which the method of FIG. 8 operates on a trace data file in accordance with the present invention.
FIG. 10 illustrates a snapshot graph formed using the process illustrated in FIGS. 8 through 9 in accordance with the present invention.

FIG. 8 illustrates a method for constructing a snapshot graph as first introduced in step 132 of FIG. 7. FIG. 8 can be further understood by simultaneously referencing FIG. 9 which illustrates how FIG. 8 will be analyzing and parsing information from a trace data file illustrated in FIG. 9 using a window with a size greater than two. Furthermore, FIG. 10, which is the final snapshot graph, will be created dynamically while the flow of FIG. 8 is performed. Therefore, it may be necessary to refer to FIG. 10 on occasion when describing FIG. 8 so that a full understanding of the step 132 of FIG. 7 is obtained.

The method of constructing a snapshot graph begins via a start step 230 in FIG. 8. In a first step 232, a variable "first" is set to a value of 1. Therefore, step 232 will initialize a variable first to the first element of the trace file which is the left-most element a as illustrated in step 1 of FIG. 9. A step 234 in FIG. 8 will then set a variable "last" to the value of the variable first plus a window size value minus 1. In FIG. 9, the window size is illustrated as being a value of 4 and can be set to any value. It is important to note that the window size is determined by an experienced software engineer where a window value that is too small may miss various correlations and a window value that is too high may result in a large, cumbersome, and meaningless snapshot graph.

Therefore, in the example illustrated in FIG. 9, instead of looking only at adjacent instructions as taught by the prior art in FIGS. 1 through 5, a collection of many instructions is analyzed for dependencies in order to properly organize or sequence instructions for execution by a data processor. In general, comparing the prior art to the method illustrated in FIG. 9 is analogous to comparing a chess player who only looks one move ahead to a chess player who looks many moves ahead. The chess player who looks many moves ahead can play a better game than the chess player who only looks a single move ahead. This analogy will go far in understanding exactly how the invention disclosed in FIG. 8 works. Therefore, with a window size of 4 as illustrated in FIG. 9, step 234 will set the variable last to a value of 4 so that a window containing elements abce in step 1 of FIG. 9 is defined via the steps 232 and 234 of FIG. 8.

A step 236 is used to determine if an end of the trace data file has been encountered. If all of the trace data in the data file has been processed, then a step 236 will result in the step 238 being executed whereby the algorithm of FIG. 8 is complete. If data remains within the trace data file or there are elements left to be analyzed in the trace data file, then the elements within the window selected via steps 232 and 234 are analyzed via the steps 240 through 258. In general, the steps 240 through 258 in FIG. 8 are used to determine all of the pairs or combinations of two elements within the window defined in step 1 of FIG. 9, whether or not they are adjacent one another in the trace data file. These pairs found for the window in step 1 of FIG. 9 are illustrated in a right hand portion of step 1 in FIG. 9. These pairs from the window in step 1 of FIG. 9 are ab, ac, ae, bc, be, and ce. In general, for each window size of size=ws, the number of pairs=ws(ws−1)/2. Therefore, in general, the steps 240 through 258 of FIG. 8 are used to identify all the combinations of elements in the window size as illustrated the right hand side of FIG. 9.

In a more detailed discussion of FIG. 8, a step 240 sets a tail pointer to the first element of the window which is element a in step 1 of FIG. 9. A step 242 sets a head pointer to the element directly after the tail pointer. Therefore, the head pointer in this step 242 will be pointing to the element b in the window of step 1 in FIG. 9. In a step 244, if the head pointer is greater than the end of the window which is indicated by element e in step 1 of FIG. 9, then steps 246 and 248 are executed. However, since the head pointer from step 242 is now set to the element b in the window of step 1 in FIG. 9, the "no" path exiting from step 244 is followed. In a step 252, the elements pointed to by the tail and the head are accessed. In other words, the elements a and b are accessed since these elements are the elements indicated by the values of tail and head. The step 252 will look to the snapshot graph and determine whether nodes for a and b have been previously created and whether an edge or path between a and b exists. Since this is the first pair of elements accessed from the trace datafile, no nodes or no edges exist and no snapshot graph portion has begun construction. Therefore, step 254 will be used to create the node 50 (node representing basic block a) of FIG. 10 and the node 52 (node representing basic block b) of FIG. 10 and connect these two nodes together via an edge which at this time will have a value of 1. In FIG. 10, the edge between nodes 50 and 52 is indicated as having an ending value of 17. Therefore, when the entire algorithm of FIG. 8 has completed execution via step 238, the edge between nodes 50 and 52 in FIG. 10 will have been incremented by step 256 sixteen more times to result in a final weight value of 17 between nodes 50 and 52 in FIG. 10.

It is important to note that the nodes 50 and 52 and the other nodes, 54 through 68 may either be created by the method of FIG. 8 or be provided from the control flow graph illustrated in FIG. 1. Therefore, in an alternate embodiment, the nodes 50 through 68 may already be created and FIG. 8 need only create edges or increment edges to create the snapshot graph of FIG. 10.

After creating the edge between elements 50 and 52 having a weight value of 1 in step 254 of FIG. 8, the head, which is currently pointing to element b in the window of step 1 of FIG. 9 is incremented to the element c of the window of step 1 of FIG. 9 via a step 258. At this point, a right hand portion of step 1 in FIG. 9 indicates that the edge ab has been processed.

Step 244 is then executed wherein the head is pointing to element c in the window of step 1 of FIG. 9 and the tail is still pointing to the element a in step 1 of FIG. 9. Therefore, steps 252 and 254 are executed in FIG. 8 to provide for an edge between the node 50 and the node 54 (node representing basic block c) of FIG. 10. In the step 254 of FIG. 8 this node is initially set to a value of 1. However, as indicated in FIG. 10, this edge value between the nodes 50 and 54 will have a final value of 5 when the entire trace datafile has been completely analyzed in step 238 of FIG. 8.

Figures 11, 12:
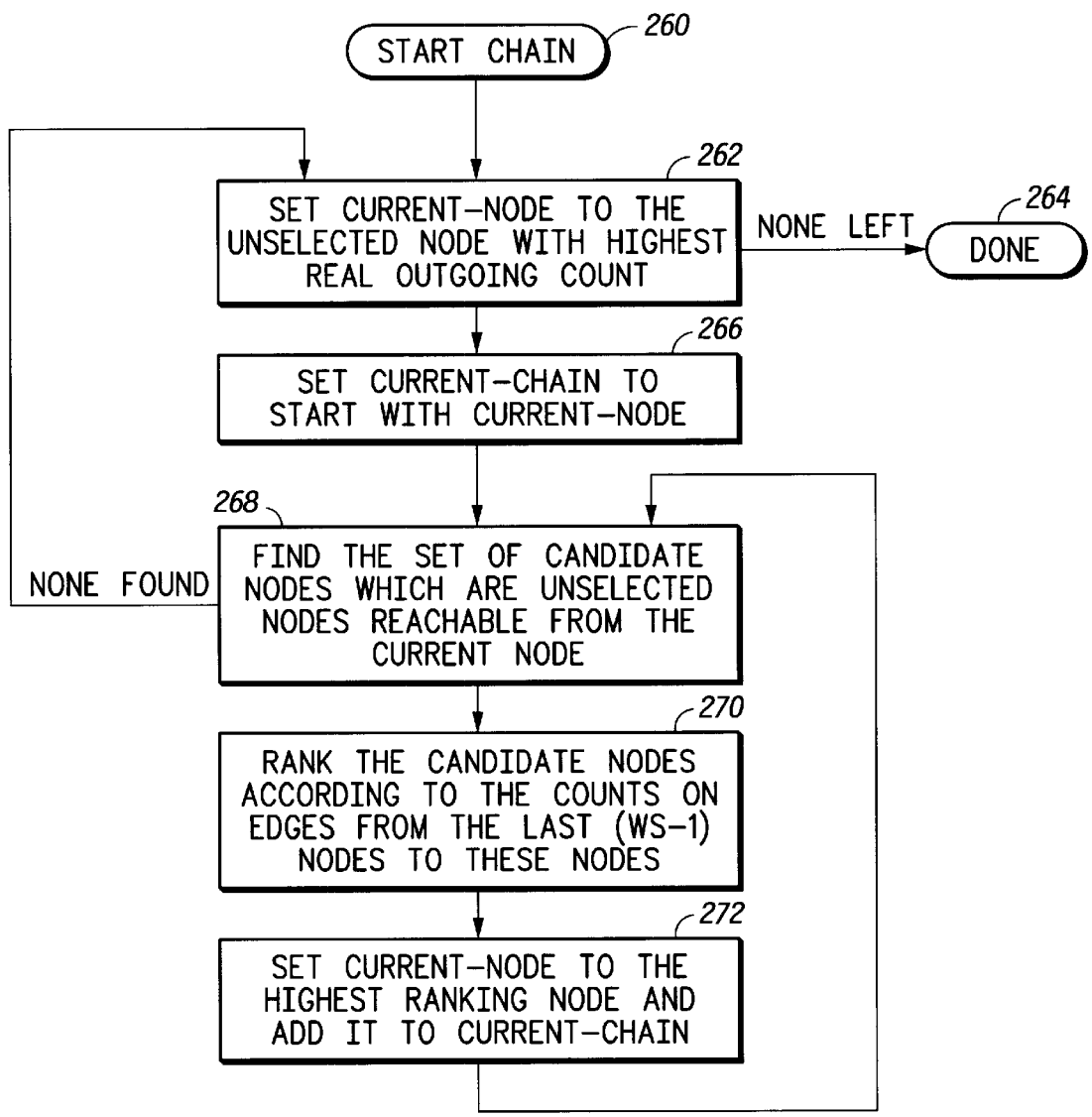
FIG. 11 illustrates a method for traversing a snapshot graph in order to effectively sequence computer instructions for execution for a central processing unit.
FIG. 12 illustrates set a sequenced instructions which has been restructured for improved and efficient execution by a central processing unit in accordance with the present invention.

It is now important to distinguish between the solid edge lines in FIG. 10 and the dotted edge lines in FIG. 10. The solid edge lines are used to indicate actual control flow between nodes, while the dotted edge lines represent additional non-control-flow edges which are associated with weights according the snapshot graph construction method described in FIG. 8. For example, in FIG. 10, control flow can pass directly from node a to node b (solid edge), while it cannot pass directly from node a to node c (dotted edge). The primary differences between the snapshot graph of FIG. 10 and the weighted control flow graph of the prior art in FIG. 3 is that the snapshot graph contains additional correlation information which is not present in the weighted control flow graph. The algorithm in FIG. 11 uses this additional information to determine a better ordering of the basic blocks; this process will become more clear after FIG. 11 is discussed in detail.

After the creation of the edge between nodes 50 and 54 via a step 254 in FIG. 8, the head is incremented to point to element e in the window illustrated in step 1 of FIG. 9. The steps 244 through 254 are then executed to create an edge between node 50 and node 58 (representing the basic block e) in FIG. 10 where this edge initially has a value of 1. At this point, the step 258 will increment the head pointer outside of the window boundary (defined by the value "last") illustrated in step 1 of FIG. 9. Therefore, step 244 will result in steps 242 and 248 being executed whereby the tail pointer is changed to point to the element b and the head pointer is changed via a step 242 to point to an element c. The steps 242 through 258 are then repeated as previously discussed until all combinations in the window illustrated in step 1 of FIG. 9 are exhausted. For a window size equal to four (ws=4), the number of combinations is 4(3)/2=6 as illustrated in FIG. 9. All six possible combinations for step 1 of FIG. 9 are illustrated on the right hand side of step 1 of FIG. 9 and have been determined and properly identified in the snapshot graph of FIG. 10.

After the entire window in step 1 has been processed via the steps 242 through 258 of FIG. 1 a step 250 is used to begin to create the next window to be analyzed via step 2 of FIG. 9. In step 250, the first pointer is incremented by a value referred as an "interval". In FIG. 9 the interval is indicated as being a value of 2. Therefore, the interval value need not equal the window value and are usually different values when interval is less than the window size so that the windows in each step of FIG. 9 will at least partially overlap one another as clearly illustrated in FIG. 9. For example, in one embodiment, a window size of 8 may be determined with an interval of 3 so that each window will overlap each other by 5 elements. Therefore, the steps 250 and 234 when executed after processing the first window will result in the first and last pointers being set to element c and g to create the window as illustrated in step 2 of FIG. 9. The processing of this window, cefg, is then performed to find all six pairs within cefg as indicated in FIG. 9 using the steps 240 through 258. This process of FIG. 8 continues for as many windows as are required to entirely process the entire trace datafile to obtain all pairs and all edges as indicated in the final snapshot graph of FIG. 10.

Note that it is not necessary to actually write out a complete trace file in order to construct the snapshot graph. It is more efficient of memory space to use a buffer large enough to contain at least the last ws basic blocks and to construct the graph during the execution of the instrumented program using this buffer. The reason for this is that the total size of the trace file is proportional to the sum of the execution counts of each basic block, while the total size of the snapshot graph is proportional to the number of edges in it which is bounded by a number independent of the number of times that each edge is incremented.

FIG. 11 illustrates a method for traversing a snapshot graph of FIG. 10 in order to determine an efficient sequencing or ordering of the computer instructions a through j as executed in the trace file of FIG. 2. FIG. 11 illustrates steps 260 through 272. Step 260 indicates that a new file is to be created in memory, wherein this file is to contain the resequenced code output from the process of FIG. 11. This file will be a new restructured, executable file and is illustrated over time in FIG. 12. In a Step 262, a node from the graph of FIG. 10 which has been previously unselected with a highest real outgoing weight value is chosen to begin the resequencing algorithm. Since nodes a, e, and i all contain a real outgoing weight of 17 on a specific path, one of the instructions a, e, or i are selected in a first execution of Step 262. Usually, when there is a two-way or multiple-way tie as indicated in this aei situation, the first node encountered in the snapshot graph is entered into the restructured executable file. Therefore, FIG. 12 illustrates in a Step 1 that the instruction a or basic block a is selected and placed into the restructured file. In a Step 266, the current chain of instructions is set to begin with the node a selected in Step 262. In a Step 268, only the node b can be executed subsequent to node a in the snapshot graph of FIG. 10 since there is only one solid line exiting node a in FIG. 10. Therefore, Step 268 indicates that only Step b can be selected from Step a via the structure of FIG. 10. Since only one node is selected in Step 268, the ranking occurring in Step 270 is trivial.

Since there is only one node in the chain, the node b for FIG. 10 is selected in Step 272 as the highest ranking node in the chain. Therefore, the Step 2 of FIG. 12 clearly indicates that the basic block b is added to the restructured, executable file subsequent to the basic block or instruction a Block b is then selected as the next node to be analyzed in the chain of instructions via the Step 268. From node b in FIG. 10, two nodes c and d, numbered as nodes 54 and 56, are reachable with solid lines from the node 52 labeled as node b. Therefore, Step 268 selects the node c and d from FIG. 10 as being reachable from the node 52 in FIG. 10.

Step 270 then determines which of the nodes 54 and 56 of FIG. 10 should next be inserted in the executable file illustrated in FIG. 12. In general, if there are n candidate nodes and k prior nodes in the chain, it is straightforward to construct a matrix Wij from the snapshot graph where i runs from 1 to k and indicates a prior node, j runs from 1 to n and indicates a candidate node, and Wij is the edge count in the snapshot graph for the edge from the particular prior node i to the particular candidate node j. This matrix Wij contains all of the information collected in the snapshot graph which will be used to rank candidate nodes and select a particular node for insertion into the new restructured, executable file. A number of heuristic methods of ranking and selecting are possible, of which a few are described in the following paragraphs.

In the fanout method, a rank value rj is computed for each candidate node j via the formula $$rj = \Sigma(Wij/\text{fanout}(i))$$

where the sum is over prior nodes i and fanout(i) is the number of solid edges leaving prior node i. An even simpler method which did not divide by the fanout performs less well in the above example. The selected node is the one with the highest rank value, with ties being broken in an arbitrary manner. This method performs reasonably well.

A better ranking can be made by looking at the matrix Pij which is constructed by dividing each element in row i of the matrix Wij by the sum of the elements in row i of the matrix Wij and subtracting 1/n. In the event that all elements in the row i of Wij are 0, each element in row i of Pij is 0. A positive value Pij represents positive correlation between prior node i and candidate node j, while a negative value represents negative correlation. At least one element in row i of Pij will be non-negative. The use of probabilities helps to compensate for possible unpredictable absolute magnitudes in Wij due to window size in loop iterations and varying execution counts for the prior nodes. The rank rj of each candidate node j is determined as $$rj = \Sigma Pij \text{factor}(i)$$

where the sum is over rows i and factor(i) is a weighting factor applied to row i. Possible choices of factor(i) include but are not limited to: (a) factor(i)=1; all correlations are treated equally, (b) factor(i)=largest element in row i of Pij; stronger correlations are weighted more heavily, (c) factor(i) is chosen based on the row number that row i would have if the rows were sorted according to the largest element Pij in row i; factors decreasing with sorted row number would also emphasize stronger correlations more heavily (an extreme case would be to consider only the row with the largest element). In most programs, these different selections of the factor would lead to very similar performance improvements. In this particular illustration, method (b) will be used. Finally, the candidate node with the largest rank is selected, with ties being broken in an arbitrary manner.

The basic block which is inserted after block b in Step 2 of FIG. 12 is determined by constructing the matrix Wij (k=2, n=2):

|            | candidate node ||
| prior node | c | d |
|---|---|---|
| a | 5 | 4 |
| b | 5 | 4 |

The matrix Pij is constructed as described, giving:

|            | candidate node ||
| prior node | c | d |
|---|---|---|
| a | (5/9-1/2) = .056 | (4/9-1/2) = -.056 |
| b | (5/9-1/2) = .056 | (4/9-1/2) = -.056 |

The factor for row a is 0.056, and the factor for row b is also 0.056.

In Step 270, the rank for candidate c is (0.056)(0.056)+(0.056)(0.056)=0.006, while the rank for candidate d is (0.056)(-0.056)+(0.056)(-0.056)=-0.006. Therefore, in Step 272, candidate c is selected and added to the current chain since it has the highest rank.

The Steps 268 through 272 are then executed in a trivial manner since node 58 containing basic block e is the only node that can be executed after node 54 containing basic block c of FIG. 10. Therefore, Step 4 in FIG. 12 indicates that basic block e is inserted after the code segment block c. In a similar trivial manner, Steps 268 through 272 continue the instruction chain by adding basic block f to the executable file in Step 5of FIG. 12.

At this point, Step 268 determines that basic blocks g and h are the candidates to follow basic block f. This time, there are k=3 prior nodes c, e, and f and n=2 candidate nodes g and h. For Step 272, the matrix Wij is constructed as:

|            | candidate node ||
| prior node | g | h |
|---|---|---|
| c | 4 | 1 |
| e | 4 | 5 |
| f | 8 | 10 |

Pij is indicted below:

|            | candidate node ||
| prior node | g | h |
|---|---|---|
| c | (4/5-1/2) = .3 | (1/5-1/2) = -.3 |
| e | (4/9-1/2) = -.056 | (5/9-1/2) = .056 |
| f | (8/18-1/2) = -.056 | (10/18-1/2) = .056 |

The rank for node g is (0.3)(0.3)+(0.056)(-0.056)+(0.056)(-0.056)=0.084, while the rank for node h is (0.3)(-0.3)+(0.056)(0.056)+(0.056)(0.056)=-0.084. Therefore in Step 272, the node g will be the next one added to the current chain, as shown in Step 6 of FIG. 12.

Steps 268 through 272 then insert in a trivial manner the basic blocks i and j as indicated in Steps 7 and 8 of FIG. 12. Once Step 272 indicates that node 68 or basic block j is to be the selected node, no unselected nodes can now be reached from node j since node a has been previously selected and inserted in Step 1 of FIG. 12. Therefore, Step 262 is now executed, and the only unselected nodes in the graph of FIG. 10 are now nodes d and h. Node d is selected in Step 262 and since no nodes are unselected and reachable from Step 56 of FIG. 10 (node e has previously been selected and inserted in Step 4 of FIG. 12), the Steps 268 through 272 will insert d and Step 262 will then be re-executed since no non-selected node is found in Step 268. At this point, the remaining node in the FIG. 10 which is node 64 (representing basic block h) is selected and inserted as indicated in Step 10 of FIG. 12. Therefore, FIG. 12 clearly indicates that the correlation between the edge b and c and the edge f and g was detected by the method taught via FIGS. 6 though 12 whereas this correlation was not detected by the prior art FIGS. 1 though 5. Therefore, the method taught via FIGS. 6 through 12 provides a superior solution and more efficient computer instruction sequencing algorithm than that known in the prior art. The structuring of FIG. 12 is superior to the structuring of FIG. 5 since the structuring of FIG. 12 will result in better cache performance, fewer pipeline flushes and in general better performance than the ordering indicated by the prior art in FIG. 5. This superior re-ordering is made possible by the snapshot graph of FIG. 10 which indicates correlations between more than nearly adjacent pairs of instructions in a trace data file.

During the analysis step of the compilation process, the program flow structure of the code and not the code itself is analyzed in order to improve certain overall operational aspects of the program. A fundamental step in any compiler optimization technique is the analysis of the control flow in a program. The control flow structure of the program can be represented in a Control Flowgraph (CFG), and reduced into basic blocks or elementary flow structures. By organizing these elementary structures in a hierarchical fashion, the analysis of the entire program can often be simplified and speeded-up by combining analyses on the elementary structures. In a compiler application, this flowgraph would typically come from an original parsing of a user's source code into an abstract syntax tree. However, any task in which flowgraphs provide a useful means of representing the flow of any quantity may also be analyzed in this form. Examples could arise in scheduling of either physical quantities or information.

In the analysis step of the compiler function, it is desirable to decompose, i.e. transform, the program flow into single-entry-single-exit (SESE) regions or blocks, which will, in turn, allow the study and analysis of such blocks for purposes of program optimization. In the past, such decomposition has been possible only with so-called "strongly-connected" graphs, i.e. those in which flow can be traced from any one block to any other block in the program flow structure. However, that technique is not ideal for several reasons. First, a standard method of augmenting the original flowgraph edges by additional edges must be applied so that it is more likely that the original control flowgraph will be strongly connected. In general, this augmentation reduces the opportunities for finding SESE regions. Second, this standard method of augmenting the original flowgraph does not always generate a strongly connected flowgraph and the technique cannot be applied. This means that optimizations cannot be performed on all source programs. It is highly desirable to have a technique that requires less augmentation of the original flowgraph, which can handle both SESE and single-entry zero-exit (SEZE) regions, and which works for all flowgraphs whether they are strongly connected or not.

Further in the analysis step of a compiler operation, it is desirable to express the program in a hierarchical representation or format. As a minimum, it should show the nesting properties of the SESE regions, and ideally, the program representation should carry with it the entire control flow information. When expressed as a Program Structure Tree (PST), all hierarchical ordering of all canonical SESE regions is identified and defined only in a strongly connected (directed) control flowgraph, and although the PST carries the nesting information, it does not carry the full control flow. Moreover, since real flowgraphs are not necessarily strongly connected, there exists a need for a compiler which is able to analyze general programs, including those that are not strongly connected, and which is able to carry nesting information as well as full control flow information.

An important area of initial interest is that of decomposing or transforming a general (directed) flowgraph into a hierarchical structure based on canonical Single Entry Single Exit or SESE regions and canonical Single Entry Zero Exit (SEZE) regions. A SESE region is a sub-graph of a directed flowgraph which can be entered via only one edge of the graph and exited via only another edge of the graph. A SEZE region is a sub-graph of a directed flowgraph which can be entered via only one edge of the graph from which there is no exit. A canonical SESE region is one which cannot be further decomposed into SESE or SEZE regions. The simplest SESE region is a basic block: control enters the basic block by the first edge and leaves it by the second edge. Other SESE exemplary regions include sequences of SESE regions, "If-Then-Else" regions, simple loop regions and single entry—multiple exit loop regions.

Further, a more canonical and simpler SESE decomposition of a flowgraph may be possible if original nodes are split into two parts. Splitting a node in the control flowgraph may increase the number of canonical SESE or SEZE regions and increase the capability of the compiler to perform optimizations. The level of analysis of a flow by a compiler is enhanced by improving the decomposition of the flowgraph into its simplest SESE regions.

The construction of a hierarchical representation which carries the hierarchical ordering information, as well as the actual control structure, is valuable in rapidly analyzing the flowgraph. Ideally, the representation is easier to manipulate than the original control flow when transformations are applied to the flowgraph. After transformations have been carried out in the hierarchical representation, a new control flowgraph can be constructed. In a compiler context, for example, elimination of dead code and loop transformations may be effected at the hierarchical level. When all transformations at the hierarchical level have been carried out, a raw flowgraph suitable for the back end of a compiler may be generated.

The disclosed method for analyzing the control flow of a program for example, optionally includes a depth-first search of the directed graph to accomplish node-splitting. The idea is to split a node into a first part and a second part with an edge going from the first part to the second part. The outgoing edges of the original node are made outgoing edges of the second part, while the ingoing edges of the original node are divided into two categories. Those edges into the original node which can only be taken after the original node has been used are back edges and connected into the second part. The remaining edges are connected into the first part.

This splitting can help if the number of edges connected into the first part is greater than one. This step of node splitting can be accomplished at any time in the analysis method when the structure of any SESE block is not recognized by the compiler analysis program.

An edge is "1-reducible" if cutting it increases by one the number of disjoint parts of the graph. A pair of edges that are not "1-reducible" are "2-reducible" equivalent if cutting both of them increases by one the number of disjoint parts on the graph. For any choice of the depth-first search, the 1-reducible edges can be represented by a tree structure. An equivalence class will contain either all 2-reducible edges which are 2-reducible equivalent or a sub-set of 1-reducible edges from the tree structure. For strongly connected graphs, there would be no 1-reducible edges and 2-reducible equivalent edges would also be cycle equivalent. The disclosed method also applies to graphs which are not strongly connected as well as to graphs which are strongly connected. For such graphs, 1-reducible edges may be present and 2-reducible equivalence is not the same as cycle equivalence.

Next, a depth-first search is performed of the undirected multigraph obtained by dropping directional information from the original flowgraph. The resulting structure is simpler than one would obtain from a depth-first search on a directed flowgraph. The depth-first search is initiated from the start node of the graph. Next, the disclosed method finds a unique equivalence class descriptor for each edge. For a 1-reducible edge, this will be a new descriptor if there are no 1-reducible edges lower in the search tree or the descriptor already given to a 1-reducible edge lower in the search tree. For 2-reducible edges, the descriptor is determined using bracket-set methodology.

In accordance with the disclosed method, it is noted that for any set of cycle-equivalent edges in the undirected multigraph, there are at most, two chains of dominator edges in the original directed graph. For a strongly-connected graph there is exactly one. The next step includes performing a new kind of depth-first search of the original flowgraph to find the order of edges in each dominator chain of the original flowgraph. This step will lead to finding all SESE and SEZE regions in the original directed graph. In general, it is desirable to represent these dominator chains in a hierarchical representation. In the disclosed method, the ordering of edges in each dominator chain is used to construct a Reduced Flowgraph (RFG). The RFG is constructed from the deepest nested SESEs outwardly, by replacing each SESE in the original directed Control Flowgraph (CFG) by a generalized Flowgraph Edge (FGE). In general, an FGE represents either a bare edge or a SESE or SEZE region. The replacement can be made at constant time per edge provided that the FGE has pointers not only to the nodes that it connects, but also to which entrance or exit of the node it connects. The additional information associated with the FGE is a type indicating whether the edge is a bare edge, any of a predetermined set of structures, or neither of the above. In the latter case, the FGE is represented by the complete flow sub-graph in terms of the sub-graph's FGEs. The final representation is as a single FGE.

The representation also makes use of "Flowgraph Nodes" (FGN). The number of FGNs may increase over the original number of nodes due to node-splitting. Since the replacement is done in a bottom-up manner, the task of classifying a SESE's structure is greatly simplified. This reduces the number of "interesting" regions which need to be checked for, and the time it needs to check for them. An important example is a single-entry multiple exit loop. It is easier to identify this type of structure if all SESE regions it contains have been replaced by single edges. For the most important types of FGE, the flow structure is implicit rather than explicit, which makes manipulation easier. For the "None Of The Above" sub-graphs, the full control flow is still available. At any time, a walk of the RFG can renegotiate a complete flowgraph. Node splitting may be done at this point instead of at the front end as discussed earlier. The advantage is that the node splitting may have to be done on a smaller part of the graph. The advantage of doing node-splitting at the beginning is that it only needs to be done once. Nodes which may be split are those which, in the directed graph representation, have multiple forward edges directed into the node being considered.

In accordance with the method and apparatus disclosed herein, a flow structure may be represented in its hierarchical form in a Reduced Flowgraph, which carries both the SESE nesting properties as well as the original control flow information. This representation is well suited to carrying out optimizations such as dead code elimination or loop transformations in compiler applications. After the transformations have been performed, the representation carries sufficient information to reconstruct a new flowgraph which includes the effects of node splitting and flow rearrangement. A more detailed presentation of the method and apparatus discussed above is illustrated in the FIGS. described below.

While the disclosed method includes a number of steps, some advantage can be obtained even if not all of the steps are taken. For example, (I) the addition of node-splitting would improve performance for graphs which are not strongly connected; (ii) the disclosed method without node splitting would correctly handle graphs which are not strongly connected; (iii) the extra steps taken to produce a Reducible Flow Graph could be simplified to produce a Program Structure Tree. The set of new improvements introduced by the disclosed method are the individual methods for (I) node splitting, (ii) finding equivalence classes of 1-reducible and 2-reducible edges in graphs that need not be strongly connected, (iii) the finding of dominator chains using equivalence classes of 1-reducible and 2-reducible edges in graphs that need not be strongly connected, and (iv) constructing a hierarchical representation in the form of a reducible Flow Graph.

Figure 13:
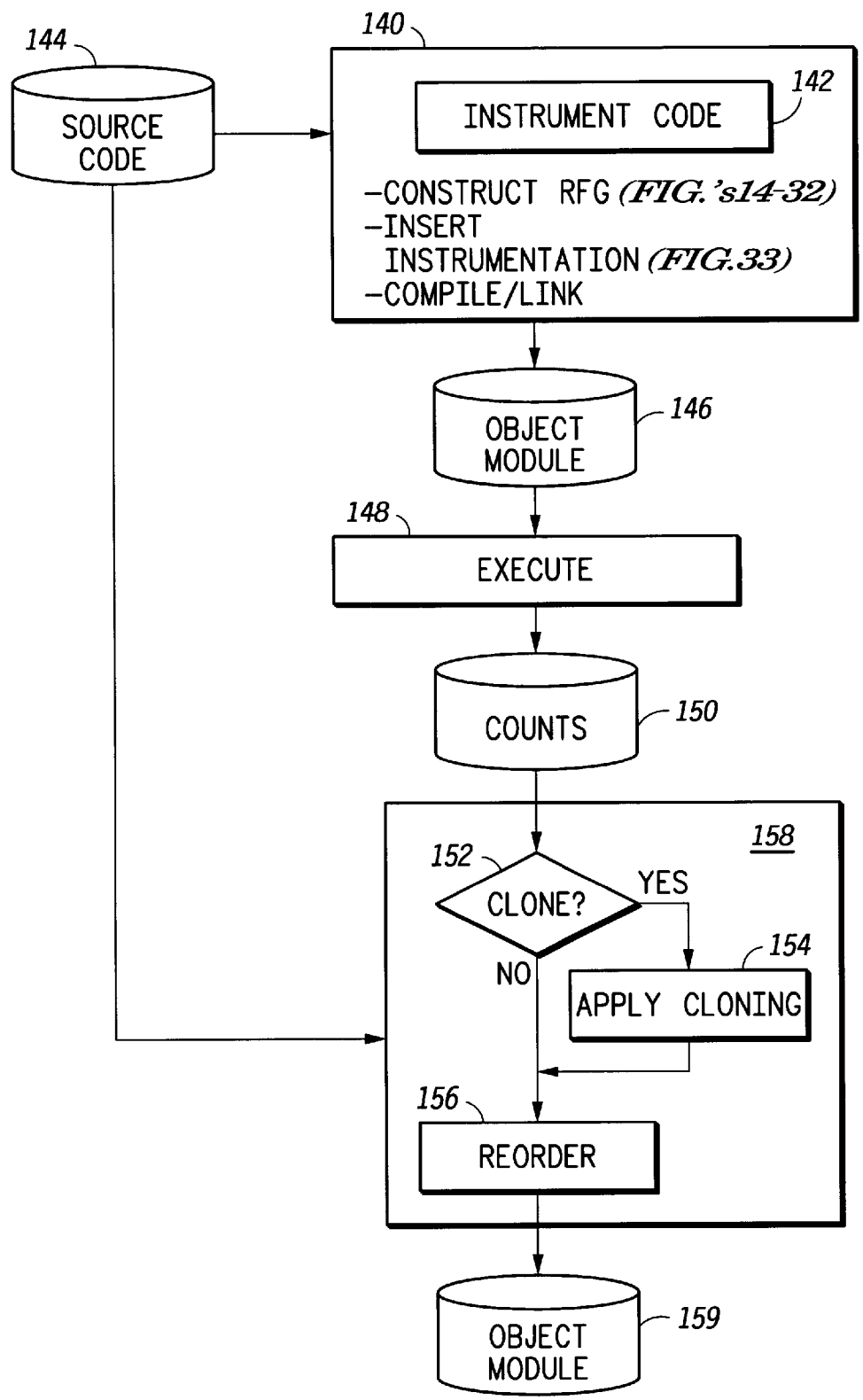
FIG. 13 illustrates an embodiment which instruments program code, then uses counts generated by the instrumentation to restructure computer instructions, in accordance with the present invention.

FIG. 13 illustrates a method which may be used to reorder computer code. FIG. 13 is similar to FIG. 7. In FIG. 13, source code 144 is provided in a manner similar to FIG. 7. The source code is accessed to construct a Reduced Flow Graph (RFG) structure (as subsequently taught in FIGS. 14–32). Instrumentation code which is used to capture trace information in a trace data file is inserted into the code in step 142. The source code along with the inserted instrumentation trace code is compiled in step 140 to produce an object module file 146. The object module is executed via a step 148 to create a "counts" file 150 which contains correlation information between basic blocks of code. Compiler 158 checks whether to clone code, step 152. If cloning is requested, step 152, it is performed, step 154. (see FIG. 43 for an example of cloning). The compiler 158 then reorders the code, step 156, and generates another object module 159 in a manner similar to FIG. 7. Note that through reordering of Source Code 144 is shown, this method also works with Object Code.

Figure 14:
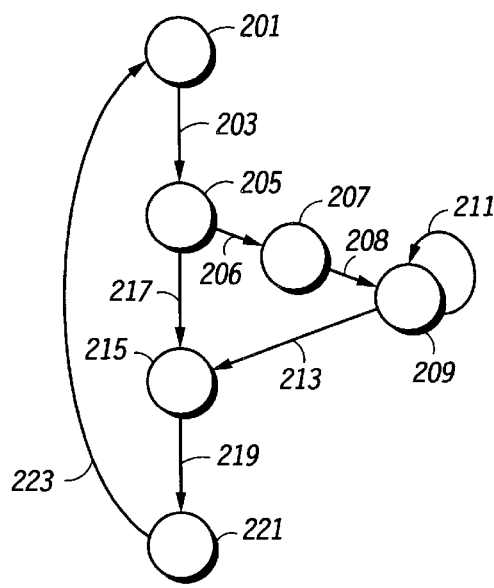
FIG. 14 is a control flowgraph representation illustrating a strongly connected flow.

In FIG. 14, the illustrated control flowgraph includes a so-called "bubble" 201 which leads to another "bubble" 205 through an "edge" 203. In control flowgraphs, "bubbles" represent one or more sequential operations performed by program routines or sub-routines at various levels of detail in a computer system, such as that illustrated in FIG. 6. In the present disclosure the term "bubble" is used interchangeably with equivalent terms including but not limited to the term "basic block" and the sequential operations may consist of "code statements", "routines", "sub-routines", "function calls", etc. An "edge" represents a directed transition to another bubble or basic block in a computerized operational control flow. Control Flowgraphs describe the sequence in which groups of operations are carried out by a program rather than the specific operations themselves.

Such graphs in various forms are utilized by compiler programs in order to optimize the structure of the programs represented by such graphs. As shown, bubble 205 is connected through edge 206, bubble 207 and edge 208 to bubble 209, at which edge 211 provides a loop structure. Bubble 209 is further connected to bubble 215 through edge 213, and bubble 215 is then connected through edge 219 to bubble 221. Bubble 205 is also connected to bubble 215 through edge 217, and bubble 221 loops back to bubble 201 through edge 223. FIG. 14 is shown to illustrate the definition of a "strongly connected" control flowgraph i.e. one in which every referenced point or node on the graph is connected through at least one explicit path to every other node on the graph, including the referenced node or point itself. For example, from bubble 207, bubble 205 may be reached by the path consisting of edge 208, bubble 209, edge 213, bubble 215, edge 219, bubble 221, edge 223, bubble 201 and edge 203.

Figure 15:
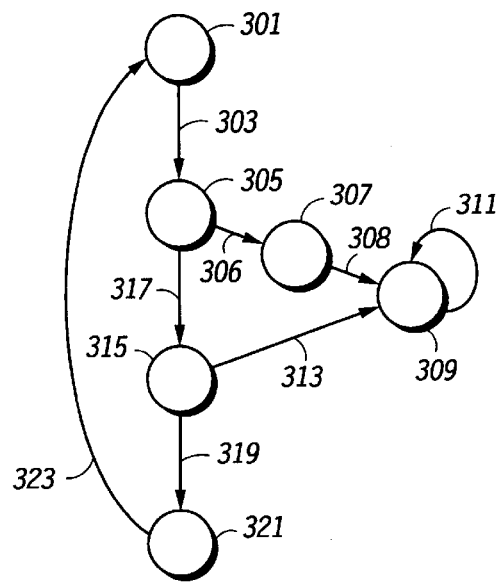
FIG. 15 is a control flowgraph representation illustrating a flow which is not strongly connected.

FIG. 15 illustrates a control flowgraph that is not "strongly connected". In FIG. 15, bubble 301 is connected through edge 303 to bubble 305 which, in turn, is connected by edge 306, bubble 307, and edge 308 to bubble 309, at which point edge 311 provides a loop structure. Bubble 305 is also connected by edge 317 to bubble 315 which connects by edge 313 to bubble 309. Bubble 315 also connects by edge 319 to bubble 321 and thence by edge 323 to bubble 301. For the illustrated graph, the only bubble which can be reached from bubble 307 is bubble 309, so the graph is not strongly connected and prior procedures could not be used to analyze its control flow.

Accordingly, the control flowgraph illustrated in FIG. 15 is, by definition, "not strongly connected". The difference between "strongly connected" and "not strongly connected" control flowgraphs is significant since, before the present disclosure, an efficient means of analyzing the SESE and SEZE structure of graphs which are not strongly connected, and using that analysis for performing optimizations with respect to structure, content and speed was not available. The present invention provides a method and apparatus for compiler optimization of the majority of programs which are considered to be "not strongly connected" as hereinbefore noted.

Typically a control flowgraph will be augmented before the described analysis is performed. That augmentation usually involves (I) the introduction of a START node with edges to all entries to the function, (ii) the introduction of an END node with edges from all returns from the function, and (iii) an edge from the END node to the START node. To use the method described, the END node and the edge from it are not needed. The method will work if those last two augmentations are made, but it can, in many cases, give a better structural analysis if the augmentations are not made.

Figure 16:
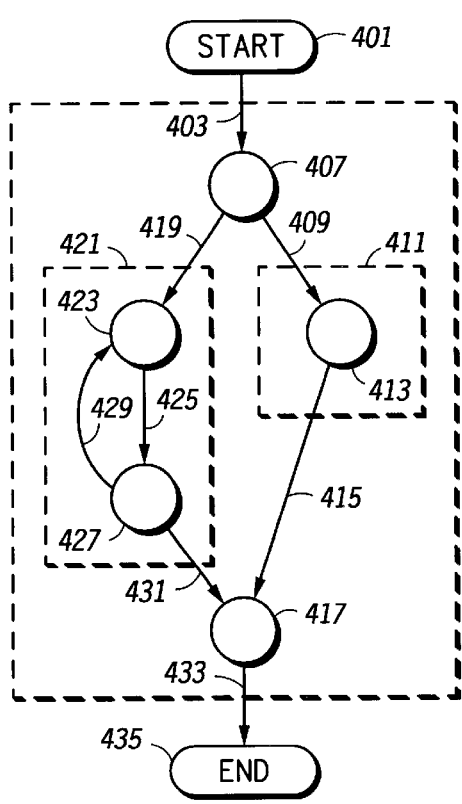
FIG. 16 is a control flowgraph representation illustrating Single-Entry Single-Exit (SESE) regions.

In the control flowgraph illustrated in FIG. 16, a START node 401 is connected to bubble 407 through edge 403. Bubble 407 is then connected to bubbles 413 and 423 through edges 409 and 419, respectively. Bubble 423 is connected to bubble 427 through edge 425, and bubble 427 loops back to bubble 423 through edge 429. Bubble 427 and 413 are directed to bubble 417 through separate paths or edges 431 and 415, respectively. Bubble 417 is directed to an END node 435 through edge 433. FIG. 16 illustrates the process of defining or identifying Single Entry Single Exit (SESE) regions in a control flowgraph. Specifically, region 411 is an SESE region since there is only one path into the region and one path exiting the region. If taken alone, bubble 423 would not constitute an SESE region since there are two paths into the bubble 423 and one path exiting. However, if bubble 423 and bubble 427 are taken together, the combination does define a SESE region 421, which includes a single entry (i.e. edge 419) and a single exit (i.e. edge 431). Similarly, if all of the bubbles and edges between the START node 401 and the END node 435 are taken together, another SESE region 405 may be identified or defined. It is noted that the existence of regions that are not SESE regions in control flowgraphs makes it very difficult and complicated for compiler analysis and optimization of such graphs. The method disclosed however, is implemented through the breakdown of such graphs into SESE regions for more direct compiler analysis and optimization.

Figure 17:
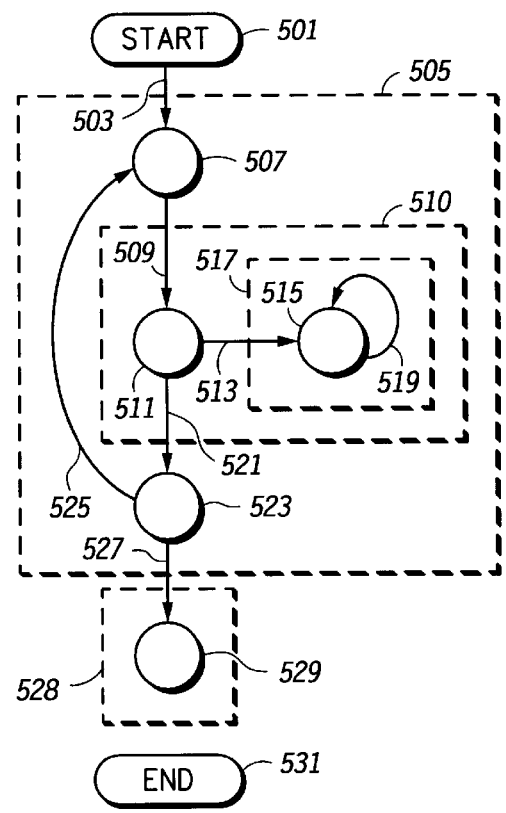
FIG. 17 is a control flowgraph representation illustrating Single-Entry Zero-Exit (SEZE) regions.

In FIG. 17, a START node 501 is directed by edge 503 to bubble 507 which, in turn, is directed through edge 509 to bubble 511. Bubble 511 is connected to bubble 515 through edge 513. Bubble 515 includes a loop 519. Bubble 511 is also directed to bubble 523 through edge 521. Bubble 523 is directed to bubbles 529 and 507 through edges 521 and 525, respectively. An END node 531 is shown not connected to any other node although it is shown as following bubble 529 in a downward flow. FIG. 17 illustrates Single Entry Zero Exit (SEZE) regions 517 and 528 which have one entry edge and zero exit edges. These SEZE regions 517 and 528 are included in the same graph as SESE regions 505 and 510 for example. Also illustrated is the "nested" SEZE region 517 within the SESE region 510.

Figure 18:
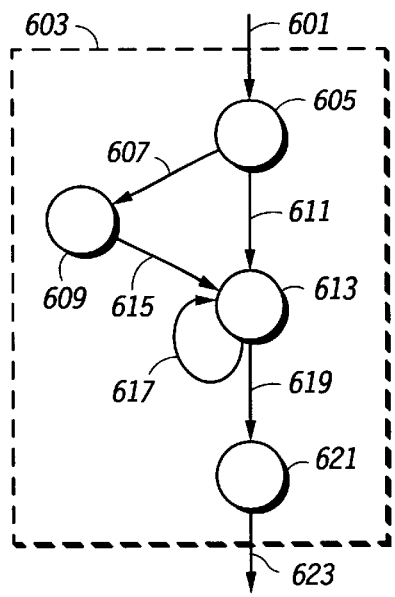
FIG. 18 is a control flowgraph representation illustrating the application of node-splitting.
Figure 19:
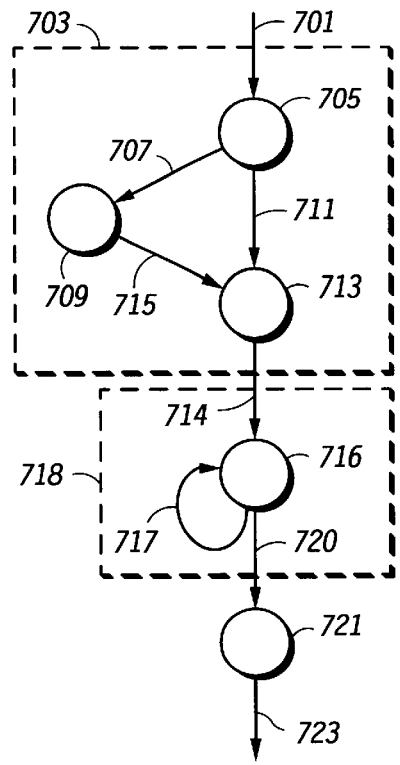
FIG. 19 is a control flowgraph representation which shows the function and result of node-splitting.

FIG. 18 and FIG. 19 are illustrative of the function of "node splitting". In FIG. 18, a control flowgraph section is shown before the application of the node splitting function. An edge 601 leads to bubble 605, which, in turn is directed to bubbles 609 and 613 through edges 607 and 611, respectively. Bubble 609 is directed to bubble 613 through edge 615. Bubble 613 includes loop 617 and is also connected to bubble 621 through edge 619. Edge 623 is shown leading out of bubble 621. The region between edges 601 and 623 comprises a SESE region 603. It is noted that node or bubble 613 as shown in FIG. 18, represents an extremely difficult node for compiler analysis and optimization since, in addition to an inside loop-back 617, the bubble 613 also has two edges in 611 and 615 and one edge out 619. As shown in FIG. 19, a "node splitting" function may be implemented in order to further simplify the graph and facilitate its analysis and optimization.

The graph of FIG. 18 is shown after "node splitting" in FIG. 19. Edge 701 is directed to bubble 705, which, in turn, is directed to bubble 709 and bubble 713 through edges 707 and 711. Bubble 709 is also connected to bubble 713 through edge 715. Bubble 713 is directed to bubble 716 through edge 714. Bubble 716 includes a loop 717 and is connected through edge 720 to bubble 721, from which edge 723 leads to other portions of the graph which are not shown. FIG. 19 includes SESE regions 703 and 718. It is noted that, in implementing the node splitting function, a "null" node or bubble 713 has been added. The null node 713 contains no attribute information associated therewith and is added for the purpose of permitting the creation of SESE region 718 in order to facilitate compiler optimization of the program represented by the control flowgraph shown in FIG. 18.

Figure 20:
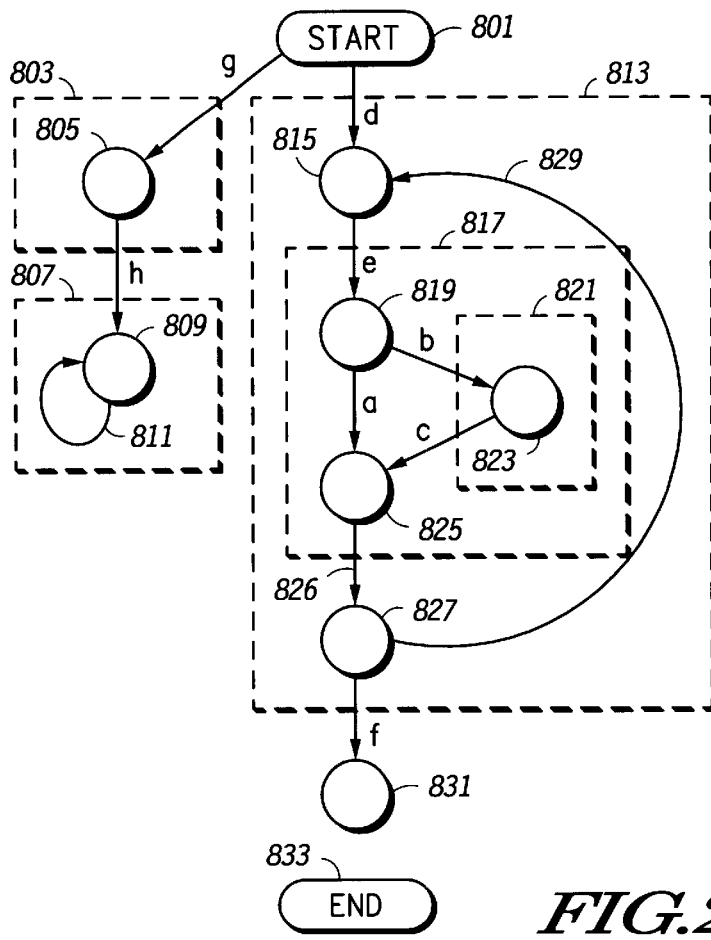

In FIG. 20, a START node 801 is directed through edge "g" to bubble 805, which, in turn, is directed by edge "h" to bubble 809. Bubble 809 includes loop edge 811. Bubble 805 is identified as a SESE region 803 and bubble 809 including loop 811 is identified as SEZE region 807. The START node 801 is also directed to bubble 815 through edge "d". Edge "e" directs bubble 815 to bubble 819 which, in turn, is connected to bubbles 823 and 825 through edges "b" and "a", respectively. Bubble 823 is directed to bubble 825 through edge "c", and bubble 825 is then directed to bubble 827 through edge 826. Bubble 827 is looped back to bubble 815 through edge 829, and is also directed to bubble 831 through edge "f". An END node 833 is illustrated at the bottom of the graph although it is not shown connected to any node. SESE region 803 includes bubble 805 and SESE region 807 includes bubble 809 and loop 811. SESE region 813 encloses all bubble and edges between edges "d" and "f". SESE region 821 represents a nested SESE region within another SESE region 817 which itself represents a nesting within SESE region 813. Also, SESE region 821 is a so called "canonical" SESE region since it is the smallest such region and cannot be decomposed into any other smaller SESE regions. SESE region 817, for example, is a SESE region but is not a canonical SESE region since it can be decomposed into SESE region 821. FIG. 20 illustrates a control flowgraph with SESE regions defined and FIGS. 21 through 27 illustrate the "transformation" step by which the graph is still further simplified and reduced to a "Reduced Flowgraph" (RFG) for purposes of facilitating analysis and optimization of the program loop structure. The Reducible Flowgraph structure is obtained by replacing each SESE region in the original flowgraph by a single edge which describes the structure. Examples of structure are "bare edge", "single node", "if-then-else block", "single-entry-multiple-exit loop", "DAG" (i.e. Directed Acyclic Graph), etc. All of the simple structures can be represented implicitly rather than through a flowgraph. This makes manipulation, such as in-loop transformations, simpler. After transformations are done, the RFG can be used to generate a new control flow graph.

In FIG. 21, the portion of the FIG. 20 control flowgraph containing bubbles 819, 823 and 825 and edges "a", "b" and "c" are shown as being transformed into a simpler representation including only bubbles 819 and 825 connected with edge "a" and new edge "b". Edge "b" therefore has been substituted for bubble 823 and original edges "b" and "c" as specifically shown in FIG. 22. It can be seen that the new representation in FIG. 21 is much simpler and easier to work with for purposes of a compiler optimization function. FIG. 23 shows a further transformation in which bubbles 819 and 825 and edges "e", "a" and "b" are transformed into a single edge designated "e". Further in FIG. 24, bubbles 815 and 827 and edges "d" and "e", including loop 829, are transformed into a new edge "d". FIG. 25 shows a transformation from bubble 805 and edges "g" and "h" to a new edge "g" and FIG. 26 illustrates a transformation from bubble 809 and loop edge 811 into a single new edge representation designated "h". Through the illustrated transformations, the original control flowgraph shown in FIG. 20 can be reduced and represented in a Reduced Control Flowgraph shown in FIG. 27 which includes a START node 901 and edges 903 and 907 with attribute files 905 and 911 containing the information originally presented in FIG. 20.

The node and edge data structures represent the basic components of the control flow graph. Their fields include the following:

| Item | Components |
|------|------------|
| Node | Successor Edges |
|      | Predecessor Edges |
|      | TreeNode |
| Edge | Node (from) |
|      | Node (to) |
|      | Class |
|      | Flag |

The flowgraph 1000 consists of Nodes and Edges. Each Node has a number of outgoing Edges. Each Edge goes from one Node to another Node. Directed Flowgraph 1015 has Nodes and Edges just like the original flowgraph 1000. It may have more Nodes and Edges, due to the augmentation step 1005 or the node splitting step 1110. That is one circumstance in which the number of nodes and edges might not remain constant.

Figure 28:
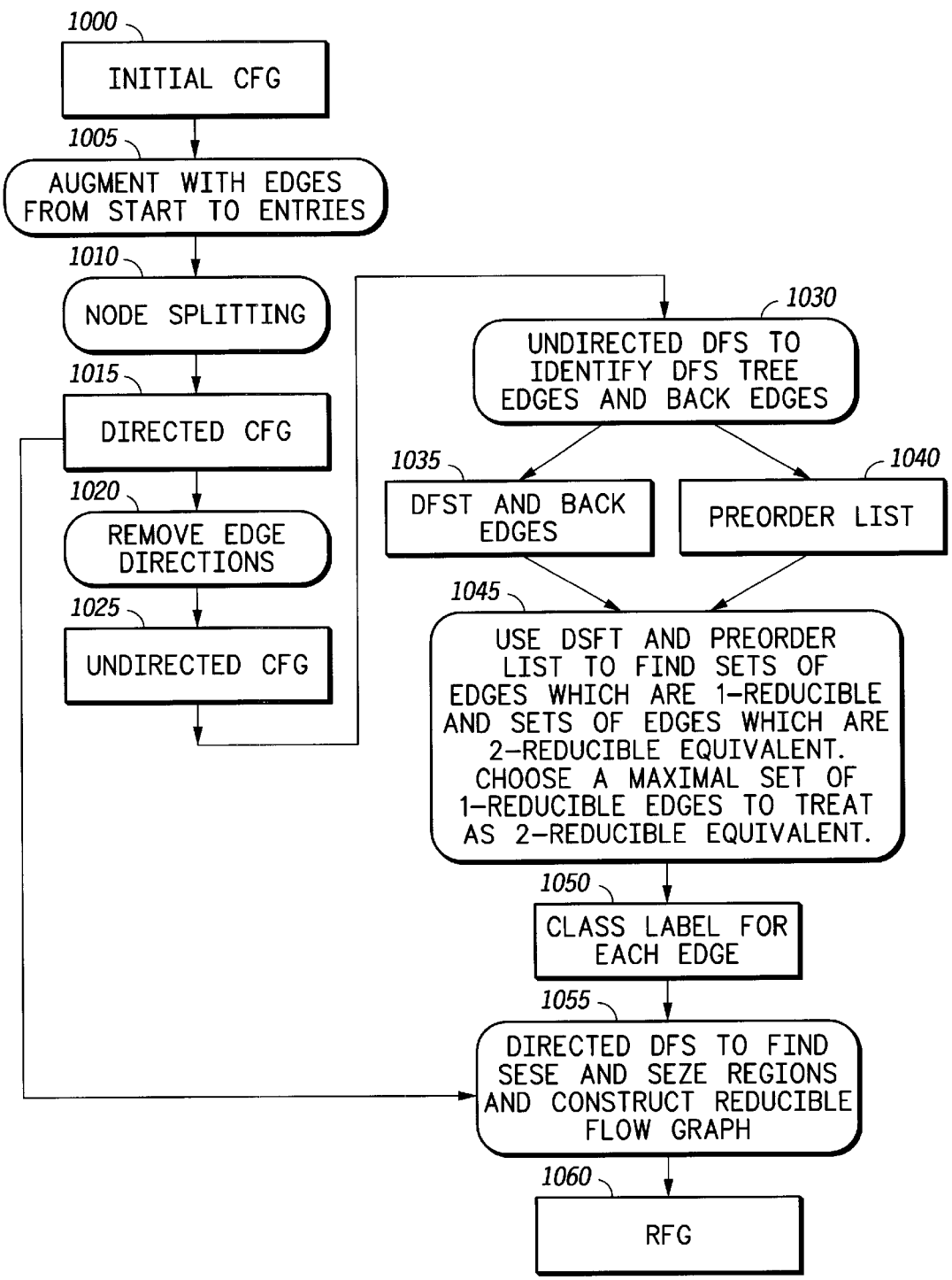
FIG. 28 illustrates the sequence in which the steps of the method are applied as well as the structures which are constructed as the method progresses.

FIG. 28 illustrates the sequence in which the steps of the method are applied as well as the structures which are constructed as the method progresses. In general, the rectangular boxes in FIG. 28 represent structural information, while the elliptical bubbles represent the application of a method. Box 1000 represents an initial control flow graph or any other directed graph. The method will determine a maximal set of SESE/SEZE chains for this graph. In addition, the method also generates a reducible flow graph representing the original control flow graph. In step 1005, a new "start" node is added to the original control flow graph if the original directed graph of box 1000 had multiple entries. The "start" node has an edge directed to each of the original entries of the control graph of box 1000. If the original control flow graph only had one entry, then this augmentation is not necessary and the "start" node may be taken to be simply the unique entry of the control graph of box 1000.

In step 1010, an optional node splitting operation is performed on the augmented graph resulting from step 1005. The purpose of this step is to modify the control flow graph so as to expose greater possibilities for finding SESE/SEZE regions. The method by which this step is carried out is illustrated in more detail in FIGS. 11 and 12. It is not essential that this operation be performed, but a better analysis of many flowgraphs will be obtained if this step is applied either once at this stage or possibly multiple times whenever an SESE/SEZE region has been identified. The result of this step is a directed control flow graph, represented by box 1015.

Step 1020 turns the directed graph represented by box 1015 into an undirected graph represented by box 1025. In a common representation, each node in the directed graph has a set of edges to other nodes in the directed graph. This set is customarily represented by an array structure or by a list structure. The array structure is more efficient if the number of edges will stay constant, while the list structure may be more efficient if the number of edges may change in the application to which the control flow analysis is being applied. In the undirected graph, each node needs to have the set of edges to or from other nodes. This set may be represented by one or two array or list structures. The set of edges into a node can readily be determined by going through each node in the directed graph and adding each of its outgoing edges as an ingoing edge to the node which it goes.

In step 1030, an undirected depth-first search (DFS) starting at the "start" node is used to determine a depth-first ordering 1040 of the undirected graph 1025 and a depth-first search tree graph (DFST) representation 1035 of the undirected graph. In the tree graph representation, each of the edges in the graph 1025 is classified as either a "forward" edge or a "backward" edge. The method by which step 1030 is carried out is described in more detail in FIG. 31. For most graphs, arbitrary choices associated with a depth-first search mean that there is not a unique DFST associated with the undirected graph 1025. Any of these legitimate choices will be acceptable. In step 1045, a "bracket set" method is used to find 1-reducible and 2-reducible edges and to construct equivalence classes of edges.

Figure 32:
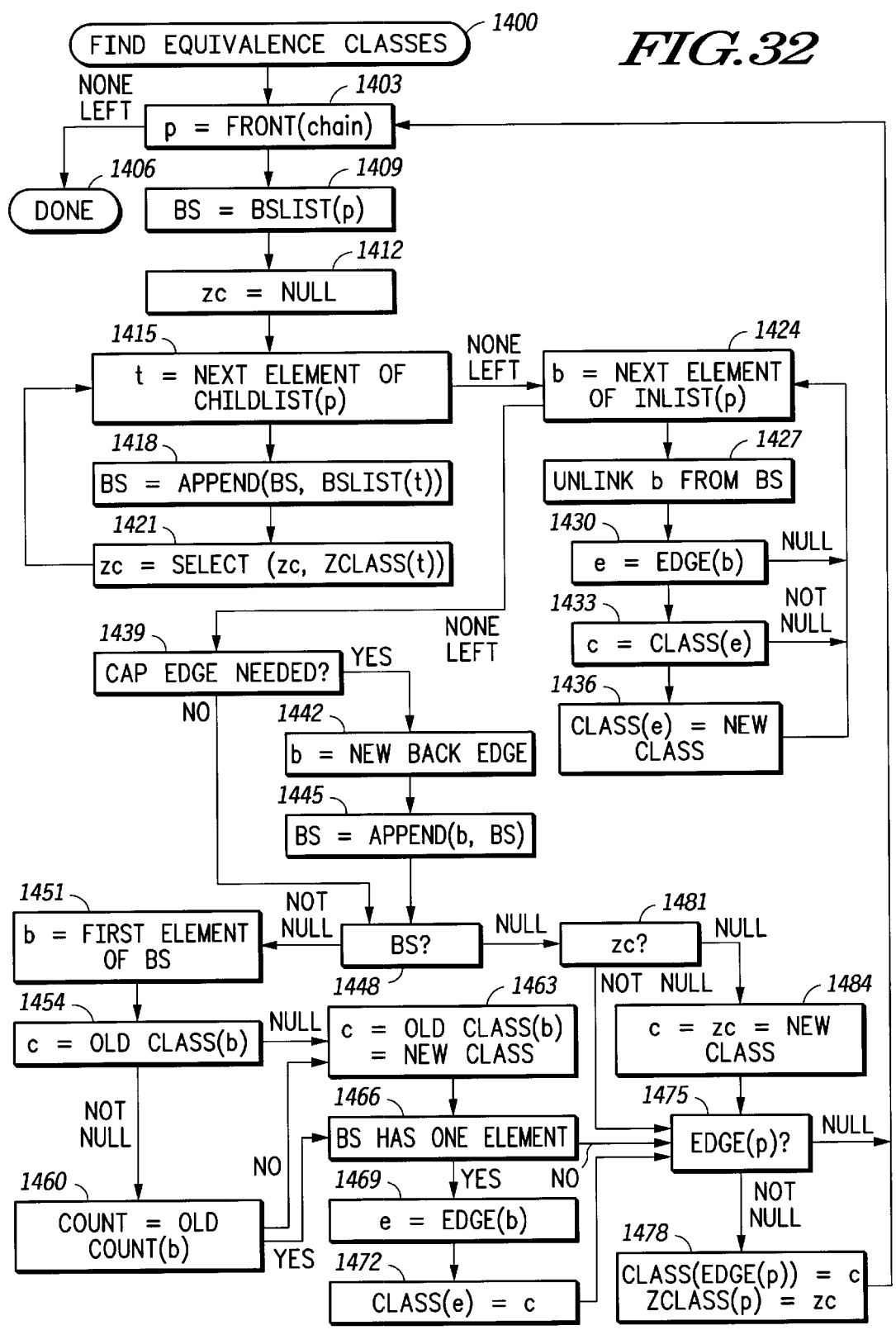
FIG. 32 shows how a Class is assigned to each Edge.

The details of step 1045 are illustrated in FIG. 32. The bracket set method offers several novel aspects. The method deals successfully with graphs which have 1-reducible edges while the prior art methods do not. In addition, the bracket set method deals with a less restrictive goal than the prior art methods. The new method finds a more general set of equivalence classes. If two edges are cycle equivalent, they will be assigned to the same equivalence class by the new method. However, the new method will also assign two edges which are 2-reducible-equivalent to the same equivalence class. One-reducible edges form a tree structure starting from the "start" node, and the new method will also assign as many pairs of 1-reducible edges as possible to equivalence classes with other 1-reducible edges.

The result of step 1045 is that each edge in the undirected flowgraph 1025 is assigned to a class. This assignment is represented by box 1050. Since these are the same edges as in the directed flowgraph 1015, it also means that each edge in the directed flowgraph 1015 is assigned to a class. In step 1055, the directed flowgraph 1015 and the class assignment of each edge 1050 are used to do a directed DFS starting with the "start" node of the directed flowgraph which finds chains of edges in which each edge in the chain dominates the edges in the chain which follow it. That process leads to a Reducible Flow Graph 1060.

Figure 33:
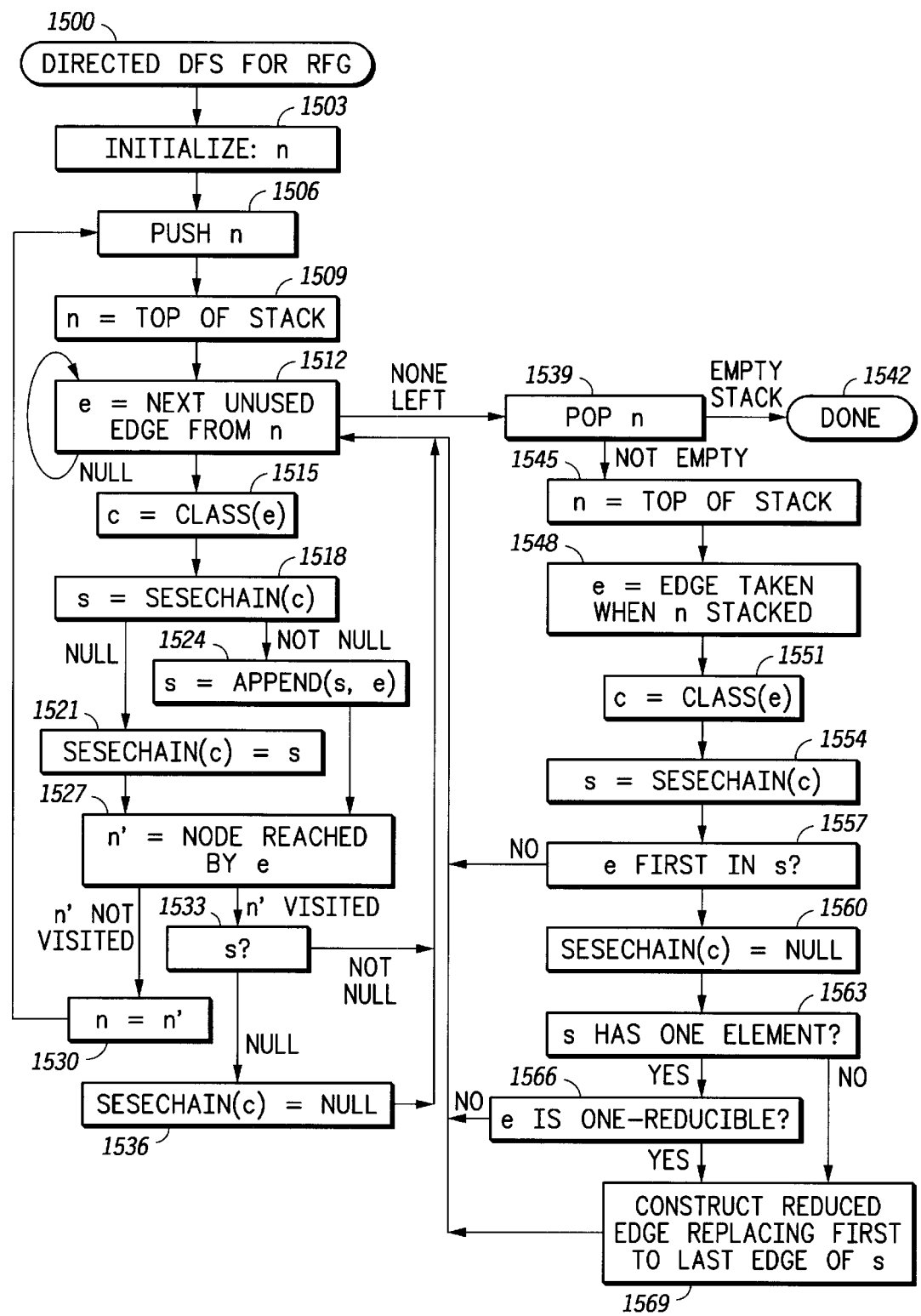
FIG. 33 illustrates how the construction of the Reduced Flowgraph (RFG) is performed by a directed depth-first search (DFS).

The details of step 1055 are illustrated in FIG. 33. In contrast to the prior art, the new method works correctly even with 1-reducible and other classes of edges which are not cycle-equivalent. The new method will in fact correctly construct a maximal set of SESE chains including chains which contain edges which are not cycle equivalent or which are 1-reducible. An example of a chain that includes edges that are not cycle equivalent but are 2-reducible equivalent appears in FIG. 15. Edges 306 and 308 are 2-reducible equivalent but are not cycle equivalent. The disclosed method correctly deduces that node 307 and edges 306 and 308 constitute a SESE region. As a result, the new method deals with original control flow graphs 1000 which are not strongly connected. For strongly-connected graphs, prior art methods constructed a Program Structure Tree which showed the nesting properties of the SESE regions which were found. The new method could easily be used to construct a Program Structure Tree, but FIG. 33 shows how to construct a new structure, the Reduced Flow Graph (RFG) in which each chain of SESE/SEZE regions is replaced by a single edge in the RFG. This replacement is carried out "bottom up", so that the resulting RFG may have dangling edges but has no explicit SESE/SEZE regions.

In addition to representing the hierarchical containment of one SESE region inside another as the Program Structure Tree does, the new representation also carries the complete control flow of the original flowgraph 1000.

The undirected flowgraph 1025 has Nodes and Edges as well. Now, however, the undirected flowgraph 1025 has both incoming and outgoing Edges. It is convenient to choose a representation so that the same structure can represent both box 1015 and box 1025. For example, each Node can be associated with an array of Edges consisting of the outgoing Edges followed by the incoming Edges, and how many of each. This is convenient for both undirected and directed depth-first searches. It is also useful to have the Edge have a flag to indicate whether it has been used or not, so that in an undirected DFS each Edge will be traversed only once.

In carrying out the undirected DFS 1030, it is useful to build up the DFST structure as well as keeping the back edges. Since this information is not needed once the RFG is constructed, it is convenient to generate a separate "TreeNode" structure.

| TreeNode | Node |
| --- | --- |
| | Edge |
| | ChildList (of TreeNodes) |
| | InList (of BackEdges) |
| | BSList (of BackEdges) |
| | ZClass (a Class) |

A TreeNode structure is generated each time a Node is entered for the first time in the undirected DFS. The TreeNode points to the Node, the Edge which was used to enter the Node, a ChildList of TreeNodes which will be reached directly from the TreeNode, an InList of BackEdges in the DFST pointing to the TreeNode, a "BSList" of BackEdges in the DFST leaving the TreeNode and a "ZClass" which identifies a 1-reducible Class associated with the Edge entering the TreeNode.

The present BackEdge structure is a structure for representing "bracket sets".

| BackEdge | Edge |
| --- | --- |
| | Count |
| | OldClass |
| OldCount | Earliest |
| Class | SESEChain |

It is implemented as an element in a doubly-linked list, so that deletion from a list of BackEdges can be done quickly. Some other structures are needed in a BackEdge structure for representing "bracket sets", but the values of these structures are only important for the first element in a BSList. In general, a "bracket set" is characterized by the BackEdge which is its first element and by the number of members in the list. This means that the BackEdge contains a Count structure. It also contains "OldClass" and "OldCount" fields representing the last equivalence class and the number of members of the "bracket set" when the BackEdge was earlier, if at all, the first element in the BSList. It also contains Earliest, the depth of the earliest-constructed TreeNode reached by any BackEdge in the BSList. Finally, a Class will be assigned to each Edge, so each Edge needs a Class component. In addition, in step 1055, each Class needs an SESEChain component which will be used in finding SESE/SEZE regions and in reducing the flowgraph.

Figure 29:
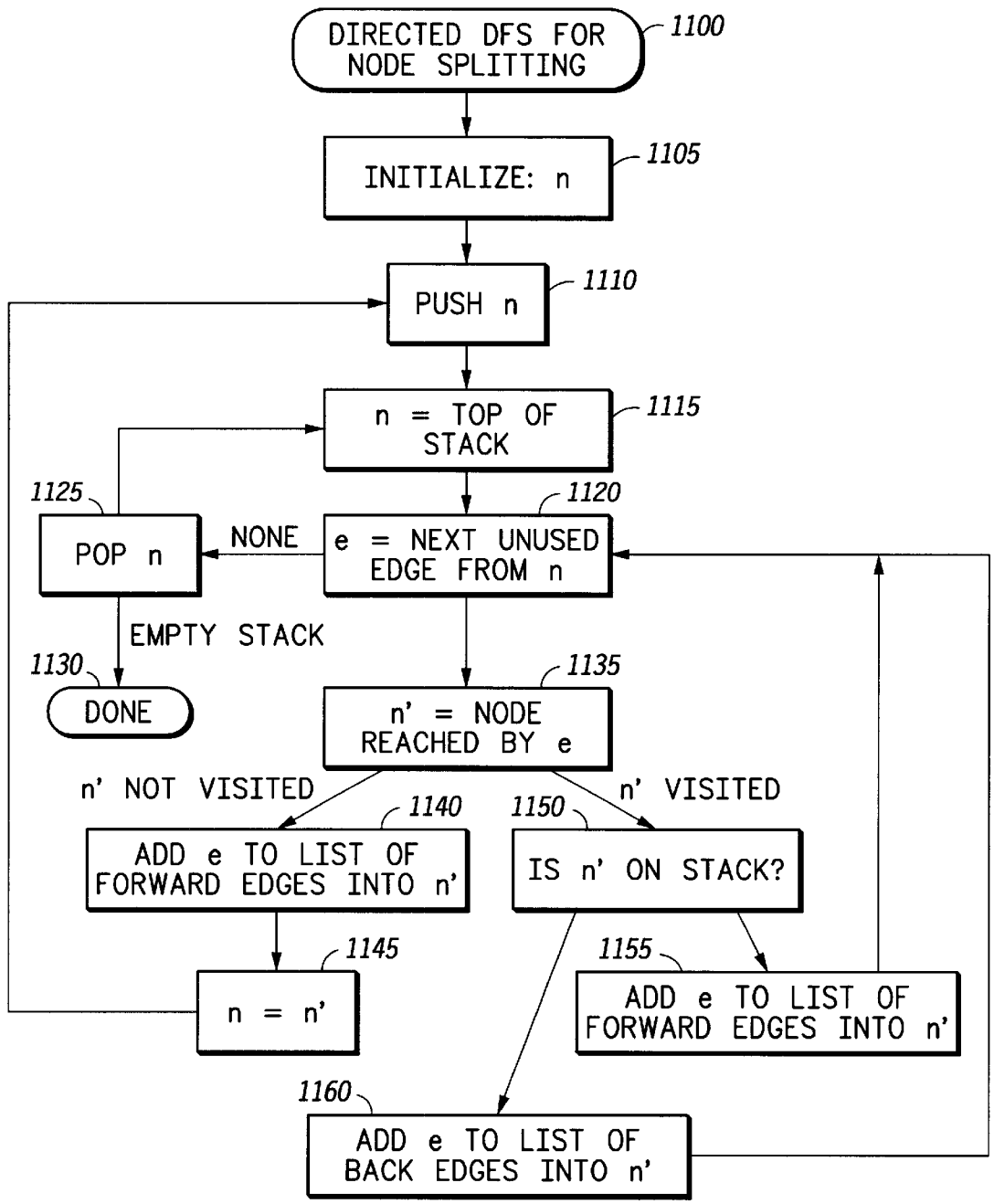
FIG. 29 represents a directed depth-first search (DFS) used for node splitting.

FIG. 29 represents a directed DFS used for node splitting. The object is to do a directed DFS and to distinguish for each Node the back Edges going into it from the forward or cross edges going into it. In doing the DFS, Nodes will be placed on an instruction stack. An edge from a Node N to a Node M will be considered a back Edge if while the edge is being considered, Node M is on the stack. The DFS starts in step 1100. The Node "n" is initialized to the "start" Node in step 1105. In step 1110, the Node "n" is pushed onto the stack. In step 1115, the Node "n" is reset to the Node on the top of the stack. In step 1120, the Edge "e" is taken as the next edge not yet visited from Node "n". If there are no Edges out of Node "n" which have not been tried, step 1125 pops Node "n" off the stack. If the stack is not empty, the method resumes with step 1115. If the stack is empty after Node "n" is popped, the DFS is complete in step 1130. The node splitting then proceeds as described with step 1200 of FIG. 30.

If step 1120 finds another Edge "e", step 1135 looks at the Node "n'" reached by Edge "e". If Node "n'" has not been visited, then step 1140 adds Edge "e" to a list of forward Edges into Node "n'". Then Node "n" is set to Node "n'" in step 1145 and the method continues at step 1110. If Node "n'" has been visited, then step 1150 determines whether Node "n'" is on the stack. If it is not, then the Edge "e" is added to a list of forward Edges into Node "n'" in step 1155 and the method proceeds with trying the next Edge in step 1120. If it is, then Edge "e" is added to a list of backward Edges into Node "n'" in step 1160 and the method proceeds to the next candidate Edge in step 1120. A simple way of determining whether the Node "n'" is on the stack or not is to flag each Node as "on the stack" when it is pushed and to unflag it when it is popped "off the stack". This is a common procedure.

Figure 30:
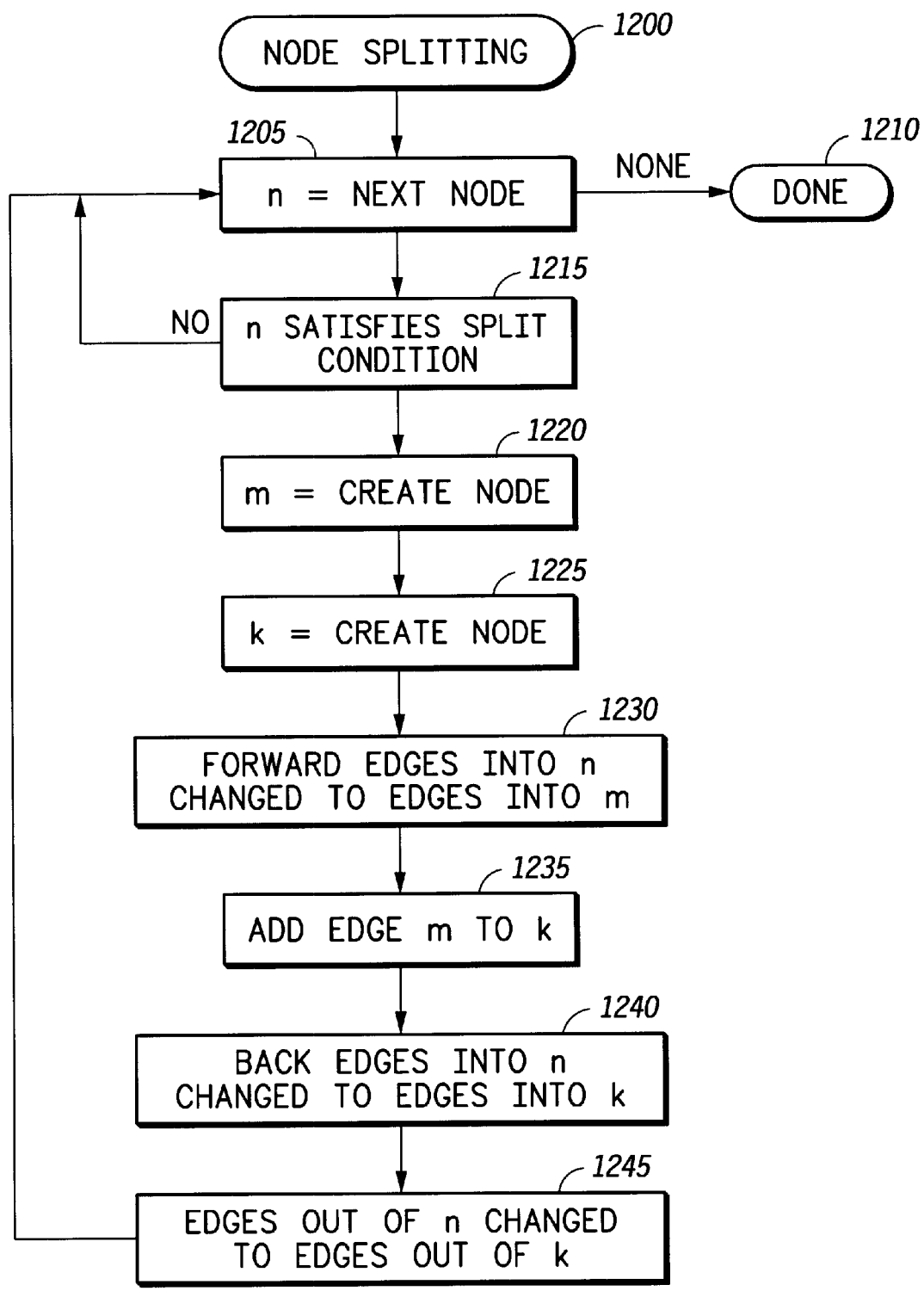
FIG. 30 shows how the Node splitting is done once the DFS of FIG. 11 has been performed.

FIG. 30 shows how the Node splitting is done once the DFS of FIG. 29 has been performed. Node splitting starts in step 1200. The Nodes are considered in any convenient order. In step 1205, Node "n" is selected as the next Node. If there are none left, then in step 1210 the Node splitting finishes. Otherwise, step 1215 checks to see if more than one forward edge enters Node "n" or both the number of backward edges entering Node "n" is greater than 0 and the number of edges leaving Node "n" is greater than 1. If not, then the method resumes in step 1205 with the next Node. If so, then Node will be split. In steps 1220 and 1225, two new Nodes "m" and "k" are created. The forward Edges that used to go into Node "n" are moved to go into Node "m" in step 1230. A single Edge is added from Node "m" to Node "k" in step 1235. The back Edges that used to go into Node "n" are moved to go into Node "k" in step 1240. Finally the edges that used to leave Node "n" are switched to leave Node "k" in step 1245. The process resumes with the next Node in step 1205.

Semantically, the new Node "m" introduced in step 1220 has no operations to be carried out. Any operations to be carried out by the original Node "n" are to be carried out by the new Node "k" introduced in step 1225.

Figure 31:
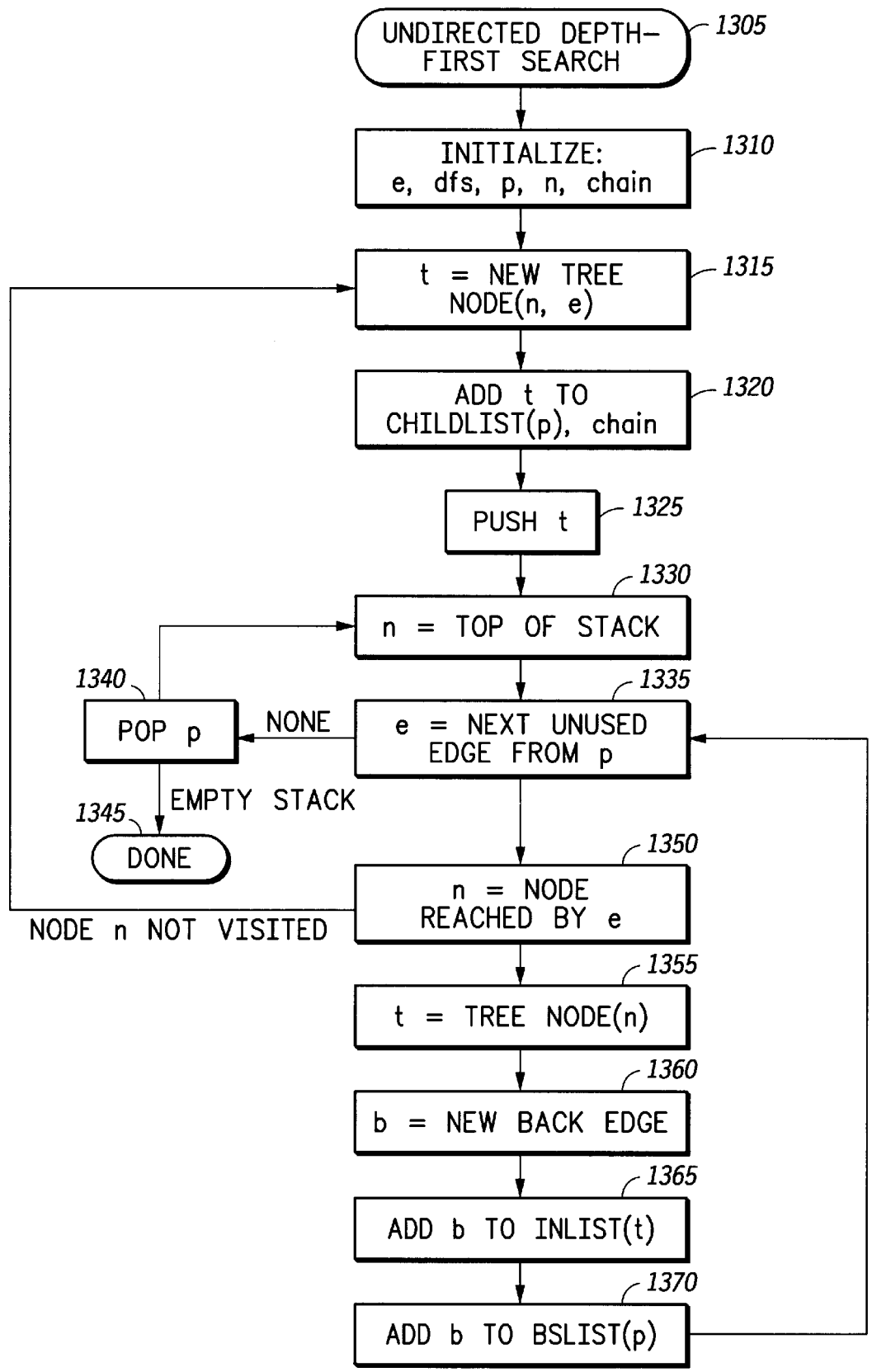
FIG. 31 shows how an undirected DFS is used to construct a DFST from the undirected graph.

FIG. 31 shows how an undirected DFS is used to construct a DFST from the undirected graph. Also built up are the ChildList, InList, BSList structures which will be used in FIG. 32 to find the Class associated with each Edge. The undirected DFS begins in step 1305. Initialization in step 1310 sets Edge "e" to NULL, the depth-first-search number "dfs" to the value 0, the parent TreeNode "p" to NULL, Node to the "start" Node, and a list of TreeNodes "chain" to be an empty list. In step 1315, a new TreeNode "t" is constructed from Node "n". It is assigned as its dfs number the value of "dfs" and then "dfs" is incremented by 1. The "t" and the "n" are made to point to each other. In addition, TreeNode points to the Edge "e". In step 1320, TreeNode "t" is added to the ChildList of TreeNode "p" if "p" is not NULL. Also, TreeNode "t" is appended to the front of "chain". In step 1325, TreeNode "t" is pushed onto a stack.

In step 1330, TreeNode "p" is set to the value of the top of the stack. In step 1335, "e" is set to the next Edge out of the Node pointed to by "p". If there are no Edges left for that Node, step 1340 pops "p" off the stack. If that leaves a non-empty stack, control continues in step 1330. If an empty stack is left, the DFS is done in step 1345, and the equivalence classes may be found as shown in FIG. 32.

In step 1350, Node "n" is set to the Node reached by following Edge "e". If that Node has not been visited yet, the method continues with step 1315. Otherwise, TreeNode "t" is set to the TreeNode associated with Node "n" in step 1355. In step 1360, a new BackEdge "b" is created. All components other than Edge are initialized to NULL values. This is added to "t"'s InList in step 1365. It is also linked into the front of "p"'s BSList in step 1370, maintaining the Count correctly. In addition, the Earliest field of the BSList is maintained. The method then continues with step 1335.

FIG. 32 shows how a Class is assigned to each Edge. The assignment of Classes to Edges begins in step 1400. In step 1403, TreeNode "p" is removed from the list of TreeNodes "chain". This list was generated by the method described in FIG. 31. If the list was empty, then the assignment is finished in step 1406, and the construction of the RFG can proceed as shown in FIG. 33. Otherwise, construction of the bracket set "BS" for this treenode begins in step 1409 by initializing "BS" to the BSList constructed for TreeNode "p" in FIG. 31, setting a variable "Lowest" to the "earliest" value of the "BSList (p)", and a variable "NextLowest" to NULL. In general, the BSList for a TreeNode "p" is obtained by forming the list {Cap, BSList (p), BSList's of children of "p"}, and deleting from that list the edges in InList (p). This is described in steps 1409–1445.

In general, equivalent SEZE edges can be categorized by a tree structure. The SELECT(zc,zclass(t)) chooses among the alternatives at a branch in the tree. An easy rule is to select zc if it is not null and otherwise to select zclass(t). When actual edge counts are available, as might be the case when the control flow graph comes from instrumented code, a better choice is to select the non-null alternative with the higher edge count. If both are null, then select null. In step 1412, a Class "zc" is initialized to NULL. The following steps accumulate the bracket sets of the children of TreeNode "p" in the DFST. Steps 1415 to 1421 add the children's BSLists to "BS". In step 1415, TreeNode "t" is taken (and removed) as the next TreeNode in "p"'s ChildList. If there are no more nodes in this list, then the method continues with step 1424. Otherwise, "t"'s BSList is appended to the back of "BS", and the count of "BS" is updated in step 1418. If the earliest value of "t"'s BSList referred to a TreeNode earlier than Lowest, then NextLowest is set to Lowest and Lowest is set to that Earliest value. Otherwise, if the Earliest value of "t"'s BSList referred to a TreeNode earlier than NextLowest, then NextLowest is set to that Earliest value. In step 1421, if "zc" was NULL, it is set to the value of "t"'s ZClass. The method resumes for the next element of "p"'s ChildList in step 1415.

Steps 1424 through 1436 remove from the bracket set the BackEdges in "p"'s InList. In step 1424, "b" is the next BackEdge from "p"'s InList. When none are left, the method continues in step 1439. Otherwise, in step 1427, "b" is unlinked from "BS", and the (possibly new) first element of "BS" is adjusted properly. In step 1430, "e" is taken as the Edge associated with BackEdge "b". If it is NULL, the method continues with step 1424. Otherwise "c" is taken as the Class associated with Edge "e". If it is not NULL, the Edge already has a Class associated with it and the method continues with step 1424. Otherwise, step 1436 creates a new Class and assigns it to Edge "e". Again, the method continues with step 1424. Steps 1439 through 1445 add the Cap edge if it is needed. In step 1439, a Cap edge is needed if NextLowest is not NULL. The Cap edge is a BackEdge connecting node "t"' to the Treenode pointed to by NextLowest and should be put at the beginning of the list "BS". If a cap edge is needed, step 1442 constructs a new BackEdge "b" and step 1445 appends it to the front of "BS" and the method resumes with step 1448. Otherwise, the method skips to step 1448.

In step 1448, a check is made to see if "BS" is NULL. This happens if the Edge leading into "p" is 1-reducible. If so, the method continues with step 1481. Otherwise, step 1451 examines the first element "b" of "BS". Step 1454 sets "c" to the "b"'s OldClass. If "c" is NULL, then the method continues with step 1463. Otherwise, step 1460 checks to see if "b"'s OldCount is the same as "BS"'s Count. If it is not, the method continues with step 1463. Otherwise the method continues with step 1466. In step 1463, "C" and OldClass("b") are both set to a new Class value. This is a result either of "b" not having been associated with a bracket set before or as a result of "b" having been associated with a bracket set with a different count.

In step 1466, a check is made to see if "BS" has only one BackEdge. If so, then "e" is set to the Edge associated with that BackEdge in step 1469, and the Class of "e" is set to "c" in step 1472. The method then continues with step 1475. Step 1481 was reached if "BS" had no elements. A check is made to see if "zc" is NULL in step. If not, the method continues with step 1475. Otherwise, "c" and "zc" are set to a new Class value to be associated with the 1-reducible Edge going into "p". In step 1475, a check is made to see if "p" is NULL. If not, the Class of "p"'s Edge is set to "c" and "p"'s ZClass is set to "zc". The method then continues for the next element of "chain" in step 1403. Otherwise, the method continues with the next element of "chain" in step 1403.

FIG. 33 illustrates how the construction of the RFG is performed by a directed DFS. Construction starts in step 1500. Initialization in step 1503 sets Node "n" to the "start" Node. In step 1506, Node "n" is pushed onto the stack. In step 1509, Node "n" is read out as the value on the top of the stack. In step 1512, Edge "e" is determined as the next outgoing Edge of Node "n" to look at. If no further outgoing edges remain, the method continues with step 1539. Otherwise if "e" is NULL, the method resumes with step 1512. Otherwise, step 1515 assigns to "c" the Class of Edge "e". In step 1518, "s" is set to the SESEChain of "c". This will be non-NULL if some other edge is currently active in Class "c". If "s" is NULL, step 1521 sets "c"'s SESEChain to start with "e"; otherwise "e" is appended to the end of "s" in step 1524. In either case, step 1527 sets "n"' to the node reached by Edge "e". If "n"' has not been visited already, then "n" is set to "n"' and the method resumes with step 1506. Otherwise, "n"' has been visited and step 1533 checks to see if "s" is NULL. If it was, then "c"'s SESEChain is set back to NULL, since an SESEChain of more than one Edge will not be formed with "e". Then, or if it wasn't NULL, the method resunes with step 1512.

In step 1539, Node "n" is popped from the stack. If the stack was empty, then the construction is completed in step 1542. If not, then set Node "n" to the new element on the top of the stack in step 1545. In step 1548, let "e" be the Edge which was followed into Node "n". Step 1551 lets "c" be the Class of "e", and step 1554 lets "s" be the SESEChain of "c". If "e" is not the first element in "s", the reduction of this SESEChain will happen later, and control continues with step 1512. If "e" is the first element in "s", step 1560 sets "c"+s SESEChain to NULL, since it is possible that a new SESEChain will be constructed later for the same Class. Although it is not important in the analysis, it can be shown that at most two SESEChains will be built for a given Class. In step 1563, a check is made to see if "s" had just one element. If so, an SESEChain is not made of it unless "e" was a 1-reducible Edge; this determination is made in step 1566. If "e" is not 1-reducible, control continues with step 1512. If it is, then in step 1569 the reduction of the entire set of edges comprising "s" is performed. This is achieved by unlinking the first and last edges from their original context, constructing a new Edge which plugs into the original context. The new Edge is represented by "s". Control then continues with step 1512. Finally, if in step 1563 it was determined that "s" had more than one element, the method again follows step 1569.

The application of the method and apparatus described above is useful both to intra-procedural control flow analysis and inter-procedural control flow. Functions are structured as SESE blocks, so that a hierarchical structure based on SESE blocks is appropriate for both classes of problems. The difference between the two cases is that in the case of intra-procedural control flow analysis, the graph always has an expansion to a finite depth. The methods are applicable for any problem in which there is a control flow or a data flow. It is useful in those problems where loops or other backward flow can be present. It is particularly useful in those problems where a significant fraction of the control flowgraph can be represented in a hierarchical fashion.

The method and apparatus of the present invention has been described in connection with the preferred embodiment as disclosed herein. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Figure 34:
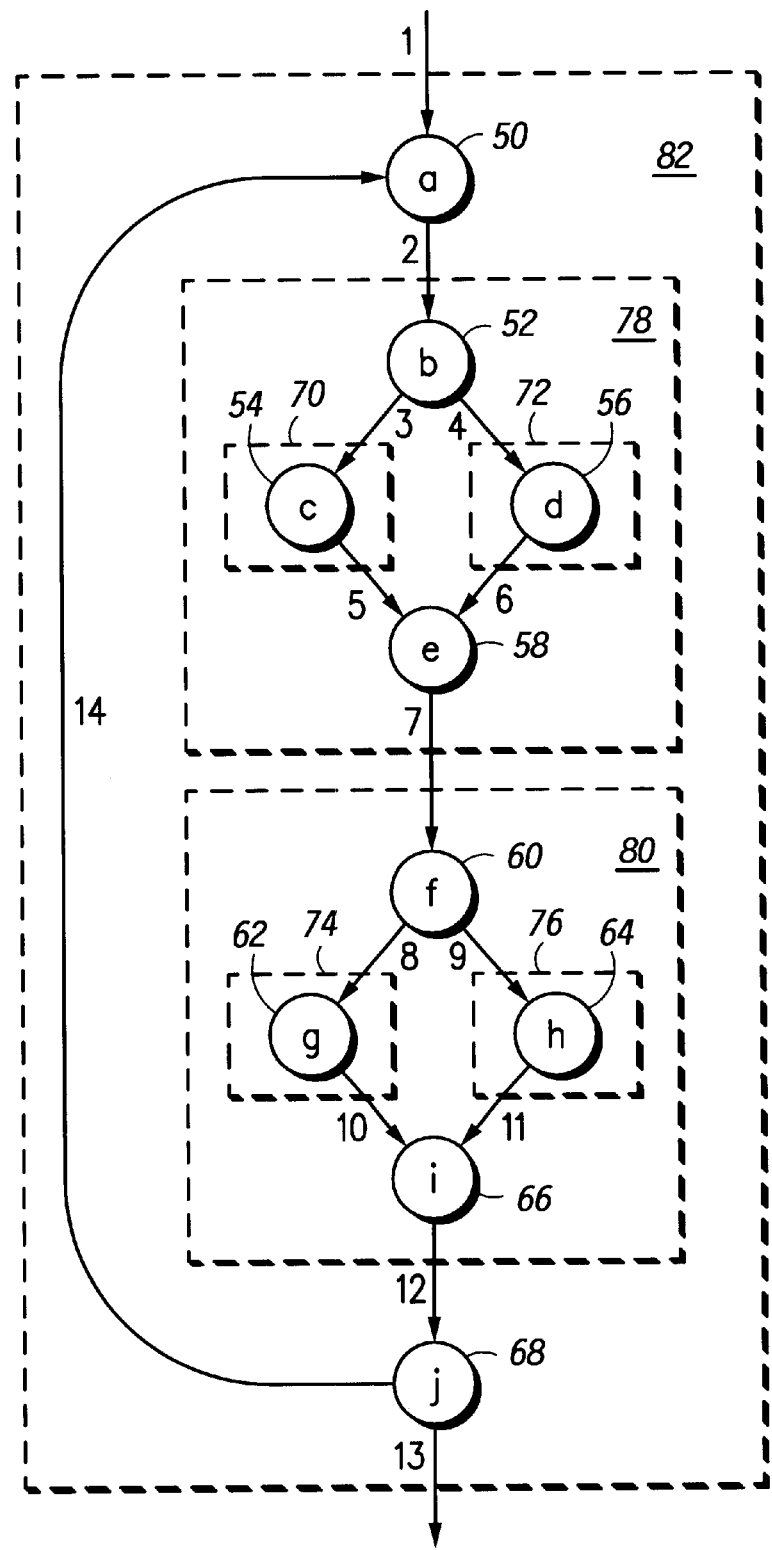
FIG. 34 illustrates a control flow graph with SESE regions in accordance with the present invention.

FIG. 34 is a control graph that illustrates breaking the control flow graph from FIG. 1 into SESE and SEZE regions. Region 82 is a Single Entry/Single Exit (SESE) region containing all of the control flow nodes in FIG. 1. The single entry is on edge 1 between x and node "a" 52. The single exit is on edge 13 between node "j" 68 and "y". SESE region 82 contains two internal SESE regions 78 and 80. SESE Region 78 contains nodes "b" 52, "c" 54, "d" 56, and "e" 58. The entrance to SESE region 78 is on edge 2 between node "a" 50 and node "b" 52. The exit from SESE region 78 is on edge 7 between node "e" 58 and node "f" 60. SESE region 78 contains SESE region 70containing node "c" 54, and SESE region 72 containing node "d" 56. Edge 3 connects node "b" 52 to node "c" 54. Edge 4 connects node "b" 52 to node "d" 56. Edge 5 connects node "c" 54 to node "e" 58. Edge 6 connects node "d" 56 to node "e" 58.

SESE Region 80 contains nodes "f" 60, "g" 62, "h" 64, and "i" 66. The entrance to SESE region 80 is on edge 7 between node "e" 58 and node "f" 60. The exit from SESE region 80 is on edge 12 between node "i" 66 and node "j" 68. SESE region 80 contains SESE region 74 containing nodes "g" 62, and SESE region 76 containing node "h" 64. Edge 8 connects node "f" 60 to node "g" 62. Edge 9 connects node "f" 60 to node "h" 64. Edge 10 connects node "g" 62 to node "i" 66. Edge 11 connects node "h" 64 to node "i" 66.

Figure 35:
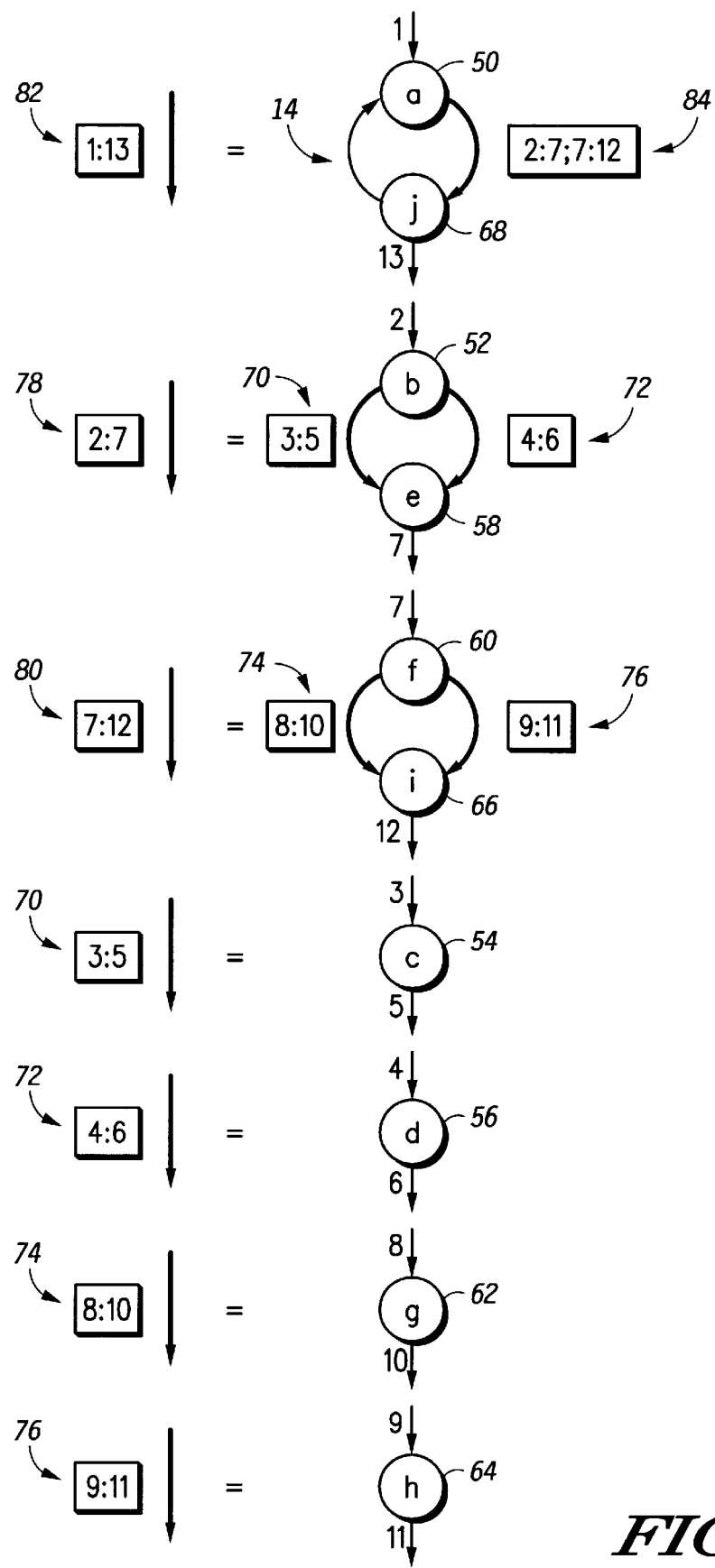
FIG. 35 illustrates a Reduced FlowGraph (RFG) of the control flow graph of FIG. 34 in accordance with the present invention.

FIG. 35 illustrates the use of Reduced FlowGraphs (RFG) to determine where to instrument the code represented by the control flow graph illustrated in FIG. 34. The initial Superedge 82 for the control flow graph is between edges 1 and 13 (represented by "1:13"). It reduces to incoming edge I to node "a" 50, Superedge [2:7;7:12] 84 from node "a" 50 to node "j" 68, back edge 14 from node "j" 68 back to node "a" 50, and outgoing edge 13 from node "j" 68. Superedge [2:7;7:12] 84 is composed of two joined components, Superedge [2:7] 78, and Superedge [7:12] 80.

Superedge [2:7] 78 is composed of incoming edge 2 into node "b" 52, Superedges [3:5] 70 and [4:6] 72 between node "b" 52 and node "e" 58, and outgoing edge 7. Superedge [7:12] 80 is composed of incoming edge 7 into node "f" 60, Superedges [8:10] 74 and [9:11] 76 between node "f" 60 and node "i" 66, and outgoing edge 12.

Superedge [3:5] 70 is composed of incoming edge 3 into node "c" 54, and outgoing edge 5 out of that node. Superedge [4:6] 72 is composed of incoming edge 4 into node "d" 56, and outgoing edge 6 out of that node. Superedge [8:10] 74 is composed of incoming edge 8 into node "g" 62, and outgoing edge 10 out of that node. Superedge [9:11] 76 is composed of incoming edge 9 into node "h" 64, and outgoing edge 11 out of that node.

Figure 36:
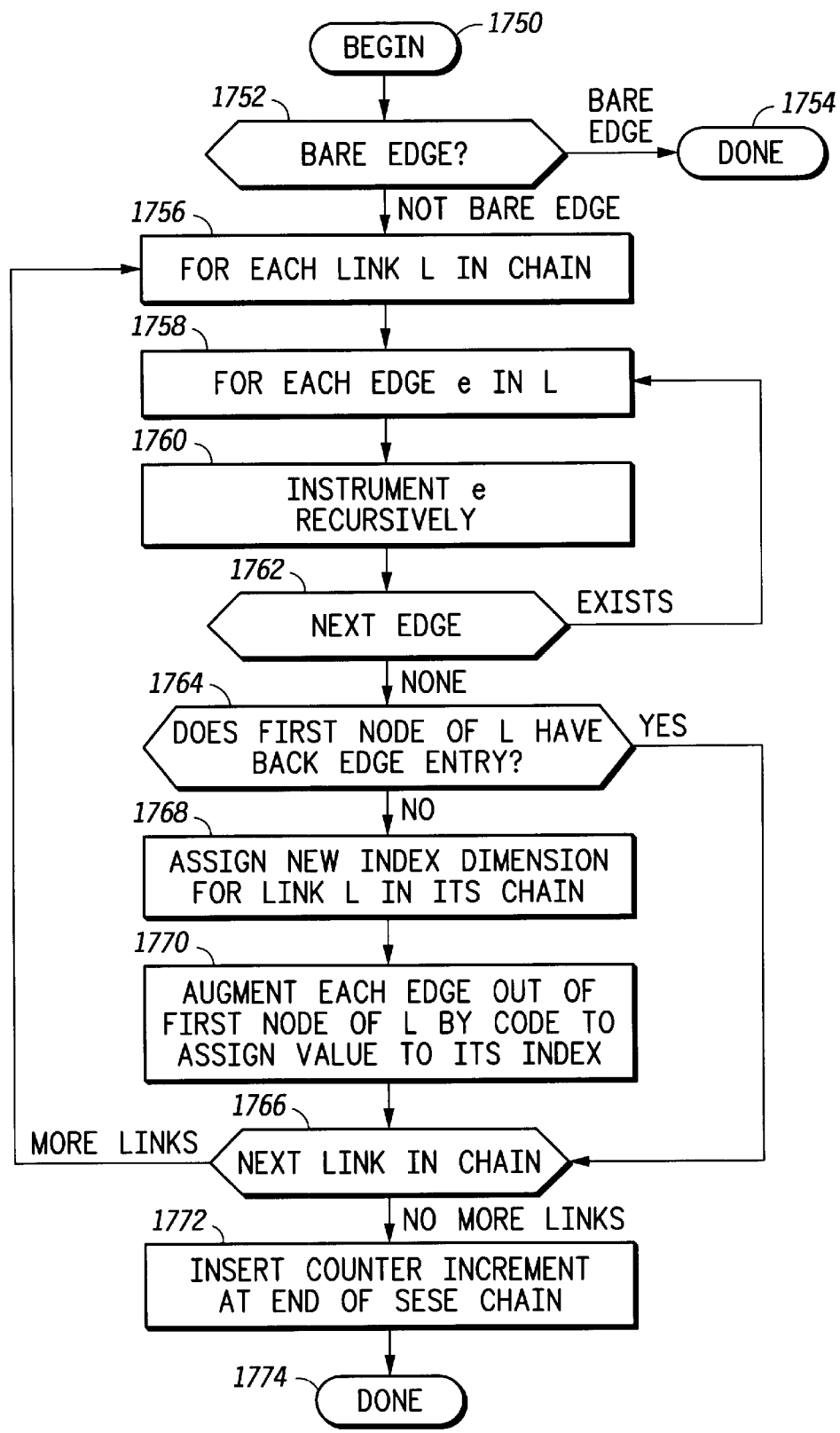
FIG. 36 is a flow chart illustrating a method of inserting instrumentation into program code, in accordance with the present invention.

FIG. 36 is a flow chart illustrating the insertion of instrumentation into the code represented by the control flow graph in FIG. 34. The routine enters, step 1750 and checks for a bare edge, step 1752. If there is a bare edge, step 1752, the routine exits as done, step 1754. Otherwise, a loop is entered for each link "L" in a chain, step 1756. An inner loop is entered, step 1758. For each edge "e" in "L", step 1758, the edge "e" is instrumented recursively, step 1760. This is repeated as long as there is a next edge "e", step 1762. Otherwise, at the end of the inner loop, the first node of "L" is checked for a back edge entry, step 1764. If no back edge entry is found, step 1764, a new index dimension for link L is assigned in its chain, step 1768, and each edge out of the first node of L is augmented by code to assign a value to its index, step 1770. In any case, the next link L in the chain is checked, step 1766, and the outer loop is repeated if the next link L exists. Otherwise, when no more links are left to process from the chain, a counter increment is inserted at the end of the SESE chain, step 1772, and the routine completes and exits, step 1774.

Figure 37:
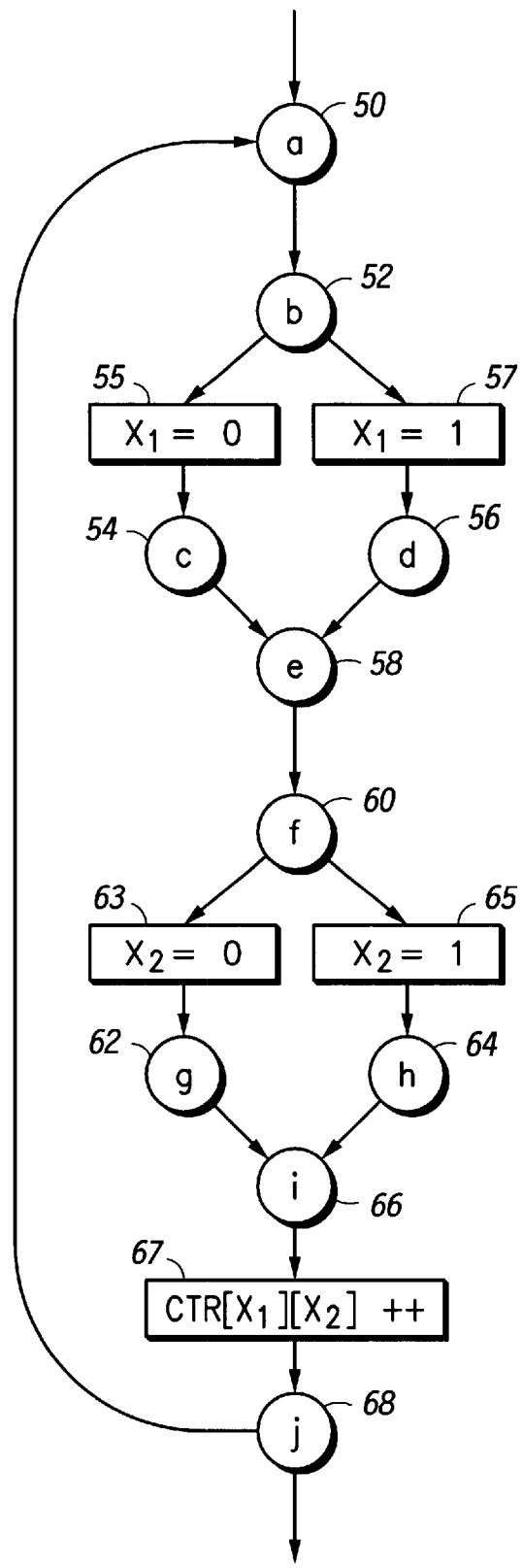
FIG. 37 illustrates an instrumented program constructed using the flowchart in FIG. 36.

FIG. 37 is diagram illustrating the addition of instrumentation code the control flow graph shown in FIG. 1. Superedge [1:13] 82 isn't instrumented since node "a" 50 has back edge 14 as an incoming edge. Superedge [2:7;7:12] 84 is instrumented since there is no back edge into its first node. Superedge [2:7;7:12] 84 is composed of connected Superedge [2:7] 78 and Superedge [7:12] 80. Referring back to FIG. 36, chain L contains two Superedges [2:7] 78, and [7:12] 80. Neither has an incoming backedge, step 1764, so a new index dimension is assigned for each of the two links in the chain, step 1768. Index $X_1$ is assigned to Superedge [2:7] 78, and index $X_2$ is assigned to Superedge [7:12] 80. Superedge [2:7] 78 is comprised of Superedges [3:5] 70 and [4:6] 72 between node "b" 52 and node "e" 58. The first edge out of node "b" 52 in Superedge [3:5] 70 is edge 3 into node "c" 54. Assignment statement 55 assigning a value of zero (0) to index $X_1$ is inserted into edge 3 by step 1770. The first edge out of node "b" 52 in Superedge [4:6] 72 is edge 4 into node "d" 56. Assignment statement 57 assigning a value of one (1) to index $X_1$ is inserted into edge 4 by step 1770. Recursing, no more instrumentation is inserted into Superedge [2:7] 78, since all lower level edges are completely composed of "bare edges", step 1752.

Superedge [7:12] 80 is similarly instrumented, resulting in the insertion of assignment statement 63 that assigns a value of zero (0) to index $X_2$ into edge 8, and the insertion of assignment statement 65 that assigns a value of one (1) to index $X_2$ into edge 9. When there are no more links in the chain, step 1766, a counter increment is inserted at the end of the SESE chain, step 1774. In this case, the counter increment instruction 67 is inserted into edge 12 as it leaves the last node in Superedge [7:12] 80. This statement increments (CTR[$X_1$][$X_2$]++) the counter entry in a two dimensional array of counters ("CTR") that is indexed by the two indexes assigned in step 1768.

It should be appreciated that the instrumentation illustrated above was implemented for a two two-way "branch and join" situation for ease of disclosure. This corresponds to C code of the form:

if (exp1)

{<node "c" 54 statements>} else

{<node "d" 56 statements>} if (exp2)

{<node "g" 62 statements>} else

{<node "h" 64 statements>}

The flow chart illustrated in FIG. 36 is not limited to two SESE sections, nor to two way "branch and join" code. In the situation where more than two sections of code are instrumented, additional index variables $X_3$, $X_4$, etc. would be assigned in step 1768, and used as counter array indices in step 1772. In situations where a Superedge decomposes to more than two paths, additional values can be assigned to the index variables in step 1770. This would in many cases correspond to Case statements.

Additionally, a two dimensional array of counters is incremented 67 in FIG. 37. This again is illustrative, with well known computer science techniques available for translating two, three, four, etc. dimensional array references into one dimensional vector references. Secondly, a single window of instrumentation is shown. The use of multiple indices $X_1$, $X_2$, etc. allows for the implementation of moving windows of instrumentation. For example, $CNTR_1$ can be indexed by index variables $X_1$, $X_2$, and $X_3$, while $CNTR_2$ is indexed by index variables $X_2$, $X_3$, and $X_4$, etc. This is useful because often there comes a point of diminishing returns in correlating nonadjacent execution paths.

For the flowgraph represented in FIG. 1 with the particular execution sequence described in FIG. 2, the instrumentation code described in FIG. 37 will result in values being assigned to the four counters allocated to the SESE chain 2:7;7:12 labeled as item 84 in FIG. 35 as follows in Table T-1:

TABLE T-1

| Index | | PATHS | | |
|---|---|---|---|---|
| $X_1$ | $X_2$ | [2:7] 78 | [7:12] 80 | Freq. |
| 0 | 0 | [3:5] 70 | [8:10] 74 | 4 |
| 0 | 1 | [3:5] 70 | [9:11] 76 | 1 |
| 1 | 0 | [4:6] 72 | [8:10] 74 | 0 |
| 1 | 1 | [4:6] 72 | [9:11] 76 | 4 |

In addition, additional instrumentation not shown in FIG. 37 is assumed to have generated the following additional counts shown in Table T-2.:

TABLE T-2

| Additional Counts | | |
| --- | --- | --- |
| Edge | Ref# | Cnt |
| 1:13 | 82 | 1 |
| 2:7; 7:12 | 84 | 5 |
| 3:5 | 70 | 5 |
| 4:6 | 72 | 4 |
| 8:10 | 74 | 4 |
| 9:11 | 76 | 5 |
| 14 | 14 | 14 |

The various methods by which these simple edge counts (as opposed to correlated edge counts CTR[i][j]) are instrumented and counted are well understood in the prior art.

Figure 38:
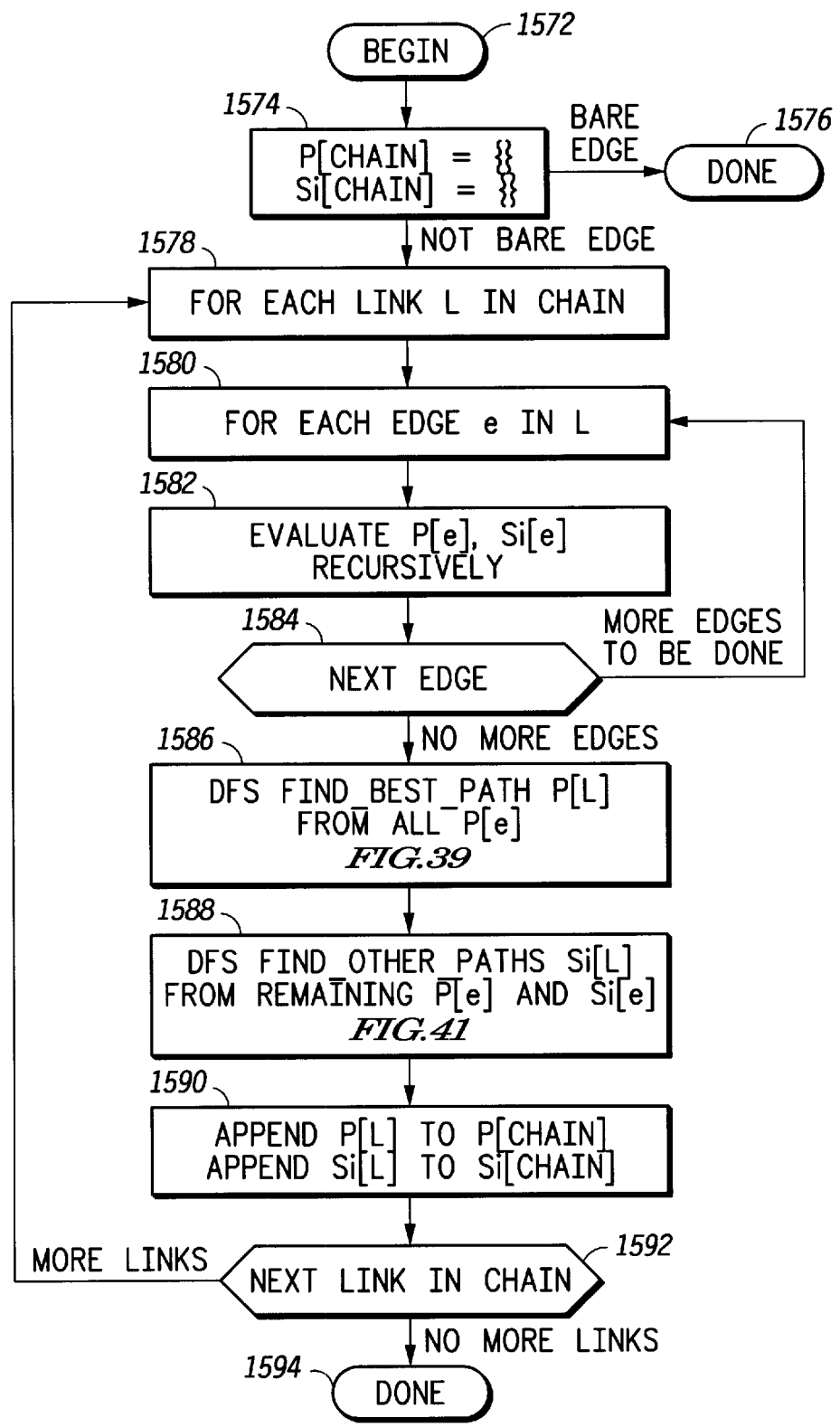
FIG. 38 is a flow chart illustrating construction of better code layout based on counts resulting from program instrumented by the method shown in FIG. 36.

With instrumentation producing the correlated counts, the next step is to use this information to produce a better layout of object code. FIG. 38 describes how to use such a layout, while FIG. 42 describes how to use cloning to modify the control-flow graph which can then by laid out using the method described in FIG. 38.

The entire control flowgraph of the original program has been represented as a Reduced FlowGraph (RFG), and the layout method described in FIG. 38 recursively analyzes this flowgraph looking for ways to lay out the basic blocks in SESE/SEZE chains. A SESE/SEZE chain consists of a one or more links, each of which is an SESE region (except the last one will be an SEZE region in an SEZE chain). In the RFG, each Superedge is either an original edge or a SESE/SEZE chain. The goal of the layout method described in FIG. 38 is to construct, for each SESE/SEZE chain, a primary node chain P of basic blocks which leads from the entry node to the exit node (SESE chain) or from the entry node to the point that nothing further can be added (SEZE chain) and sets Si of secondary node chains of differing importance which are nodes included in the SESE/SEZE chain but which are not in the primary chain P. This primary chain P describes an ordering of basic blocks in which each basic block is the best one to put, based on the frequency counts, of all which follow. The S1 chains are of differing importance; typically S1 chains would be more heavily used than S2 chains, with the least heavily used chain being Sn. In a normal application, 2 or 3 secondary chains would suffice. For clarity in this discussion, we use only one secondary chain. The extension to multiple chains is made simply by putting each node into a secondary chain associated with the number of counts associated with the edge which leads that node to be inserted in a secondary chain. For example, a heavily used node (greater than 1% of edge counts) would go in S1, a less heavily used node in S2, and a node not actually used in the instrumented execution would go in S3. This goal is achieved by recursively descending the RFG from each SESE/SEZE region to its own enclosed Superedges and constructing primary and secondary sets for each of these edges. Once the constituent primary and secondary sets for the region are available, a depth-first search is used to construct a best primary path and the secondary sets for the region as a whole. The details of this are described in the following paragraphs. FIG. 36 is invoked on a Superedge which is either a bare edge or an SESE/SEZE chain.

In Step 1572, the method for laying out a Superedge begins. In Step 1574, the primary and secondary chains are initialized as empty chains. If the Superedge is a bare edge (it therefore contains no nodes), that is all that is needed and the method returns those empty chains in Step 1576. Otherwise, the edge is an SESE/SEZE chain and the method continues with Step 1578.

Step 1578 starts a walk down each link L in the SESE/SEZE chain. What has to be done first is to carry out the analysis for all Superedges internal to the link L. In Step 1580, the next Superedge e is selected from link L. The method of FIG. 38 is then invoked (recursively) on this edge in step 1582, resulting in an evaluation of the primary P[e] and secondary S[e] node chains for Superedge e. In Step 1584, if another Superedge is available, the method repeats the invocation as described starting with Step 1580, while if no further Superedges are available, the method continues with Step 1586. By the time Step 1586 has been evaluated, every Superedge e in L has had its primary and secondary node chains determined. In Step 1586, the best primary path from input to output is found using the method described in FIG. 39. This primary path is constructed from the primary paths of the constituent edges. In constructing the primary path, there are two possible states which can arise. In the first, the basic block which is entered by the incoming edge to L has no back edge entering it. In this case, the first node to be added is determined by the CTR values relating the alternatives to the previous nodes. Specifically, if links corresponding to index values i1 and i2 have already been added to the chain, the index value i3 is that corresponding to the current link, and index values corresponding to the remaining links are i4 and i5, the rank for each candidate node i3 would be $r(i3) = \Sigma CTR[i1][i2][i3][i4[i5]$ where the sum is over the following index values only; in this case over i4 and i5. The values for i1 and i2 are those chosen from the earlier links in this Superedge which have already been laid out. On the other hand, if there is a back edge, then the first node to be added is determined entirely by FIG. 39, since there is no index value associated with this link L.

Once Step 1586 has determined the primary path P[L] for link L, the Step 1588 determines the best secondary sequence(s) which may be constructed from the remaining primary paths P[e] in another depth first search and these sequences are concatenated with the secondary sequences S[e] to form S[L].

The P{L} formed for this link is concatenated onto the P formed from previous links and the S[L] form for this link is concatenated onto the S formed from previous links in Step 1592. In Step 1592, if another link remains in the chain, control continues with Step 1578. Otherwise, the requisite P and S have been computed and are returned in Step 1594.

An illustration, the steps which are taken in handling the RFG of FIG. 35 are illustrated in Table T-3:

TABLE T-3

| Steps taken handing RFG in FIG. 35 | | |
| --- | --- | --- |
| # | Primary(P)/Secondary(S) chain assignments | Ref# |
| 1 | P[1:13] = {} | 1574 |
| 2 | S[1:13] = {} | 1574 |
| 3 | P[14] = {} | 1574 |
| 4 | S[14] = {} | 1574 |
| 5 | P[2:7; 7:12] = {} | 1574 |
| 6 | S[2:7; 7:12] = {} | 1574 |
| 7 | P[2:7] = {} | 1574 |
| 8 | S[2:7] = {} | 1574 |
| 9 | P[3:5] = {} | 1574 |
| 10 | S[3:5] = {} | 1574 |

TABLE T-3-continued

Steps taken handing RFG in FIG. 35

| # | Primary(P)/Secondary(S) chain assignments | Ref# |
|---|---|---|
| 11 | P[3] = {} | 1574 |
| 12 | S[3] = {} | 1574 |
| 13 | P[5] = {} | 1574 |
| 14 | S[5] = {} | 1574 |
| 15 | P[3:5] = {c} | 1586 |
| 16 | S[3:5] = {} | 1588 |
| 17 | P[4:6] = {} | 1574 |
| 18 | S[4:6] = {} | 1574 |
| 19 | P[4] = {} | 1574 |
| 20 | S[4] = {} | 1574 |
| 21 | P[6] = {} | 1574 |
| 22 | S[6] = {} | 1574 |
| 23 | P[4:6] = {d} | 1586 |
| 24 | S[4:6] = {} | 1588 |
| 25 | P[2:7] = {bce} | 1586 |
| 26 | S[2:7] = {d} | 1588 |
| 27 | P[2:7;7:12] = {bce} | 1590 |
| 28 | S[2:7;7:12] = {d} | 1590 |
| 29 | P[7:12] = {} | 1574 |
| 30 | S[7:12] = {} | 1574 |
| 31 | P[8:10] = {} | 1574 |
| 32 | S[8:10] = {} | 1574 |
| 33 | P[8] = {} | 1574 |
| 34 | S[8] = {} | 1574 |
| 35 | P[10] = {} | 1574 |
| 36 | S[10] = {} | 1574 |
| 37 | P[8:10] = {g} | 1586 |
| 38 | S[8:10] = {} | 1588 |
| 39 | P[9:11] = {} | 1574 |
| 40 | S[9:11] = {} | 1574 |
| 41 | P[9] = {} | 1574 |
| 42 | S[9] = {} | 1574 |
| 43 | P[11] = {} | 1574 |
| 44 | S[11] = {} | 1574 |
| 45 | P[9:11] = {h} | 1586 |
| 46 | S[9:11] = {} | 1588 |
| 47 | P[7:12] = {fgi} | 1586 |
| 48 | S[7:12] = {h} | 1588 |
| 49 | P[2:7;7:12] = {bcefgi} | 1590 |
| 50 | S[2:7;7:12] = {dh} | 1590 |
| 51 | P[1:13] = {abcefgij} | 1586 |
| 52 | S[1:13] = {dh} | 1586 |

In this TABLE, the first column shows the sequence in which the operations are carried out, the second column shows which assignment to a primary or secondary chain, and the third column shows the Step in the method of FIG. 38 in which this assignment was made.

Figure 39:
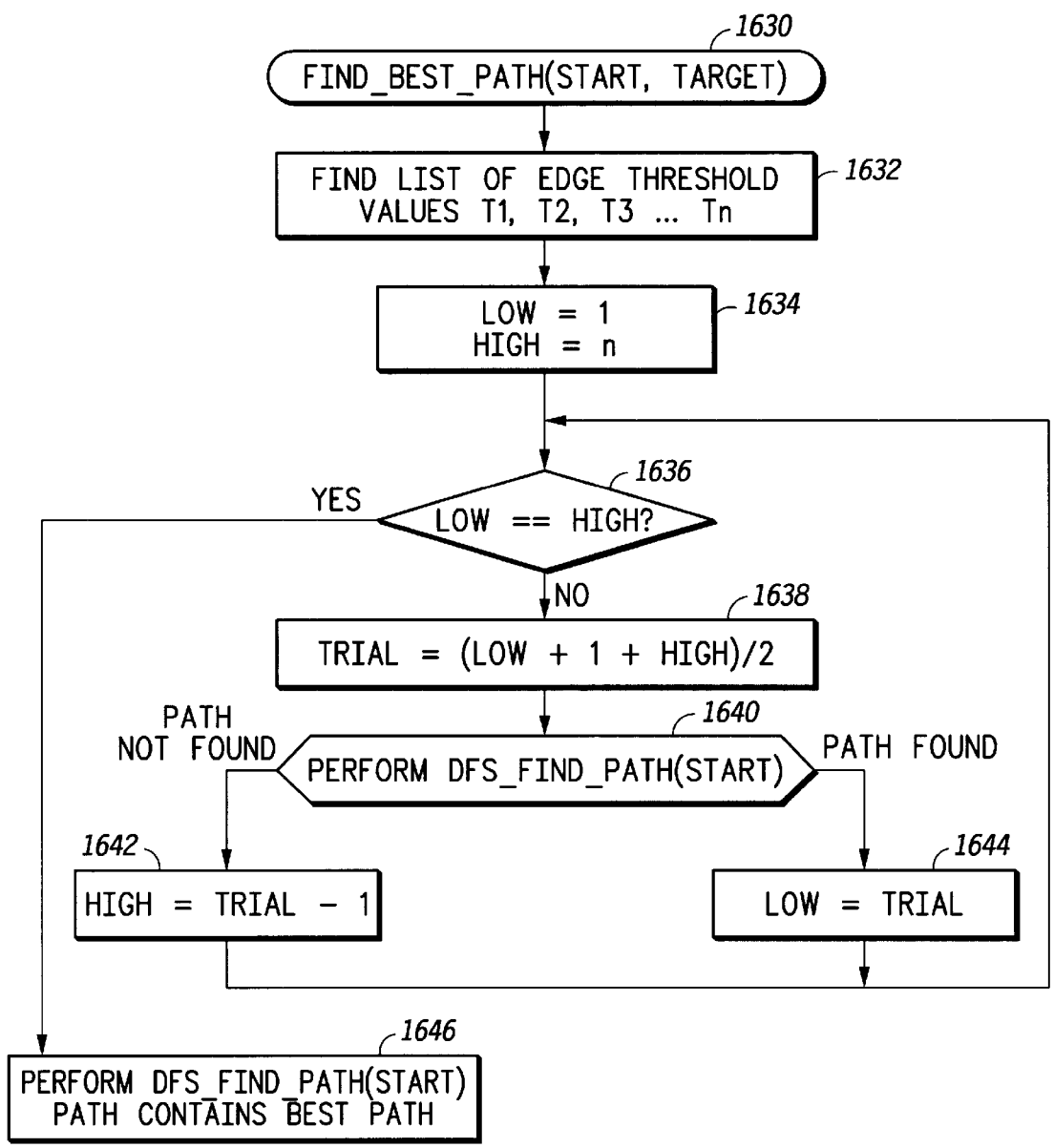
FIG. 39 is a flow chart illustrating the Find_Best_Path procedure in accordance with the present invention.

FIG. 39 describes the routine Find_Best_Path which finds the best path between two nodes: "start" and "target". The best path is the one in which the lowest value of the threshold any edge on the path is maximized. Any other path between those nodes would have at least one edge with a threshold value lower that the lowest threshold value on any edge on the best path. The threshold value of an edge (or superedge) is the count of times the edge was traversed (for superedges, the count of times the count of times the bare edge leading into the superedge).

Routine Find_Best_Path obtains the best path by repeatedly finding paths such that the minimum threshold value on any edge on the path is above a given value. The method searches for the best path by changing the threshold value, using a binary search strategy. Initially, Find_Best_Path obtains the values of all edge Threshold values in the region (Step 1632). A number "n" of such distinct threshold values is found: T1, T2, T3, . . . Tn. These are listed in ascending order of value, T1 being the lowest threshold value and Tn being the highest threshold value.

The search for the best threshold value uses two running indicators to constrain the range for the search, "low" and "high", initialized in step 1634. Initially, the range for searching the best path starts with a "low" value of 1 (one) (to indicate the threshold value T1) and a "high" value of "n" to indicate the threshold value Tn.

Then, the routine repeats a loop by successively finding paths and constraining the range until only one threshold value is present in the range between "low" and "high" (step 1636). The test of a given threshold value starts at the threshold value in the middle of the range (step 1638). This is the threshold value Ttrial. The search applies method DFS_Find_Path (Step 1640), described in FIG. 40 to find a path such that all edge threshold values exceed Ttrial. If such a path is found, the range for the search is constraining by making Ttrial the new "low" end of the range (Step 1644). Alternatively, if no such path exists, this means that Ttrial was too high a threshold value. The range is constrained by making the "high" end of the range be the value of threshold index (trial-1), Step 1642.

Step 1646 is executed when the range is constrained to one threshold value. Step 1646 performs one final invocation of DFS_Find_Path to set the global variable Path to be the best path.

Figure 40:
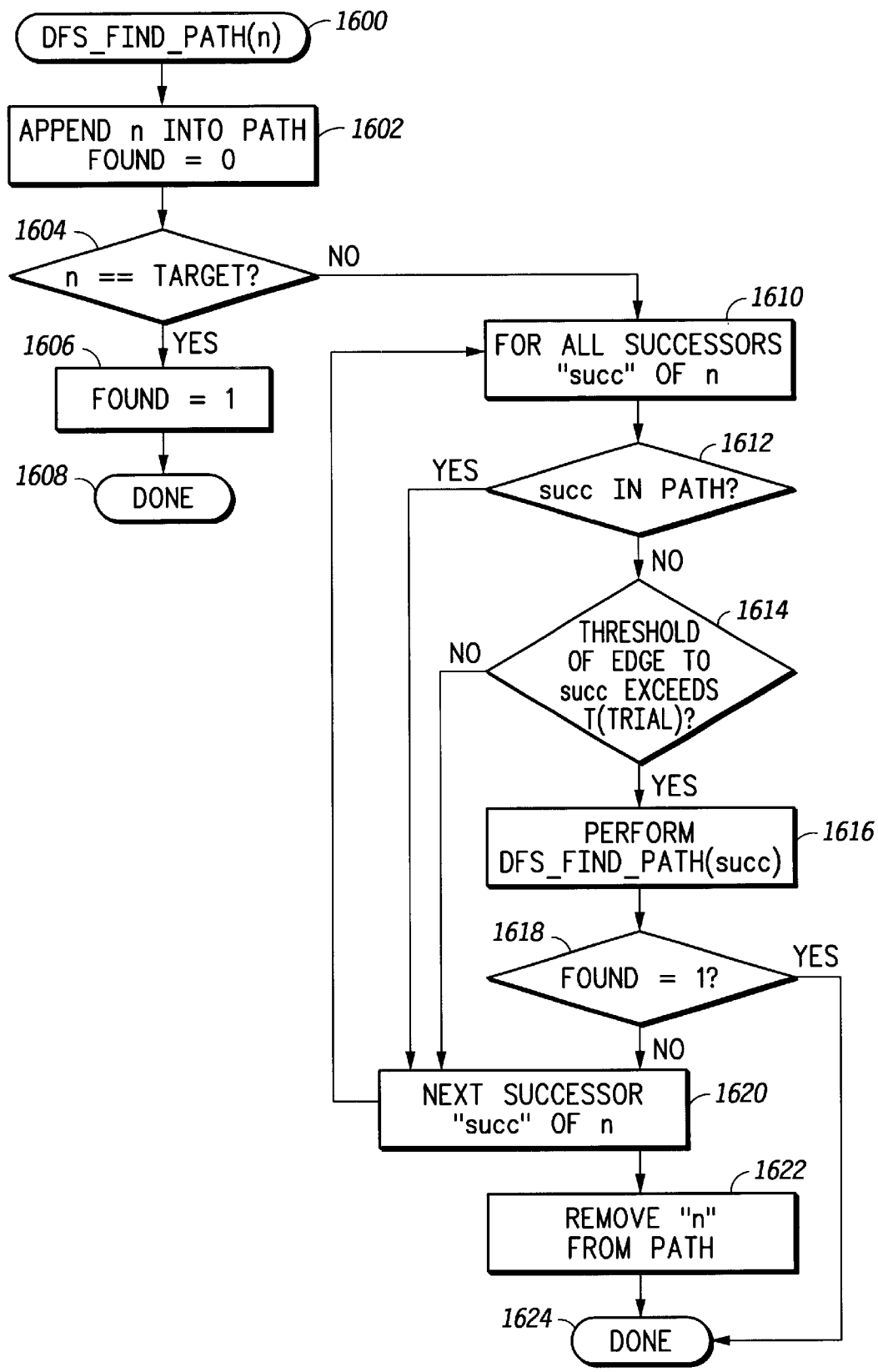
FIG. 40 is a flow chart illustrating the DFS_Find_Path procedure in accordance with the present invention.

FIG. 40 describes the routine DFS_Find_Path which finds a path to from an argument node "n" to a target node such that all edges in the path have threshold value above Ttrial. Routine DFS_Find_Path uses a recursive depth-first search method to find the path. Ttrial is a global variable. The target node Target is designated by a global variable. Initially, DFS_Find_Path appends the primary node chain leading from the node currently at the end of the path up to and including node "n" to the path under construction. (Step 1602). This path is designated by a global variable "Path". The method DFS_Find_Path then checks to see if the target has been reached (Step 1604). If this is true, it signals that a path has been found by initializing global variable "Found" (Step 1606) and returns to the caller. Global variable Path contains the path found (Step 1608). If the target has not yet been reached, the method proceeds with the search by attempting to find a path following all successors of "n" (Step 1610).

A candidate successor is tested to make sure it is not on the path already (Step 1612). If not, it is tested to see if its threshold value is above the minimum required (Ttrial), Step 1614. If this is true, the method invokes itself recursively to see if there is a path following that successor (Step 1616). If a path is found (Step 1618), the procedure returns (Step 1624). If not, then it attempts the next successor (Step 1620). If all successors have been attempted, this means that no path exists. The node "n", along with all nodes that were appended in Step 1602, are removed from global variable "Path" (Step 1622) and the procedure returns (Step 1624). The value of global variable "Found", set to zero in step 1602, remains the same to indicate that no path has been found.

Figure 41:
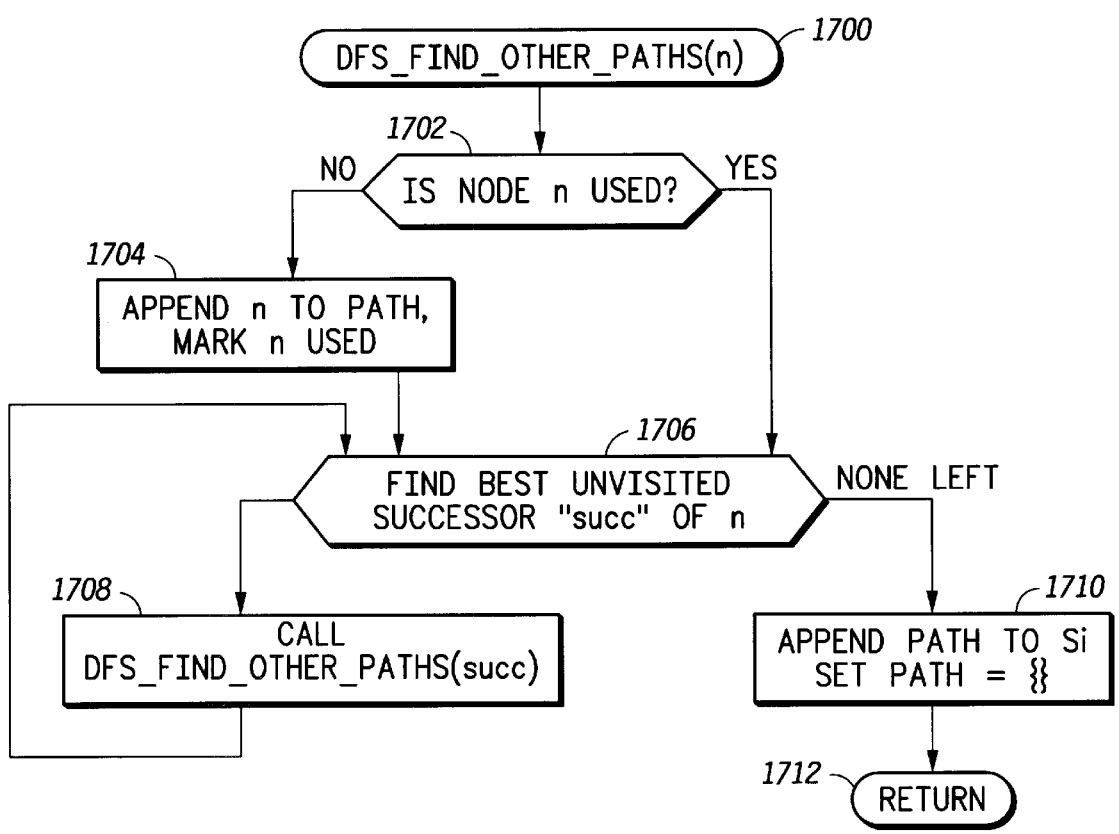
FIG. 41 is a flow chart illustrating a DFS_Find_Other_Paths procedure in accordance with the present invention.

FIG. 41 describes the operation of the DFS_Find_Other_Paths routine, which finds the remaining paths through the region. These are paths other than the best path for the region. The routine also uses a recursive depth-first procedure to construct the paths. Initially, all nodes in the best path are considered as "used". A global variable Path holds the paths being constructed. The method is invoked with an argument node "n" and finds the remaining paths from "n". It first checks to see if node "n" has been used already (Step 1702). If not, it appends "n" to the global Path and marks "n" as having been used (Step 1704). In both cases, it visits all unvisited successors of "n" to constructs the paths (Step 1706). This is done by a recursive invocation of DFS_Find_Other_Paths for each of the unvisited successors of "n" (Step 1708). If there are no unvisited successors of "n" this means that an alternative path has been constructed and it is stored in global variable Path. This path is appended to global variable Si which contains all the remaining paths (Step 1710). The global variable Path is re-initialized as an empty path, to be constructed by other recursive invocations of DFS_Find_Other_Paths after this invocation returns (Step 1712).

Figure 42:
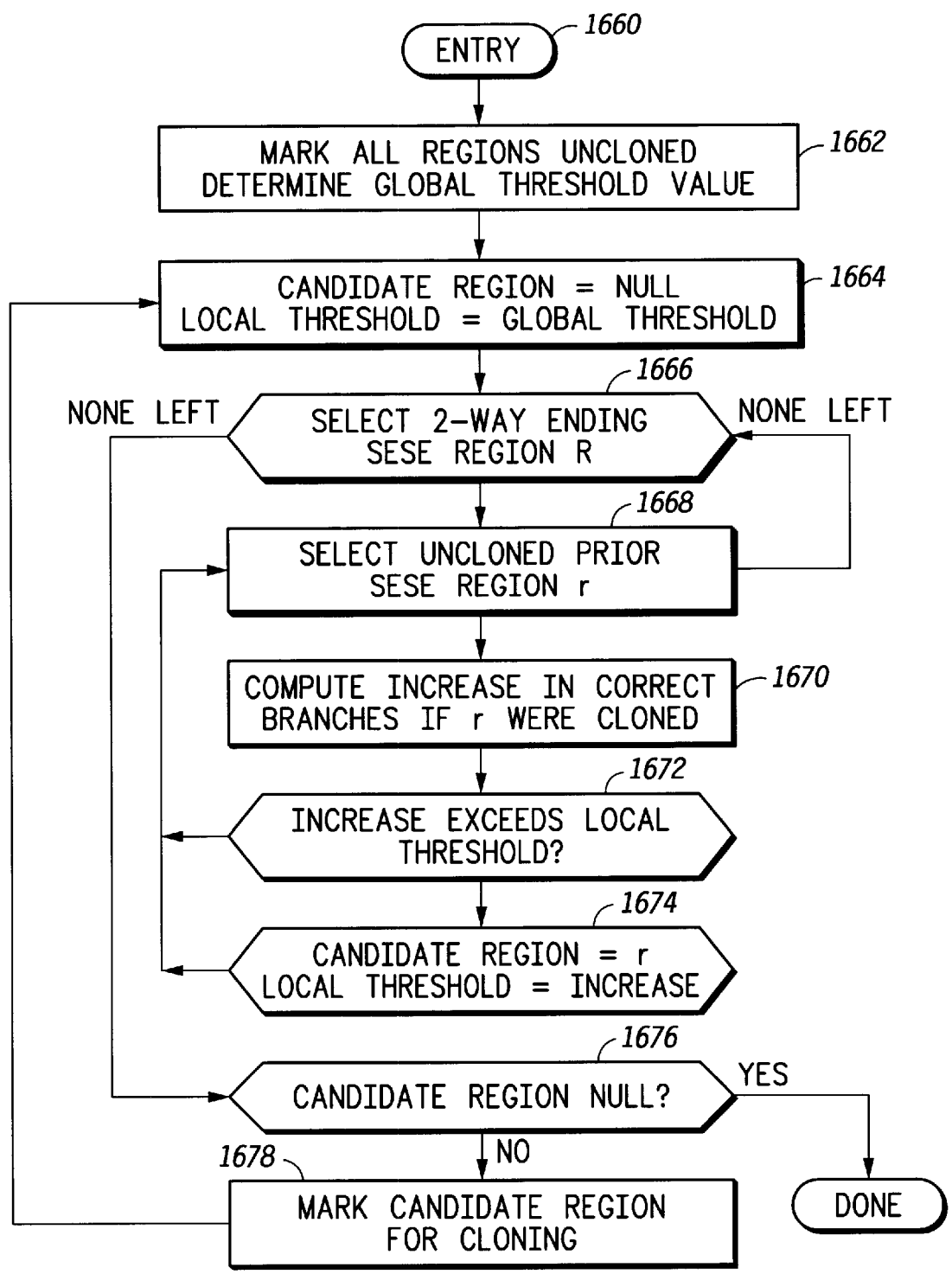
FIG. 42 is a flow chart illustrating a method of using cloning to modify control-flow graphs in accordance with the present invention.

FIG. 42 illustrates the method for deciding how to perform cloning for an SESE chain. The purpose of cloning is to create copies of certain basic blocks so that longer sequences of basic blocks can be constructed without having a likely branch have to be taken. The routine illustrated in FIG. 42 illustrates cloning only for a chain. It is straightforward to apply this either only at the lowest level in a set of nested SESE chains, recursively at all levels, or only below a certain depth. Any of these can be achieved in a straightforward manner using the recursive flow illustrated previously in FIG. 39 and returning a depth indicator which has the value 1 plus the highest depth of any Superedge e contained in the region. This depth value would then gate whether cloning would be done according to the above or similar schemes.

In general, a SESE/SEZE chain will consist of a set of links, for some of which instrumentation and execution have generated a set of counters CTR[i1][i2] . . . [in]. The purpose of this section is to use those counters to determine which, if any, of the nodes or basic blocks which begin SESE links in the chain should be cloned. Those which have back edges entering the nodes have not been instrumented and will not be considered for cloning. The method provides that a predetermined threshold performance improvement, measured in correct branches, must be exceeded in order for a node to be cloned. A sequence of stages is carried out; in each stage the node, if any, that most exceeds this threshold is determined. At the end of the stage, this node, if it exists, is marked for cloning. If no such node exists, the analysis is completed.

The routine begins with Step 1660. In Step 1662, all links are marked as uncloned, and an appropriate global threshold value is determined. Typically, this will be a predetermined percentage or fraction of some count typical of the entire execution of the program.

In Step 1664, a search for a new cloning node is initiated by setting the local threshold to the global threshold and setting the candidate link to NULL. In Step 1666, a link R in the chain is found. If there are no more links, the method continues with Step 1676.

Otherwise in Step 1668, a new uncloned link r in the chain is selected in Step 1668. If no more are to be found, another link R is sought in Step 1666. Otherwise, the increase in correct branches which would be obtained if link r were to be cloned is computed in Step 1670 as cloned[r;R]=Σmax(Σ'CTR[i1][i2] i3] . . .[alt.1] . . . [in],
Σ'CTR[i1][i2] [i3] . . . [alt.2] . . . [in])
uncloned[r;R]=Σmax(Σ"CTR[i1][i2][i3] . . . [alt.1] . . . [in],
Σ"CTR[i1][i2][i3] . . . [alt.2] . . . [in])
increase[r;R]=cloned[r;R]−uncloned[r;R]

where the Σ is over the prior indices where cloning is done (including ir in cloned[r;R] and not including ir in uncloned [r;R]) and Σ' is over later indices and prior indices where cloning is not done, and the maximum is taken over the various alternatives [alt.i] for the branch ending the first node in R. This computation assumes only two-way branches for the first node in R. This is reasonable, since if there are more than two alternatives, a table jump would be likely to be used and this would not benefit as significantly from having successive code following it. In an architecture in which multiple jumps occur more efficiently, the extension of these equations is straightforward.

In Step 1672, a determination is made as to whether this increase exceeds the local threshold. If it does not, a new prior uncloned region r is selected in Step 1668. If it does, link r becomes a candidate region and its increase in correct branches sets the new local threshold.

In Step 1676, a check is made to see whether any candidate region has qualified. If true, the candidate region is marked for cloning and the search for another link to clone resumes in Step 1664. Otherwise, the analysis is completed for this chain.

While this analysis uses only pairwise improvements at a time, it would be straightforward to analyze the benefits on all subsequent chains of cloning.

This calculation is illustrated for the SESE chain 2:7;7:12 of FIG. 35 with the counts shown above in Table T-1:

CTR[0][0]=4
CTR[0][1]=1
CTR[1][0]=0
CTR[1][1]=4

There is only one pair [r;R] to be examined, namely [2:7, 7:12].

The computation gives cloned[2:7,7:12]=max(4,1+max(0,4)=8
uncloned[2:7,7:12]=max(4+1, 4+0)=5.

Note in the first case that the sum over the index corresponding to 2:7 is outside the max in the cloned sum and inside the max in the uncloned sum. In this case, the increase in correct branch prediction due to cloning is increase [2:7;7:12]=3. Assuming that this meets a global threshold, code following the first node (b) of SESE region 2:7 would be cloned down to the next join point following the SESE region 7:12.

One of the advantages gained through the technique of program instrumentation shown in FIGS. 34 through 37 is that it allows run time dependencies between different branches through different "branch and join" sections of code to be identified. For example, the traffic statistics in FIG. 3 resulted in the optimization shown in FIG. 5. However, that optimization does not take into consideration the run time interaction between different branches. If dependencies or interactions exist between different paths and branches, the optimization shown in FIG. 5 may be suboptimal.

Table T-1 above shows hypothetical traffic counts for the four possible paths through the code. The following example uses the Table T-1 traffic statistics to show how the optimization in FIG. 5 may be suboptimal. There is a strong correlation between paths {bce} (Superedge [3:5] 70) and {fgi} (Superedge [8:10] 74) and between paths {bde} (Superedge [4:6] 72) and {fhi} (Superedge [9:11] 76). This correlation is missed in FIG. 5, when paths {bce} (Superedge [3:5] 70) is connected to path {fhi} (Superedge [9:11] 76) as the optimized path.

Figure 43:
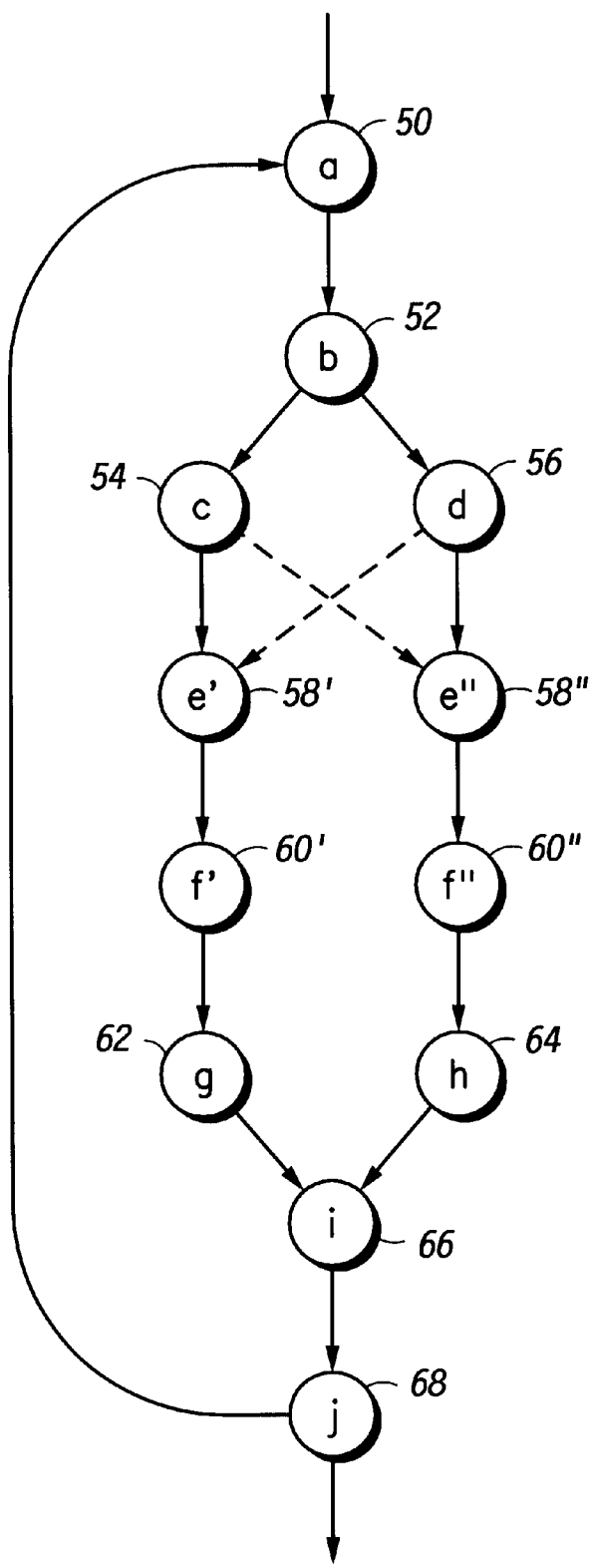
FIG. 43 illustrates basic block cloning in accordance with the present invention.

FIG. 43 is a flow control graph that includes cloned paths resulting from the instrumentation illustrated in FIG. 37 based on the traffic counts in Table T-1. Node "e" 58 has been cloned as nodes e' 58' and e" 58". Node "f" 60 has been cloned as nodes f' 60' and f" 60". The straight lines show straight through code (with the proviso that there must be a branch between node "b" 52 and either node "c" 54 or node "d" 56), while the dotted lines indicate low frequency crossover branches. Using the traffic statistics in Table T-1, path {abce'f'gi} is taken four (4) times out of nine (9), path {ade"f"hi} is taken four (4) times out of nine (9), path {abce"f"hi} is taken one (1) time out of nine (9), and path {abde'f'gi} is never taken. Contrast this with the prior art optimization shown in FIG. 5 where the two high frequency paths {abdejhi} and {abcefgi} each with four (4) occurrences in Table T-1 each requires two branches to execute.

Thus it is apparent that there has been provided, in accordance with the invention, a software sequencer that fully meets the need and advantages set forth previously. Although the invention has been described and illustrated with reference to specific embodiments thereof, it is not intended that the invention be limited to these illustrative embodiments. Those skilled in the art will recognize that modifications and variations can be made without departing from the spirit of the invention. For example, the software taught herein may be embodied on one or more of computer hard disks, floppy disks, 3.5" disks, computer storage tapes, magnetic drums, static random access memory (SRAM) cells, dynamic random access memory (DRAM) cells, electrically erasable (EEPROM, EPROM, flash) cells, nonvolatile cells, ferroelectric or ferromagnetic memory, compact disks (CDs), laser disks, optical disks, and any like computer readable media. It is important to note that matrices are taught herein as having rows and columns. These matrices may easily be changed so that the rows are the columns and the columns are the rows whereby row operations are now column operations and so on. This trivial permutations of rows and columns should not limit the meaning of "row" and "column" as used herein. The term "aisle" has been used herein to denote that the rows and columns of the matrix are interchangeable. Therefore, it is intended that this invention encompass all such variations and modifications as fall within the scope of the appended claims.

What is claimed is:

1. A computer-implemented method for hierarchical restructuring of computer code using runtime statistics, said method comprising:
   a) building a hierarchical representation of a Control Flow Graph (CFG) in terms of Single Entry/Single Exit (SESE) regions corresponding to execution flow of a computer program, wherein building comprises:
      replacing an SESE region of the CFG with an edge, wherein the edge describes a structure of the SESE region;
   b) creating a first executable, which comprises:
      1) inserting a plurality of instrumentation instructions into the computer program utilizing the hierarchical representation;
   c) executing the first executable, wherein:
      one or more of the plurality of instrumentation instructions generates path correlation counts during execution of the first executable;
   d) creating a second executable, which comprises:
      1) reordering computer code utilizing the path correlation counts.

2. The method in claim 1 wherein step (d) further comprises:
   2) cloning segments of computer code.

3. The method in claim 1 wherein within substep (1) of step (d):
   the reordering utilizes a second hierarchical representation of the Control Flow Graph (CFG) in terms of Single Entry/Single Exit (SESE) regions.

4. The method in claim 1 wherein the hierarchical representation is additionally in terms of Single Entry/Zero Exit (SEZE) regions.

5. The method in claim 1 which further comprises:
   e) reading into a memory the computer program as source code stored on secondary storage media.

6. The method in claim 1 which further comprises:
   e) reading into a memory the computer program as object code stored on secondary storage media.

7. The method in claim 1 wherein step (d) further comprises:
   2) storing the second executable on secondary storage.

8. An external storage media containing the second executable created by the method claimed in claim 1 encoded in machine readable form.

9. The method in claim 1, wherein at least one of the path correlation counts corresponds to at least two execution paths of the computer program.

10. The method in claim 9, wherein the at least two execution paths are nonadjacent execution paths.

11. The method in claim 4, wherein building further comprises replacing an SESE/SEZE chain of the CFG with a second edge, wherein the second edge describes a structure of the SESE/SEZE chain.

12. The method in claim 1, wherein the CFG may not be a strongly connected flowgraph.

13. The method in claim 1, wherein the CFG includes at least one 1-reducible edge.

14. The method in claim 1, wherein the hierarchical representation includes both nesting properties and full control flow information of the CFG.

15. A software sequencer stored via computer readable media, said computer readable media comprising:
   a first plurality of computer instructions for building a hierarchical representation of a Control Flow Graph (CFG) in terms of Single Entry/Single Exit (SESE) regions corresponding to execution flow of a computer program, wherein the first plurality of computer instructions comprises:
      a second plurality of computer instructions for replacing an SESE region of the CFG with an edge, wherein the edge describes a structure of the SESE region;
   a third plurality of computer instructions for creating a first executable, which comprises inserting a plurality of instrumentation instructions into the computer program utilizing the hierarchical representation;
   a fourth plurality of computer instructions for executing the first executable, wherein one or more of the plurality of instrumentation instructions generates path correlation counts during execution of the first executable; and
   a fifth plurality of computer instructions for creating a second executable, which comprises reordering computer code utilizing the path correlation counts.

16. The software sequencer of claim 15, wherein each of the plurality of computer instructions includes object code.

17. A computer-implemented method for instrumenting computer code, said method comprising:
   a) utilizing a hierarchical representation of a Control Flow Graph (CFG) in terms of Single Entry/Single Exit (SESE) and Single Entry/Zero Exit (SEZE) regions corresponding to execution flow of a computer program to identify a location in the computer program at which to insert instrumentation as an identified location, wherein at least one edge of the hierarchical representation replaces an SESE region of the CFG and the hierarchical representation includes nesting properties and full control flow information of the CFG; and b) inserting one or more instrumentation instructions at the identified location in the computer program.

18. The method in claim 17 which further comprises:
c) building the hierarchical representation of the Control Flow Graph (CFG).

19. The method in claim 17 wherein:
the hierarchical representation is a Reduced FlowGraph (RFG).

20. The method in claim 17 which further comprises:
c) reading into a memory the computer program as source code stored on secondary storage media.

21. The method in claim 17 which further comprises:
c) reading into a memory the computer program as object code stored on secondary storage media.

22. The method in claim 17 which further comprises:
c) creating an executable that includes the one or more instrumentation instructions; and
d) storing the executable on secondary storage.

23. The method in claim 22 which further comprises:
e) executing the executable, wherein:
one or more of the instrumentation instructions generates a set of path correlation counts during execution of the executable; and
f) storing the set of path correlation counts to secondary storage.

24. The method in claim 23 which further comprises:
f) creating a second executable, which comprises:
l) reordering computer code utilizing the set of path correlation counts.

25. A computer-implemented method for laying out computer code for improved data processor execution, said method comprising:
a) utilizing a hierarchical representation of a Control Flow Graph (CFG) in terms of Single Entry/Single Exit (SESE) regions corresponding to execution flow of a computer program to determine code layout for the computer program, and wherein at least one edge of the hierarchical representation replaces an SESE region of the CFG and the hierarchical representation includes nesting properties and fill control flow information of the CFG.

26. The method in claim 25 wherein the hierarchical representation is additionally in terms of Single Entry/ZeroExit (SEZE) regions.

27. The method in claim 25 which further comprises:
b) building the hierarchical representation of the Control Flow Graph (CFG).

28. The method in claim 25 wherein:
the hierarchical representation is a Reduced FlowGraph (RFG).

29. The method in claim 21 which further comprises:
b) reading one or more path correlation counts stored on secondary storage media.

30. The method in claim 25 wherein within step (a):
one or more path correlation counts are utilized to reorder code.

31. The method in claim 25 which further comprises:
b) creating a computer program executable based on code layout in step (a); and
c) writing the computer program executable to Secondary Storage.

32. An external storage medium containing the computer program executable created using the method claimed in claim 31 encoded in machine readable format.

33. A computer-implemented method for cloning computer code for improved data processor execution, said method comprising:
a) utilizing a hierarchical representation of a Control Flow Graph (CFG) in terms of Single Entry/Single Exit (SESE) regions corresponding to execution flow of a computer program to identify a segment of code in the computer program to clone, wherein at least one edge of the hierarchical representation replaces an SESE region of the CFG and the hierarchical representation includes nesting properties and full control flow information of the CFG; and
b) cloning the segment of code identified in step (a) by duplicating the segment of code.

34. The method in claim 33 wherein:
the hierarchical representation is a Reduced FlowGraph (RFG).

35. The method in claim 33 which further comprises:
c) building the hierarchical representation of the Control Flow Graph (CFG) utilized in step (a).

36. The method in claim 33 wherein the hierarchical representation is additionally in terms of Single Entry/Zero Exit (SEZE) regions.

37. The method in claim 33 which further comprises:
b) creating an computer program executable that includes the segment of code cloned in step (b); and
c) writing the computer program executable to secondary storage.

38. The method in claim 33 which further comprises:
b) reading one or more path correlation counts stored on secondary storage media.

39. An external storage medium containing the computer program executable created using the method claimed in claim 37 encoded in machine readable format.

40. The method in claim 38 wherein within step (a):
one or more path correlation counts are utilized to identify the segment of code to clone.

41. A computer-implemented method for analyzing a control flowgraph, said method comprising:
partitioning the flowgraph into Single Entry/Single Exit (SESE) regions; and
representing the flowgraph using a hierarchical structure, wherein each of said SESE regions in the flowgraph is replaced with an edge which describes a structure of each of said SESE regions.

42. The method of claim 41, wherein said partitioning is further characterized by transforming the flowgraph into canonical SESE regions.

43. The method of claim 41, wherein said partitioning further comprises partitioning the flowgraph into Single Entry/Zero Exit (SEZE) regions.

44. The method of claim 41, wherein said partitioning the flowgraph further includes node splitting.

45. The method of claim 41, wherein said representing the flowgraph further includes node splitting.

46. The method of claim 41, wherein said flowgraph is a strongly connected flowgraph.

47. The method of claim 41, wherein said flowgraph is a not strongly connected flowgraph.

48. The method in claim 41, wherein the control flowgraph may not be a strongly connected flowgraph.

49. The method in claim 41, wherein the control flowgraph includes at least one 1-reducible edge.

50. A computer-implemented method for hierarchical restructuring of computer code using runtime statistics, said method comprising:

a) building a hierarchical representation of a Control Flow Graph (CFG) in terms of Single Entry/Single Exit (SESE) regions corresponding to execution flow of a computer program;
b) creating a first executable, which comprises:
   1) inserting a plurality of instrumentation instructions into the computer program utilizing the hierarchical representation;
c) executing the first executable, wherein:
   one or more of the plurality of instrumentation instructions generates path correlation counts during execution of the first executable, wherein at least one of the path correlation counts corresponds to at least two execution paths of the computer program;
d) creating a second executable, which comprises:
   1) reordering computer code utilizing the path correlation counts.

51. The method in claim 50, wherein the at least two execution paths are nonadjacent execution paths.

* * * * *

UNITED STATES PATENT AND TRADEMARK OFFICE
CERTIFICATE OF CORRECTION

PATENT NO. : 6,381,739 B1
DATED : April 30, 2002
INVENTOR(S) : Mauricio Breternitz, Jr. et al.

It is certified that error appears in the above-identified patent and that said Letters Patent is hereby corrected as shown below:

<u>Title page,</u>
Item [75], Inventors, add -- Sanjay M. Krishnamurthy, Cupertino, CA --.

<u>Column 37,</u>
Line 53, delete "claim 21" and insert -- claim 25 --.
Line 57, delete "claim 25" and insert -- claim 29 --.

Signed and Sealed this

Twenty-ninth Day of July, 2003

JAMES E. ROGAN
*Director of the United States Patent and Trademark Office*